United States Patent
Geissler et al.

(10) Patent No.: US 7,843,350 B2
(45) Date of Patent: Nov. 30, 2010

(54) ANIMAL MANAGEMENT SYSTEM INCLUDING RADIO ANIMAL TAG AND ADDITIONAL TRANCEIVER(S)

(75) Inventors: Randolph K. Geissler, Hudson, WI (US); Steven Lewis, Bloomington, MN (US); Scott Alan Nelson, Eagan, MN (US)

(73) Assignee: Destron Fearing Corporation, South St. Paul, MN (US)

(*) Notice: Subject to any disclaimer, the term of this patent is extended or adjusted under 35 U.S.C. 154(b) by 487 days.

(21) Appl. No.: 12/017,330

(22) Filed: Jan. 21, 2008

(65) Prior Publication Data

US 2009/0058730 A1    Mar. 5, 2009

Related U.S. Application Data

(60) Provisional application No. 60/881,653, filed on Jan. 21, 2007.

(51) Int. Cl.
*G08B 23/00* (2006.01)

(52) U.S. Cl. .................................. 340/573.2

(58) Field of Classification Search ............. 340/573.2, 340/573.3, 825.49, 572.1, 572.7, 10.1; 119/14.14, 119/51.02
See application file for complete search history.

(56) References Cited

U.S. PATENT DOCUMENTS

| | | | |
|---|---|---|---|
| 3,557,758 A | 1/1971 | Lack | |
| 3,934,368 A | 1/1976 | Fearing | |
| 3,987,570 A | 10/1976 | McMurray et al. | |
| 4,060,921 A | 12/1977 | Robinson | |
| RE29,536 E | 2/1978 | Fearing | |
| 4,075,632 A | 2/1978 | Baldwin et al. | |
| 4,114,151 A | 9/1978 | Denne et al. | |
| 4,129,855 A | 12/1978 | Rodrian | |
| 4,176,482 A | 12/1979 | Steckel | |
| 4,209,924 A | 7/1980 | Fearing | |
| 4,209,924 A | 7/1980 | Fearing | |
| 4,250,643 A | 2/1981 | Mackenzie | |
| 4,274,083 A | 6/1981 | Tomoeda | |
| 4,425,726 A | 1/1984 | Dvorak | |
| RE31,632 E | 7/1984 | Murphy et al. | |
| 4,463,353 A | 7/1984 | Kuzara | |
| 4,463,706 A | 8/1984 | Meister et al. | |

(Continued)

FOREIGN PATENT DOCUMENTS

DE    297 01 976 U1    5/1997

(Continued)

OTHER PUBLICATIONS

International Search Report and Written Opinion, mailed Jul. 26, 2006, from PCT Patent Application No. PCT/US2005/041732, which claims priority to copending, provisional U.S. Appl. Nos. 60/629,013, 60/706,645, and 60/722,138.

(Continued)

*Primary Examiner*—Phung Nguyen
(74) *Attorney, Agent, or Firm*—Merchant & Gould, P.C.

(57) ABSTRACT

An animal management system includes a beacon, a radio animal tag configured to monitor the proximity of the animal tag to the beacon, and a reader configured to read information from the animal tag.

59 Claims, 24 Drawing Sheets

U.S. PATENT DOCUMENTS

| | | | |
|---|---|---|---|
| 4,470,212 A | 9/1984 | Stafford et al. | |
| 4,475,481 A * | 10/1984 | Carroll | 119/51.02 |
| 4,510,495 A | 4/1985 | Sigrimis et al. | |
| 4,517,563 A | 5/1985 | Diamant | |
| 4,581,834 A | 4/1986 | Zatkos et al. | |
| 4,612,877 A | 9/1986 | Hayes et al. | |
| 4,618,861 A | 10/1986 | Gettens et al. | |
| 4,635,389 A | 1/1987 | Oudelette | |
| 4,653,208 A | 3/1987 | Wassilieff | |
| 4,691,458 A | 9/1987 | Scott | |
| 4,741,117 A | 5/1988 | Fearing | |
| 4,854,328 A | 8/1989 | Pollack | |
| 4,953,313 A | 9/1990 | Scott | |
| 4,958,452 A | 9/1990 | Tate | |
| 5,051,741 A | 9/1991 | Wesby | |
| 5,228,224 A | 7/1993 | Gardner | |
| 4,953,313 A | 9/1993 | Scott | |
| 5,302,954 A | 4/1994 | Brooks et al. | |
| 5,308,351 A | 5/1994 | Nehls | |
| 5,322,034 A | 6/1994 | Willham et al. | |
| 5,446,447 A | 8/1995 | Carney et al. | |
| 5,450,492 A | 9/1995 | Hook et al. | |
| 5,461,806 A | 10/1995 | Bristow, Jr. | |
| 5,473,830 A | 12/1995 | Doble | |
| 5,477,215 A | 12/1995 | Mandelbaum | |
| 5,499,626 A | 3/1996 | Willham et al. | |
| 5,510,769 A | 4/1996 | Kajfez et al. | |
| 5,520,417 A | 5/1996 | Kennemer | |
| 5,675,920 A | 10/1997 | Long | |
| 5,680,106 A | 10/1997 | Schrott et al. | |
| 5,711,246 A | 1/1998 | Yano et al. | |
| 5,725,261 A | 3/1998 | Rahn | |
| 5,812,065 A | 9/1998 | Schrott et al. | |
| 5,901,660 A | 5/1999 | Stein | |
| 5,936,527 A | 8/1999 | Isaacman et al. | |
| 5,964,656 A | 10/1999 | Lawler, Jr. et al. | |
| 6,021,592 A | 2/2000 | Caisley | |
| 6,055,752 A | 5/2000 | Ritchey | |
| 6,107,910 A | 8/2000 | Nysen | |
| 6,127,928 A | 10/2000 | Issacman et al. | |
| 6,145,225 A | 11/2000 | Ritchey | |
| 6,145,226 A | 11/2000 | Finlayson | |
| 6,154,139 A | 11/2000 | Heller | |
| 6,163,259 A | 12/2000 | Barsumian et al. | |
| 6,196,912 B1 | 3/2001 | Lawler, Jr. et al. | |
| 6,211,789 B1 | 4/2001 | Oldham et al. | |
| 6,231,435 B1 | 5/2001 | Pilger | |
| 6,329,920 B1 | 12/2001 | Morrison et al. | |
| 6,342,839 B1 | 1/2002 | Curkendall et al. | |
| 6,346,884 B1 | 2/2002 | Uozumi et al. | |
| 6,346,885 B1 | 2/2002 | Curkendall | |
| 6,362,737 B1 | 3/2002 | Rodgers et al. | |
| 6,366,206 B1 | 4/2002 | Ishikawa et al. | |
| 6,375,612 B1 | 4/2002 | Guichon et al. | |
| 6,405,462 B1 | 6/2002 | Gardner et al. | |
| 6,427,627 B1 * | 8/2002 | Huisma | 119/51.02 |
| 6,439,169 B1 | 8/2002 | Miyawaki | |
| 6,480,100 B1 | 11/2002 | Frieden et al. | |
| 6,480,699 B1 | 11/2002 | Lovoi | |
| 6,497,197 B1 | 12/2002 | Huisma | |
| 6,509,828 B2 | 1/2003 | Bolavage et al. | |
| 6,510,630 B1 | 1/2003 | Gardner | |
| 6,513,271 B2 | 2/2003 | Hogan | |
| 6,531,957 B1 | 3/2003 | Nysen | |
| 6,545,604 B1 | 4/2003 | Dando et al. | |
| 6,554,188 B1 | 4/2003 | Johnson et al. | |
| 6,569,092 B1 * | 5/2003 | Guichon et al. | 600/300 |
| 6,598,800 B1 | 7/2003 | Schmit et al. | |
| 6,608,561 B2 | 8/2003 | Lawler, Jr. et al. | |
| 6,613,179 B1 | 9/2003 | McCoy et al. | |
| 6,649,403 B1 | 11/2003 | McDevitt et al. | |
| 6,664,897 B2 | 12/2003 | Pape et al. | |
| 6,666,170 B1 | 12/2003 | Hilpert | |
| 6,684,810 B2 | 2/2004 | Martin | |
| 6,698,119 B2 | 3/2004 | Jacob et al. | |
| 6,700,547 B2 | 3/2004 | Mejia et al. | |
| 6,708,881 B2 | 3/2004 | Hartmann | |
| 6,713,298 B2 | 3/2004 | McDevitt et al. | |
| 6,720,930 B2 | 4/2004 | Johnson et al. | |
| 6,724,309 B2 | 4/2004 | Grose et al. | |
| 6,745,008 B1 | 6/2004 | Carrender et al. | |
| 6,825,763 B2 | 11/2004 | Ulrich et al. | |
| 6,831,562 B2 | 12/2004 | Rodgers et al. | |
| 6,840,440 B2 | 1/2005 | Uozumi et al. | |
| 6,847,892 B2 | 1/2005 | Zhou et al. | |
| 6,859,672 B2 | 2/2005 | Roberts et al. | |
| 6,878,052 B2 | 4/2005 | Andersson | |
| 6,916,295 B2 | 7/2005 | Tasch et al. | |
| 6,982,646 B2 | 1/2006 | Rodgers et al. | |
| 6,983,687 B2 | 1/2006 | McCoy | |
| 6,988,080 B2 | 1/2006 | Zack et al. | |
| 7,009,515 B2 | 3/2006 | Carrender | |
| 7,019,639 B2 | 3/2006 | Stilp | |
| 7,023,341 B2 | 4/2006 | Stilp | |
| 7,026,939 B2 | 4/2006 | Letkomiller et al. | |
| 7,049,942 B2 | 5/2006 | Gallovich | |
| 7,079,020 B2 | 7/2006 | Stilp | |
| 7,082,344 B2 | 7/2006 | Ghaffari | |
| 7,084,756 B2 | 8/2006 | Stilp | |
| 7,091,860 B2 | 8/2006 | Martinez de Velasco Cortina et al. | |
| 7,098,793 B2 | 8/2006 | Chung | |
| 7,106,189 B2 | 9/2006 | Burneske et al. | |
| 7,116,212 B2 | 10/2006 | Horwitz et al. | |
| 7,116,230 B2 | 10/2006 | Klowak | |
| 7,142,118 B2 | 11/2006 | Hamilton et al. | |
| 7,158,030 B2 | 1/2007 | Chung | |
| 7,164,361 B2 | 1/2007 | Poliska | |
| 7,167,095 B2 | 1/2007 | Carrender | |
| 7,242,306 B2 | 7/2007 | Wildman et al. | |
| 7,248,933 B2 | 7/2007 | Wildman | |
| 7,250,917 B1 | 7/2007 | Thompson et al. | |
| 7,252,230 B1 | 8/2007 | Sheikh et al. | |
| 7,256,696 B2 | 8/2007 | Levin | |
| 7,479,884 B1 * | 1/2009 | Fullerton | 340/572.7 |
| 2002/0010390 A1 | 1/2002 | Guice et al. | |
| 2002/0188470 A1 | 12/2002 | Hogan | |
| 2003/0038721 A1 | 2/2003 | Hogan | |
| 2003/0121188 A1 | 7/2003 | Haar et al. | |
| 2004/0021313 A1 | 2/2004 | Gardner et al. | |
| 2004/0027251 A1 | 2/2004 | Sharony | |
| 2004/0144004 A1 | 7/2004 | Constatini | |
| 2004/0150528 A1 | 8/2004 | Natividade et al. | |
| 2004/0211332 A9 | 10/2004 | Apana et al. | |
| 2005/0024183 A1 | 2/2005 | Carter et al. | |
| 2005/0052283 A1 | 3/2005 | Collins et al. | |
| 2005/0075900 A1 | 4/2005 | Arguimbau, III | |
| 2005/0078006 A1 | 4/2005 | Hutchins et al. | |
| 2005/0115507 A1 | 6/2005 | Halachmi et al. | |
| 2005/0145187 A1 | 7/2005 | Gray | |
| 2005/0161007 A1 | 7/2005 | Huisma et al. | |
| 2006/0038658 A1 | 2/2006 | Jarvis et al. | |
| 2006/0114109 A1 | 6/2006 | Geissler | |
| 2006/0132317 A1 * | 6/2006 | Letkomiller et al. | 340/573.1 |
| 2006/0161443 A1 | 7/2006 | Rollins | |
| 2006/0202835 A1 | 9/2006 | Thibault | |
| 2007/0008069 A1 | 1/2007 | Lastinger et al. | |
| 2007/0015549 A1 * | 1/2007 | Hernandez et al. | 455/572 |
| 2007/0096897 A1 | 5/2007 | Weiner | |
| 2007/0137584 A1 * | 6/2007 | Travis | 119/51.02 |

| | | | |
|---|---|---|---|
| 2008/0218357 | A1* | 9/2008 | March et al. ............. 340/573.1 |

FOREIGN PATENT DOCUMENTS

| | | |
|---|---|---|
| EP | 0 670 562 A1 | 9/1995 |
| EP | 1 070 453 A1 | 1/2001 |
| EP | 1 438 607 B1 | 4/2009 |
| WO | WO 99/27777 | 6/1999 |
| WO | WO 99/45761 | 9/1999 |
| WO | WO 02/060244 A1 | 8/2002 |
| WO | WO 02/084629 A1 | 10/2002 |
| WO | WO 03/051108 A2 | 6/2003 |
| WO | WO 03/079773 A1 | 10/2003 |
| WO | WO 2005/034617 A1 | 4/2005 |

OTHER PUBLICATIONS

International Search Report and Written Opinion, mailed Feb. 20, 2007, from PCT Patent Application No. PCT/US2006/043032, which claims priority to copending, provisional U.S. Appl. No. 60/732,865.

"FDX Lightweight Ultra Bovine EID Tag ISO Compliant," Allflex USA, Inc., www.allfexusa.com, 10 pages (2004).

"Product Information: Y-Tex RFID Electronic Acquisition and Retrieval System," Y-Tex Corporation, 4 pages (admitted by application as prior art as of Apr. 11, 2007).

"RFID the Next Generation in AIDC," www.satoworldwide.com, pp. 1-53 (Oct. 29, 2004).

International Search Report and Written Opinion mailed Jun. 16, 2008.

* cited by examiner

| TAG ID 1210 | LAST ATE 1220 | LAST DRANK 1230 | Status 1240 |
|---|---|---|---|
| 1 | 10:45 am | 11:18 am | OK |
| 2 | 11:23am | 10:34 am | OK |
| 3 | 10:30 am | 10:02 am | OK |
| 4 | 9:45 am | 9:18 am | OK |
| 5 | NA | NA | ALERT |

| SIGHTED | EATING | DRINKING | TOTAL |
|---|---|---|---|
| 33 | 0 | 4 | 34 |

FIG. 19

| TO WATCH 1612 | MISSING 1614 | NOT EATING 1616 | NOT DRINKING 1618 |
|---|---|---|---|
| 2 | 0 | 1 | 2 |

FIG. 20

| TAG ID 1712 | LAST ATE 1714 | LAST DRANK 1716 | LAST VIEWED 1718 |
|---|---|---|---|
| 111 | 1/12/08 11:18 am | 1/12/08 1:27 pm | 1/14/08 12:01 pm |
| 222 | 1/14/08 10:34 am | 1/13/08 2:14 pm | 1/14/08 9:54 am |

ANIMAL MANAGEMENT SYSTEM INCLUDING RADIO ANIMAL TAG AND ADDITIONAL TRANCEIVER(S)

CROSS REFERENCE TO RELATED APPLICATIONS

This application claims priority to U.S. Provisional Application Ser. No. 60/881,653, filed Jan. 21, 2007, entitled "ANIMAL MANAGEMENT SYSTEM INCLUDING RADIO ANIMAL TAG AND ADDITIONAL TRANSCEIVER(S)," the disclosure of which is hereby incorporated by reference herein.

FIELD OF THE INVENTION

The present invention relates to an animal management system including a beacon, a radio animal tag, and a reader. The system is configured to monitor the proximity of the animal tag to the beacon and to send information regarding that proximity to the reader. The beacon puts location information into the tag and the reader retrieves the location information from the tag.

BACKGROUND

In the past, animal identification (e.g., ear tags, ear tattoos, leg bands, etc.) has been used to prove ownership and deter theft of animals, such as livestock. In recent years, concerns about diseases and contamination have increased, thus leading to a domestic push to increase the scope of livestock surveillance. Passive radio frequency identification animal tags have been employed to provide a simple way for a computer to read the identity of an animal and to provide information about that animal from a database. There remains a need for additional methods to monitor the health, well being, activity, or care of animals.

SUMMARY

The present invention relates to an animal management system including a beacon, a radio animal tag, and a reader. The system is configured to monitor the proximity of the animal tag to the beacon and to send information regarding that proximity to the reader.

In an embodiment, the present invention includes an animal management system. This animal management system can include a beacon, an animal tag, and a reader. The beacon can include a beacon transceiver. The beacon transceiver can be configured to broadcast a beacon signal over a beacon range. The beacon signal can include beacon information, which can include an identifier of an area of interest. The beacon range encompasses the area of interest. The animal tag can include memory and a tag transceiver. The memory can be configured to store tag information. The tag transceiver can be configured to receive the beacon signal and to transmit a tag signal including the tag information. Tag information can include indicia identifying the animal tag, the beacon information, information generated upon receiving the beacon signal, or a combination thereof. The reader can include a reader transceiver. The reader transceiver can be configured to receive the tag signal and to transmit the tag information, information generated upon receiving the tag information, or a combination thereof.

Another embodiment of the system of the present invention is a facility management system for managing animals within a facility. This facility management system can include a beacon disposed at an area of interest located within the facility, the area of interest being smaller than the facility. This embodiment of the beacon includes a beacon transceiver configured to broadcast a beacon signal over a beacon range encompassing at least a portion of the area of interest. This system also include an animal tag disposed on an animal, the animal being confined to a region of the facility, the region being larger than the area of interest. This embodiment of the animal tag includes a tag transceiver configured to receive the beacon signal when within the beacon range of the beacon. This system also includes a reader disposed in or proximal to the region in which the animal is confined.

The present invention also includes a method of monitoring animal behavior. This method can include providing an animal and an animal tag coupled to the animal. The animal tag includes a tag transceiver and memory storing tag information including indicia identifying the animal. In this method, the animal is enclosed in a region of a facility including at least a portion of an area of interest; the area of interest being within and smaller than the facility. This method includes broadcasting from a beacon a beacon signal encompassing the area of interest. The beacon signal can include beacon information including an identifier of the area of interest.

This method includes receiving the beacon signal at the tag transceiver when the animal is in or adjacent to the area of interest. The memory of the animal tag storing tag information including the beacon information, information generated at the animal tag when the beacon signal is received, or a combination thereof. This method includes transmitting from the tag to the reader a tag signal including tag information. This method also includes receiving at the reader transceiver the tag signal from the animal tag.

This method also includes transmitting reader information from the reader transceiver to a data manager. The reader information including the tag information, information generated when the tag information is received at the reader, or a combination thereof. The method also include processing the reader information received by the data manager to determine a status of the animal and presenting an alert if the status of the animal is outside predefined parameters.

The invention also relates to a beacon including a beacon transceiver. The beacon transceiver can be configured to broadcast a beacon signal over a beacon range. The beacon signal can include beacon information including an identifier of an area of interest. The beacon range encompasses an area of interest.

The invention also relates to an animal tag including memory and a tag transceiver. The memory can be configured to store tag information. The tag transceiver can be configured to receive the beacon signal and to transmit a tag signal including the tag information. The tag information can include indicia identifying the animal tag, the beacon information, information generated upon receiving the beacon signal, or a combination thereof.

The invention also relates to a reader transceiver. The reader transceiver can be configured to receive the tag signal and to transmit the tag information, information generated upon receiving the tag information, or a combination thereof.

BRIEF DESCRIPTION OF THE DRAWINGS

FIG. 19 is a schematic block diagram of an example display that enables a user to monitor existing alert conditions in accordance with the principles of the present disclosure;

FIG. 20 is a schematic block diagram of an example display that provides additional information about alert conditions with respect to specific animals in accordance with the principles of the present disclosure;

DETAILED DESCRIPTION

Definitions

Figure 1:
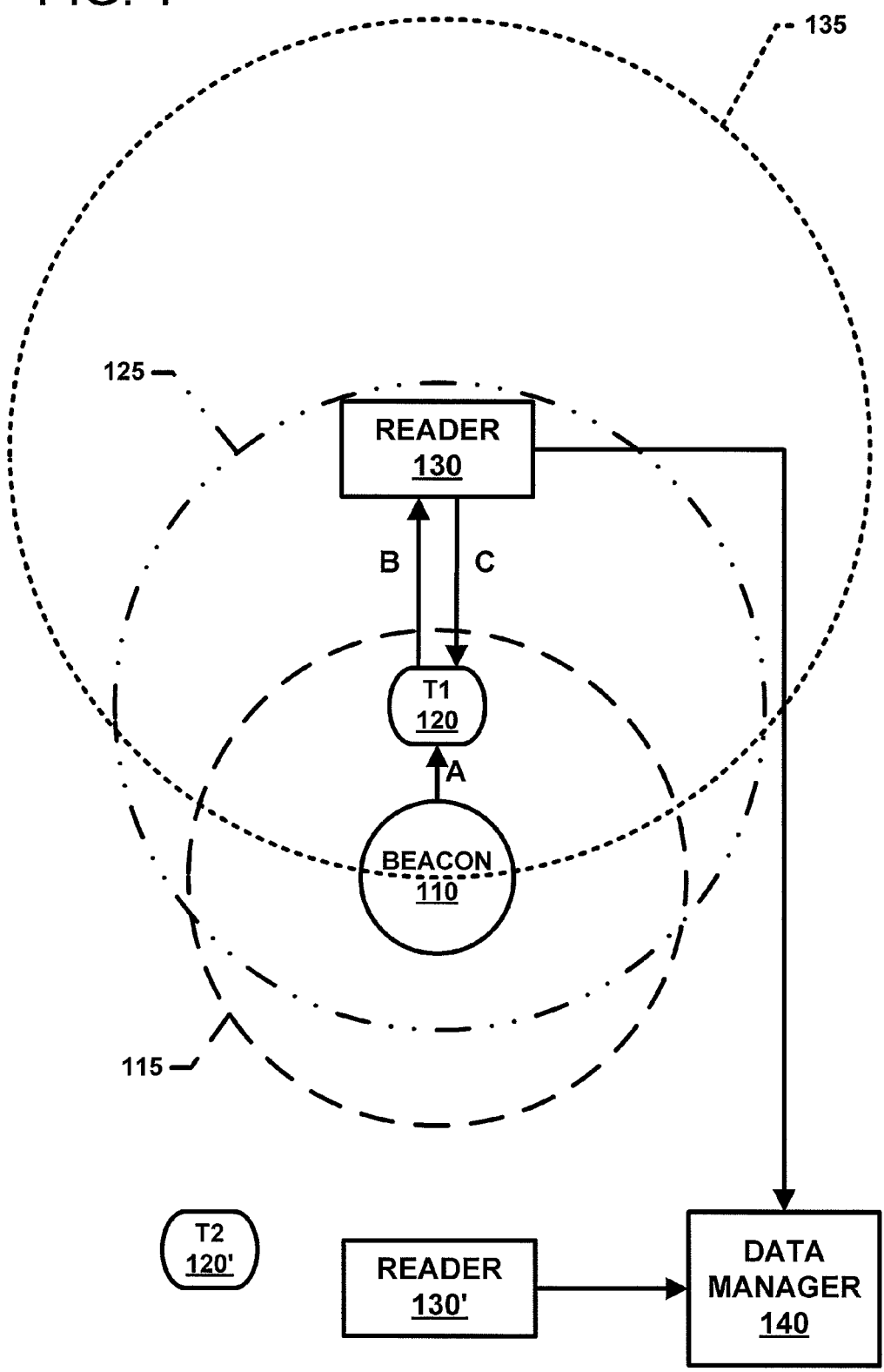
FIG. 1 is a schematic block diagram illustrating an example embodiment of an animal management system including a beacon, an animal tag, and a reader in accordance with the principles of the present disclosure.

As used herein, the term "animal" refers to macroscopic animals including vertebrates. Animals include domesticated animals, such as livestock and companion animals, and wild animals, such as game animals or fish. Livestock include animals such as swine (pig), piglet, horse, donkey, bison, deer, alpaca, llama, sheep, lamb, goat, bovine (e.g., cow), farmed fish (e.g., salmon) and, birds (e.g., chickens, ducks, and geese). This list of animals is intended to be illustrative only, and should not limit the scope of any of the following disclosure related to the present invention.

An event history includes a record of discrete events in the life of the animal. In an embodiment, the event history logs commercial transactions involving the animal, medical procedures performed on the animal, any other such incidents.

For example, an event history may include a date the animal was born, a date the animal was obtained (e.g., bought), a date the animal was branded, a date the animal was vaccinated, types of vaccinations administered, date the animal was castrated, and/or a date the animal was/will be slaughtered.

An activity history includes a record of activities regularly performed by the animal. Non-limiting examples of such activities may include approaching a food trough, eating at a food trough, leaving a food trough, approaching a water trough, drinking at a water trough, leaving a water trough, approaching a mineral station, consuming a mineral (e.g., salt) at a mineral station, leaving a mineral station, entering a stall, leaving a stall, entering a milking parlor, leaving a milking parlor, approaching a fence, leaving the fence, entering a truck, exiting a truck, entering a chute, leaving a chute, and standing and/or laying in a wind break. An activity history also may include descriptions of the activities, such as the amount of food consumed in a predetermined period of time (e.g., daily), the amount of liquid consumed in a predetermined period of time, and/or the amount of milk produced in a predetermined period of time.

As used herein, the term "track" refers to identifying, locating, recording, and/or monitoring of animals or other objects of interest, for whatever purpose or reason. As used herein, the term "area" refers to a particular extent of space or surface or one serving a particular function; a geographic region. As used herein, the term "location" refers to a position or site occupied or available for occupancy or marked by some distinguishing feature. The terms area and location are used interchangeably herein.

As used herein, the term "adjacent" refers to in contact with or separated by too little space for another tagged animal to occupy the space between the area of interest and the subject animal.

As used herein with respect to a beacon range and an area of interest, the term "encompass" refers to a beacon range that extends over and slightly beyond an area of interest. Accordingly, a tag arranged within or adjacent to the area of interest will be within the beacon range. For example, if the area of interest is a feed trough, then a beacon range that encompasses the feed trough may extend beyond a perimeter of the feed trough sufficient to be viewed by a tag coupled to an animal standing adjacent to the feed trough. The term encompass does not indicate a beacon range extending significantly beyond the area of interest or extending sufficiently beyond the area of interest to have a significant impact on the results of monitoring the presence of an animal in or adjacent to the area of interest.

As the term is used herein, a trough refers to a structure, station, or location from which an animal may consume nourishment (e.g., food, drink, minerals, or other consumables). For example, a feed trough refers to a structure, station, or location at which an animal may eat food. In an embodiment, a trough may include a generally elongate receptacle configured to hold nourishment. In other embodiments, however, a trough may refer to any naturally occurring or man-made structure, station, or location configured to contain nourishment.

Animal Management System

The present disclosure relates to an animal management system. The animal management system can include one or more animal tags, one or more readers, and one or more beacons. In general, beacons, which may be arranged adjacent areas of interest, broadcast announcements of the beacons' presence. Each animal tag stores an identifier and a status (e.g., events, health, etc.) of a corresponding animal. An animal tag coming within range of a beacon updates its status to reflect contact with the beacon. Periodically, the tags report status updates to one or more readers, which forward the information to a data manager for processing and storage.

Beacon

Aspects of the present disclosure relate to a beacon, which can have features in addition to those described herein. The beacon can be located at any site within an animal growing or handling facility at which it is desired to track the proximity of an animal. The beacon can be at a site within the facility (e.g., farm, ranch, feed lot, or stock yard) at which it can communicate with the reader. In an embodiment, the beacon is proximal a feed trough. In an embodiment, the beacon is proximal a water trough.

The beacon is configured to broadcast a presence announcement over a predetermined region. For example, in an embodiment, the beacon may broadcast identifying indicia capable of distinguishing the individual beacon, the type of beacon, or other appropriate information. The beacon can be configured to maintain adequate strength of its field in the region, volume, or area in which it is desired that the system track the presence of the tag(s) in cooperation with the beacon. For example, the beacon can be shielded to shape its field. In an embodiment, the beacon is shielded to configure its field to cover a volume occupied by heads of animals eating at a feeding trough. In an embodiment, the beacon is shielded to configure its field to cover a volume occupied by heads of animals drinking at a watering system.

In an embodiment, the beacon is configured communicate with the animal tag over a distance from a point proximal a watering system to a head of an animal drinking at the watering system. In an embodiment, the beacon is configured communicate with the animal tag over a distance from a point proximal a feed trough to a head of an animal eating at the feed trough. The beacon can be configured communicate with the animal tag over a distance of 3 meters or less.

In an embodiment, the beacon is configured to be unable to communicate with the tag when the tag is at a distance greater than the distance from a point proximal a watering system to a head of an animal drinking at the watering system. In an embodiment, the beacon is configured communicate with the animal tag only over a distance from a point proximal a feed trough to a head of an animal eating at the feed trough or less. In an embodiment, the beacon is configured to be unable to communicate with the tag when the tag is more than 3 meters from the beacon.

The beacon can include any of a variety of transceivers. The beacon can include a second radio transceiver and a second data processing system. In an embodiment, the second radio transceiver can be configured to communicate with an animal tag over a second frequency when the animal tag is in proximity to the beacon. For example, the second transceiver can include a radio that meets IEEE Standard 802.15.4 (e.g., a ZigBee type radio). In an embodiment, the second radio transceiver can be configured to communicate with a reader over a first radio frequency.

In an embodiment, the second radio transceiver is configured to communicate with the reader when the second radio transceiver has power sufficient to transmit over a distance of 25 meters or more.

Animal Tag

Aspects of the present disclosure relate to an animal tag, which can have features in addition to those described herein. In an embodiment, the tag is configured to be coupled to an animal. For example, in an embodiment, the tag is configured to couple to an ear of an animal. In another embodiment, the tag is configured to couple to another section of the animal, such as the tail or the leg. In another embodiment, the tag is configured to couple to an object coupled to the animal. For example, the tag may be coupled to a collar arranged around a neck of the animal, a brace wrapped around a limb of the animal, or a marker coupled to the animal. In another embodiment, the tag is configured to be implanted within the animal or ingested by the animal.

The animal tag can include a first radio transceiver, a power source (e.g., a battery), and a first data processing system. The animal tag also may include memory for storing identifying indicia and/or other information. For example, the tag can include a distinct identifying indicia and can be configured to respond to a query only when addressed by its distinct identifying indicia.

The tag can be configured to transmit and store information, for example, information gathered or determined while the tag is on an animal. For example, the tag can be configured to store in memory and transmit to the reader or the beacon the amount of time that the tag is in proximity to the beacon. In an embodiment, the tag can be configured to communicate with a reader on a first frequency. In an embodiment, the tag may communicate with a beacon (e.g., on a second frequency).

The first radio transceiver can be configured to transmit identification indicia, tag-specific information, animal-specific information, or some combination thereof to a reader. In an embodiment, the first radio transceiver is configured to transmit over a distance sufficient for the tag to be read on an animal in a holding pen by the reader external to the holding pen. In an embodiment, the first radio transceiver is configured to transmit over a distance of 25 meters or more.

The tag can include any of a variety of transceivers. For example, the first transceiver can include or be a radio that meets IEEE Standard 802.15.4 (e.g., a ZigBee type radio). In an embodiment, the first transceiver and the first data processing system are arranged on a single printed circuit board. In an embodiment, the single printed circuit board defines an area no larger than a conventional animal ear tag.

Reader

Aspects of the present disclosure relate to a reader, which can have features in addition to those described herein. In an embodiment, the reader is near or within transmission range of an animal holding pen. For example, the reader can be proximal an animal holding pen. The reader can transmit information to and/or receive information from one or more tags, one or more beacons, or combination thereof. In an embodiment, the reader includes a third radio transceiver and a third data processing system.

In an embodiment, the reader is configured to communicate with the animal tag. In an embodiment, the reader is configured to query the tag with its identifying indicia. In an embodiment, the reader can be configured to query each of a plurality of tags with its distinct identifying indicia to obtain information. The information can be tag-specific information, general information, or a combination thereof. The tag-specific information can include, for example, time that the tag was in proximity to a feed trough, a watering system, or both.

In an embodiment, the reader is configured to communicate with the animal tag at a first frequency and a first power level. In another embodiment, the reader is configured to transmit over a distance of 25 meters or more. In an embodiment, the reader is configured to transmit over a distance sufficient for the reader external to a holding pen to transmit information to an animal in the holding pen.

In an embodiment, the reader is a (second or chute-side) reader configured to write animal-specific information to a tag on one tagged animal at a time. In such an embodiment, the animal-specific information can include, for example, information about a procedure conducted on the animal, a medication given the animal, or a combination thereof. In an embodiment, this reader is configured to communicate with the tag employing a power level effective for communication at a distance of less than about 6 feet.

The reader can transmit the information, for example, to a display device, a processing device, or a display and processing device. In certain embodiments, the display device, the processing device, or the display and processing device can include a personal digital assistant, a notebook computer, a desktop computer, or a plurality thereof.

Illustrated Embodiments

FIG. 1 is a schematic block diagram illustrating an example embodiment of an animal management system 100. As shown in FIG. 1, the animal management system 100 generally includes a beacon 110, an animal tag 120, and a reader 130. In the example shown in FIG. 1, the animal management system 100 includes a second animal tag 120' and a second reader 130'. In other embodiments, additional beacons 110, tags 120, and readers 130 also may be provided as part of the animal management system 100.

Beacon 110 is generally arranged in or adjacent an area of interest. In an embodiment, beacon 110 may be arranged in or adjacent an animal activity area. Animal activity areas are areas in which an animal may perform an activity to be tracked. Non-limiting examples of activities to be tracked include approaching a food trough, eating at a food trough, leaving a food trough, approaching a water trough, drinking at a water trough, leaving a water trough, approaching a mineral station, consuming a mineral (e.g., salt) at a mineral station, leaving a mineral station, entering a stall, leaving a stall, entering a milking parlor, leaving a milking parlor, approaching a fence, entering a truck, exiting a truck, entering a chute, leaving a chute, and standing and/or laying in a wind break. In an embodiment, a beacon 110 may be arranged adjacent a food trough, a water trough, a milking parlor, an immunization station, a truck, a chute, a wind break, or another area of activity.

When the tag 120 approaches this area of interest, the beacon 110 prompts the tag 120 to log the tag's proximity status (e.g., the tag's proximity to the beacon 110 and hence the corresponding area of interest). In an embodiment, the tag 120 periodically increments a beacon counter if the tag 120 determines the tag 120 is located in proximity to the beacon 110. In an embodiment, the tag 120 logs its proximity status by recording a number of separate visits to the beacon 110 (i.e., a number of times the tag 120 has entered and exited a range of the beacon 110). In an embodiment, the tag 120 the tag 120 logs its proximity status by recording dates and times of each visit to the beacon 110. In an embodiment, the tag 120 the tag 120 logs its proximity status by recording the length of time of one or more visits to the beacon 110. For example, the tag 120 can record the duration of time of visits to the beacon 110 that occur between reports to reader 130.

Tag 120 periodically reports its beacon proximity status (e.g., a length of time over which each tag 120 was in proximity to a beacon 110, dates and times at which the tag 120 was in proximity to a beacon 110, number of visits to the beacon 110, etc.) to one or more readers 130. In an embodiment, the beacon 110 may prompt the tag 120 to report its proximity status to one or more readers 130. In another embodiment, an unsolicited tag 120 also may report to a reader 130. In another embodiment, the tag 120 reports to a reader 130 in response to a query broadcast from the reader 130.

The reader 130 reports the proximity status of the tag 120 to a data storage manager 140 for analysis and/or storage (e.g., long-term storage, secure storage, network storage, etc.). In an embodiment, the reader 130 polls for information from one or more surrounding tags 120. For example, the reader 130 may broadcast a query signal within a range 135 of the reader 130. In another embodiment, the reader 130 receives unsolicited status reports from tags 120. The data storage manager 140 may store one or more applications that use the proximity status information obtained from the animal tag 120 and reader 130.

In some embodiments, the beacon 110, the animal tag 120, and the reader 130 are configured to transmit radio signals. In an embodiment, the components of the animal management system 100 communicate via packet framing. In other embodiments, however, another communications protocol may be used.

The beacon 110, which is generally stationary, is configured to transmit radio signals A over a predetermined range 115. In an embodiment, two or more beacons 110 may be arranged over an area of interest to provide overlapping ranges 115. In an embodiment, two or more beacons 110 may be arranged such that the respective ranges cover substantially the entire area of interest (e.g., see FIG. 2). In another embodiment, each beacon 110 may represent a different area of interest.

Different beacons 110 may be used to identify different areas. In an embodiment, a first beacon may identify a first area of interest and a second beacon may identify a second area of interest (e.g., see beacons 1012, 1014 of FIG. 4). For example, a first beacon 110 may identify a food trough and a second beacon 110 may identify a water trough. In another embodiment, a first beacon may indicate a stall in a barn (not shown) and a second beacon may indicate a stall in a milking parlor (not shown). In another embodiment, another beacon 110 may represent a fence, ditch, ravine, stream, or other boundary.

In an embodiment, the radio signals A identify the type of the beacon 110 transmitting the radio signals A. For example, the radio signals A of a beacon 110 may indicate the beacon signifies a food trough, a water trough, a milking parlor stall, a fence, or any other area of interest. In another embodiment, the radio signals A include a unique beacon identifier identifying a particular beacon 110. In an embodiment, the radio signals A distinguish the beacon 110 from other adjacent or remote beacons. In other embodiments, however, the radio signals A may not identify a particular one or type of beacon 110.

In some embodiments, the beacon 110 transmits the radio signals A at predetermined intervals. For example, the beacon 110 may transmit the radio signals A every few minutes, seconds, milliseconds, etc. In an embodiment, the beacon 110 may transmit the radio signals A at intervals ranging from about 1 millisecond to about 10 milliseconds. In an embodiment, the beacon 110 may broadcast the radio signals A every 1.2 milliseconds. In an embodiment, the beacon 110 may transmit the radio signals A at intervals ranging from about 10 times per second to about 1000 times per second. In an embodiment, the beacon 110 may transmit the radio signals A at a rate of 831 times per second. In an embodiment, the beacon 110 may transmit the radio signals A at a rate of 2 or more times per period in which the tag is in its awake mode.

In other embodiments, however, the beacon 110 may transmit the radio signals A continuously or according to non-regular intervals.

In another embodiment, the beacon 110 may transmit instructions to one or more animal tags 120. For example, in an embodiment, the beacon 110 may transmit instructions from the data manager 140. In an embodiment, the beacon 110 may transmit instructions to a subset of the animal tags.

The animal tag 120, when coupled to an animal, may move in and out of the range 115 of the beacon 110 as the respective animal moves around. In the example shown in FIG. 1, a first tag 120 is located within the range 115 of the beacon 110 and a second tag 120' is located outside the range 115 of the beacon 110.

In general, the animal tag 120 has a dormant mode and an awake mode. When configured into the awake mode, the tag 120 may transmit radio signals B over a predetermined range 125. When configured into the dormant mode, however, the tag 120 does not transmit radio signals B, thereby conserving power. For example, in an embodiment, the tag 120 partially shuts down to decrease power consumption.

In an embodiment, the tag 120 toggles between the dormant and awake modes at predetermined intervals. In an embodiment, the tag 120 may toggle into the awake mode after remaining in the dormant mode for a predetermined period of time. For example, the tag 120 may toggle into the awake mode after remaining in the dormant mode for a period of time ranging from about 1 millisecond to about 1 second. In an embodiment, the tag 120 may toggle into the awake mode after remaining in the dormant mode for about 2 milliseconds.

In another embodiment, the tag 120 may be prompted or triggered to toggle from the dormant mode into the awake mode. For example, the tag 120 may toggle into the awake mode when radio signal A is received from a beacon 110 or radio signal C is received from a reader 130. In an embodiment, the tag 120 toggles into the awake mode when a query is received from a reader 130. In an embodiment, the tag 120 toggles into the awake mode after a predetermined interval unless triggered to toggle earlier.

In an embodiment, the tag 120 may include a memory (see memory 200 of FIG. 7) in which to store information (e.g., data received from the beacon 110, the reader 130, the data manager 140, or combination thereof, data generated by the tag, etc.). The memory may include volatile memory (e.g., Random Access Memory) and/or non-volatile memory (e.g., flash memory). Generally, the tag 120 stores and/or accesses information when configured in the awake mode.

In an embodiment, the tag 120 may store in memory information about the animal to which the tag 120 is coupled. For example, the tag 120 may store information indicating a unique identification number, age, sex, and/or breed of the animal. In another embodiment, the tag 120 may store information on events in the life of the animal (e.g., an event history). For example, in an embodiment, the tag 120 may store a date the animal was born, a date the animal was obtained (e.g., bought), a date the animal was branded, a date the animal was vaccinated, types of vaccinations administered, and/or a date castrated.

In another embodiment, the tag 120 may store activity information (e.g., an activity history). In an embodiment, the tag 120 may store daily activity information. For example, in an embodiment, the tag 120 may store one or more beacon counters (e.g., food beacon, water beacon, fence beacon, etc.), the identity of the last beacon visited, or a timestamp indicating a date and time at which a radio signal A was received from a beacon 110. In an embodiment, the tag 120 may store information obtained from the beacon 110 (e.g., a unique beacon identification number) and/or from the reader 130 (e.g., a unique reader identification number). In other embodiments, the tag 120 also may store other information of interest, such as, operational parameters of the tag (e.g., radio power level, toggle intervals, a software revision number), or other information as appropriate.

At least a portion of the information stored on the tag 120 may be transmitted (e.g., broadcast) via the radio signals B. In an embodiment, the tag 120 transmits the radio signals B when toggled into the awake mode. For example, the tag 120 may transmit radio signals B when exposed to the radio signals C from a reader 130. In another embodiment, the tag 120 may transmit the radio signals B at periodic intervals regardless of whether radio signals C of a reader 130 have been received. In other embodiments, the tag 120 may transmit at periodic intervals unless the tag 120 contains insufficient power to transmit a complete cycle of the radio signals B over a minimum distance.

The reader 130 receives the radio signals B transmitted by the tag 120 if the reader 130 is located within a range 125 of the tag 120 when the tag 120 is transmitting. In an embodiment, two or more readers 130 may be located within the range 125 of the tag. In such an embodiment, each of the readers 130 receives and processes the radio signals B. In the example shown in FIG. 1, a first reader 130 is located within the range 125 of the first tag 120 and a second reader 130' is located outside the range 125 of the first tag 120. In another embodiment, a first reader 130 may be communicatively and/or electrically coupled to one or more additional readers 130. For example, a first reader 130 located within a range 125 of a tag 120 may communicate the data received from the tag 120 to an additional reader 130' located outside the range 125 of the tag 120.

In general, the reader 130 also may be toggled between an awake mode and a dormant mode. In the dormant mode, the reader 130 may shut down a radio transmitter or other internal component to draw less power. In the awake mode, the reader 130 may broadcast a query via radio signals C to the tag 120 requesting a proximity report or other status information. Also in the awake mode, the reader 130 may receive data from one or more of the animal tags 120 (e.g., via signals B).

In an embodiment, the reader 130 toggles into the awake mode periodically. In another embodiment, the reader 130 toggles into the awake mode when the reader 130 receives signals B from one or more animal tags 120. In another embodiment, the reader 130 toggles into the awake mode when the reader 130 receives instructions from the data manager 140. For example, the reader 130 may toggle into the awake mode when the reader 130 receives instructions to broadcast a query or a message to one or more animal tags 120. In an embodiment, the reader 130 toggles into the dormant mode after a predetermined period of time elapses.

The reader 130 may relay the data obtained from one or more tags 120 to the data storage manager 140. For example, the reader 130 may provide a unique tag identifier 120 and a beacon counter value obtained from the animal tag 120 to the data manager 140. In some embodiments, the reader 130 transmits the information contained in the radio signals B to the data storage manager 140 when the reader 130 receives the radio signals B. In other embodiments, the reader 130 may store the information for subsequent retrieval by the data storage manager 140 or an intermediary reader (e.g., see reader 845 of FIG. 3).

In an embodiment, the reader 130 may relay the data when toggled into the awake mode. In an embodiment, the reader 130 toggles into the awake mode in response to a request from the data manager 140 or a mobile reader. In an embodiment, the reader 130 toggles into the awake mode when the reader 130 receives the data from the tag 120. In an embodiment, the reader 130 toggles into the awake mode at predetermined intervals.

In some embodiments, the reader 130 is configured to transmit information back to the tag 120 via radio signals C. In such embodiments, the tags 120 may be configured to listen for a message C from the reader 130 (e.g., remain in the awake mode) before toggling to the dormant mode. In an embodiment, the reader 130 may relay communication from the data manager 140 to one or more animal tags 120. For example, the reader 130 may be configured to send new operating parameters (e.g., transmission intervals, toggle intervals, transmission power levels, etc.) to the tag 120. In an embodiment, the reader 130 may be configured to relay communication to a subset of the animal tags 120.

For example, in an embodiment, the reader 130 may store one or more messages from the data manager 140 for transmission to a recipient tag 120 when the recipient tag 120 checks in with the reader 130. In another embodiment, the reader 130 may broadcast one or more messages addressed to a recipient tag 120 until the recipient tag 120 indicates receipt. In another embodiment, the reader 130 may broadcast instructions to be applied universally to all animal tags. For example, in an embodiment, the reader 130 may broadcast instructions to extend or shorten a toggle (i.e., or wake up) interval for all tags (e.g., prior to or after shipping or storage).

In an embodiment, the reader 130 is configured to communicate with the data manager 140 or a mobile reader over a network, such as a LAN, a WAN, or the Internet. In another embodiment, the reader 130 is configured to communicate with the data manager 140 directly through a cabled or wireless connection. In another embodiment, the reader 130 communicates with an intermediary component, which communicates with the data manager 140. In other embodiments, however, the reader 130 may communicate with the data manager 140 using any desired communications coupling.

Proximity Sensing

Figure 2:
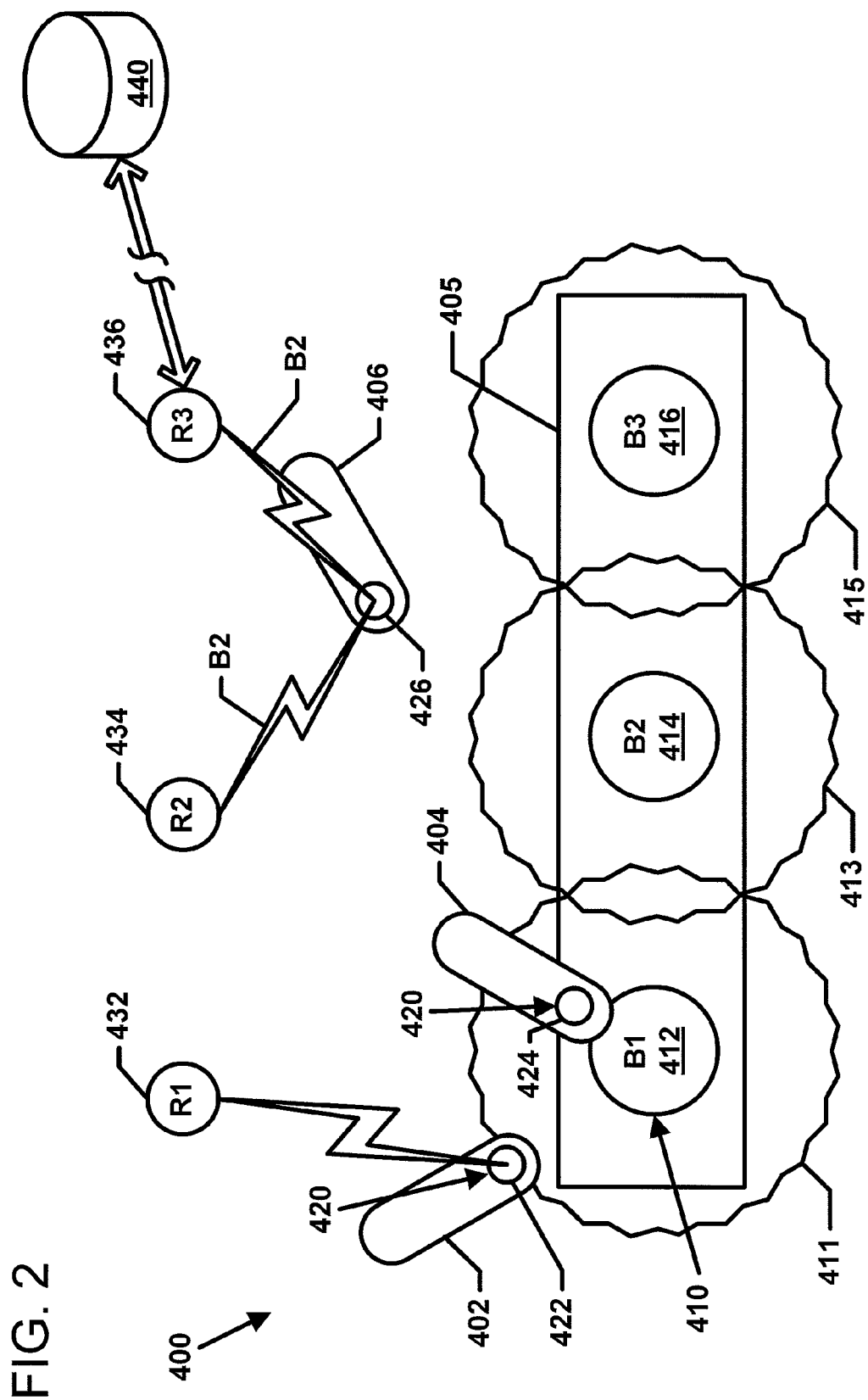
FIG. 2 is a schematic block diagram of an animal management system for tracking animals (e.g., livestock) over an area (e.g., a feed lot, a pen, a pasture, a chute, or other location where tagged animals reside or are kept) and managing information about one or more of the animals in accordance with the principles of the present disclosure.

FIG. 2 is a schematic block diagram of an animal management system 400 for tracking animals (e.g., livestock) over an area (e.g., a feed lot, a barn, a pen, a pasture, a chute, a milking parlor, or other location where tagged animals may be kept). For example, the animal management system 400 may facilitate monitoring locations which an animal frequents, times spent at locations or activities, or other animals with which an animal interacts. The animal management system 400 also may facilitate obtaining, analyzing, and/or storing information about one or more of the animals being tracked.

The animal system 400 includes one or more beacons 410, one or more animal tags 420, and one or more readers 430. The animal management system 400 includes a plurality of beacons 410, such as beacons 2000 of FIG. 5. The beacons 420 may be arranged about a trough 405 or another location of interest. In general, each beacon 410 periodically or continuously broadcasts a message over a range. In an embodiment, each beacon 410 broadcast over a generally circular or cylindrical area (see ranges 411, 413, 415 of FIG. 2). In another embodiment, the range of one or more beacons 410 may be directed or oriented as appropriate.

In an embodiment, a sufficient number of beacons 410 may be arranged about the trough 405 so that the range of each beacon 410 may overlap with adjacent beacons 410 to provide coverage over the entire trough 405. In an embodiment, the beacons 410 are separated by a distance equal to about twice the radius of the range. In another embodiment, the beacons 410 may be located further away or closer together. The message broadcast by the beacons 410 generally indicates the recipient is located in proximity of the trough 405.

Figure 6:
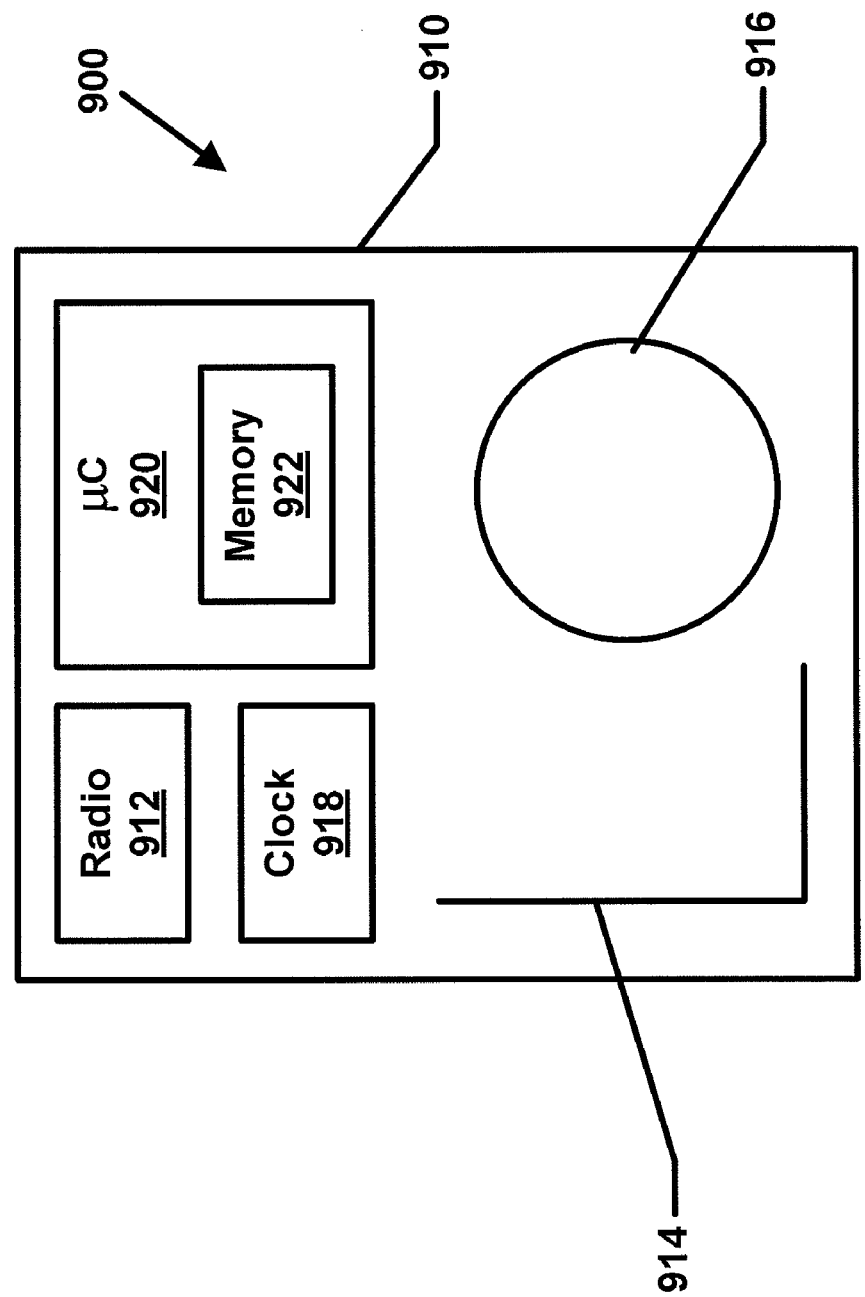
FIG. 6 is a schematic block diagram of an example animal tag that may be utilized in any of the animal management system disclosed herein in accordance with the principles of the present disclosure.

An animal tag (e.g., an ear tag, an implantable tag, etc.) 420, such as animal tag 900 of FIG. 6, is coupled to each animal to be tracked. In an embodiment, each tag 420 keeps track of from which type of beacons 410 the tag 420 receives radio signals. In an embodiment, each tag 420 tracks the length of time the tag 420 is located in proximity to a particular type beacon 410 (e.g., the time over which the animal receives the radio signals from that type of beacon) and hence the time the tag 420 is located within the area of interest. In another embodiment, each tag 420 tracks a length of time the tag 420 is located in proximity to a particular beacon 410. In an embodiment, each tag 420 tracks the number of times the tag 420 visits a beacon. The tags 420 report the tracked information to one or more of the readers 430 that are arranged throughout the area. The readers 430 forward the information to a data storage device 440, such as a computer database or other storage medium.

In the example shown in FIG. 2, a first animal 402 is equipped with a first tag 422, a second animal 404 is equipped with a second tag 424, and a third animal 406 is equipped with a third tag 426. Each tag 422, 424, 426 tracks the proximity of its respective animal to one of three beacons 412, 414, 416. In other embodiments, greater or fewer animals may be tracked at greater or fewer beacons. In FIG. 2, three readers 432, 434, 436 are arranged to communicate with the tags 422, 424, 426 and the data manager 440. In other embodiments, greater or fewer readers 430 and/or data managers 440 may be installed.

In an embodiment, all of the beacons 412, 414, 416 represent the same location of interest (e.g., trough) 405. In another embodiment, however, each beacon 412, 414, 416 may represent a different location of interest. For example, the first beacon 412 may represent a first portion of a trough 405 at which a first type of food is kept, the second beacon 414 may represent a second portion of a trough 405 at which a second type of food is kept, and the third beacon 416 may represent a third portion of the trough 405 at which a third type of food is kept.

Figure 3:
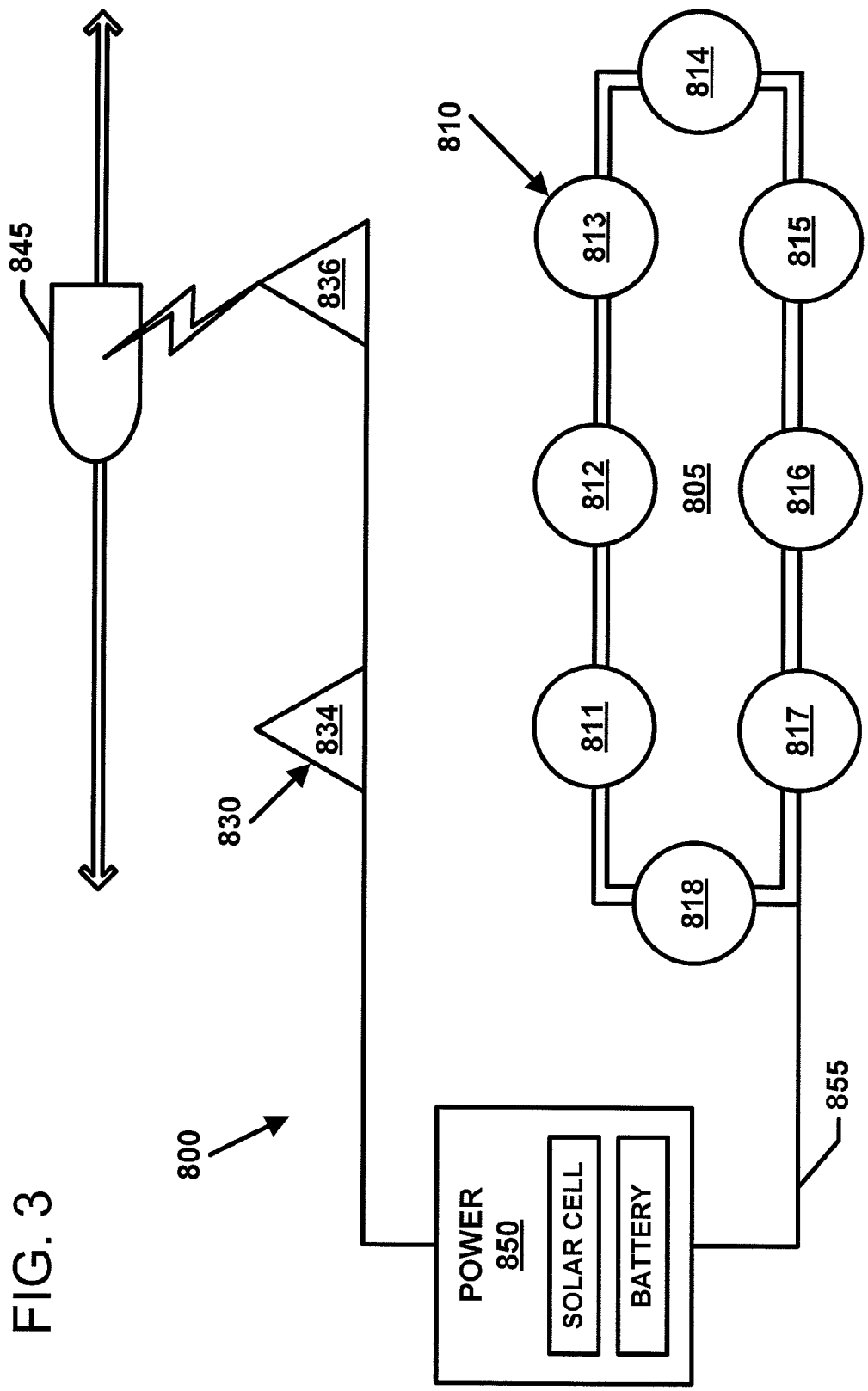
FIG. 3 is a schematic block diagram of an animal management system for tracking animals over an area including multiple beacons arranged around a structure of interest, a power source for the beacons, a reader, and a mobile reader in accordance with the principles of the present disclosure.

The principles of the disclosure can be further understood by walking through an example application. FIG. 3 is a schematic block diagram of an animal management system 800 for tracking animals over an area. The animal management system includes beacons 810 arranged on a trough 805, animal tags (not shown) coupled to mobile animals, and readers 830 arranged throughout the area. For ease in viewing, the animals to be tracked and the animal tags are not shown.

In the example shown in FIG. 3, the beacons 810 are powered by a power source 850. In an embodiment, the power source 850 includes a solar cell. In another embodiment, the power source 850 may include a battery. In another embodiment, the power source 850 may include a generator (not shown). In another embodiment, each beacon 810 may obtain power from a personal power source (not shown). In other embodiments, however, any suitable power source may be utilized to energize the beacons 810.

In an embodiment, one or more of the beacons 810 are coupled to the power source 850 via a wire or cable 855. For example, the beacons 810 may be coupled to the power source 850 via a cable 855 including a live wire and a grounding wire. In another embodiment, a greater number of wires may be provided. In an embodiment, a first subset of the beacons 810 are coupled to the power source 850 and a second subset of the beacons 810 are coupled to another power source (not shown). In another embodiment, the beacons 810 are wirelessly coupled to the power source 850. In an embodiment, the beacons 810 are connected in series. In another embodiment, the beacons 810 are connected in parallel.

In some embodiments, the beacons 810 are configured to radiate radio signals in a predetermined direction. In such embodiments, the beacons 810 may be oriented such that the beacons 810 broadcast signals only within a specified range. For example, the beacons 810 may be oriented to broadcast signals only within an area substantially contained within the perimeter of the trough 805 or other area of interest. In other embodiments, shields (not shown) may be provided around the trough 805 to facilitate shaping the broadcast range of the beacons 810.

In other embodiments, multiple beacons 810 may be arranged at spaced intervals along the trough 805 or other area of interest. In an embodiment, a range of about two to about twenty beacons 810 may be arranged along the wire or cable 855. In an embodiment, a range of about eight to about ten beacons 810 may be arranged along the wire or cable 855.

In an embodiment, the beacons 810 are arranged so that the broadcast ranges of the beacons 810 touch or overlap to provide coverage over substantially the entire area of interest. In an embodiment, the broadcast ranges of the beacons 810 may be shortened to provide one or more small ranges by loading the beacons 810 with resistors. For example, resistors may be added to each beacon 810 (e.g., see the adjustor 2013 of beacon 2000 of FIG. 5).

In an embodiment, the beacons 810 are spaced at regular intervals along the trough 805 or other area of interest. For example, in an embodiment, the beacons 810 may be spaced at intervals of twice the broadcast radius of the beacons 810. In an embodiment, the beacons 810 may be spaced at intervals of less than twice the broadcast radius of the beacons 810. In an embodiment, the beacons 810 may be spaced at intervals ranging from about two feet to about fifty feet. In an embodiment, the beacons 810 may be spaced at intervals of about twenty feet. In an embodiment, the beacons 810 may be spaced at intervals of about ten feet.

In the example shown in FIG. 3, eight beacons 811-818 are spaced evenly along a wire 855 that is wrapped around a perimeter of the trough 805. In other embodiments, greater or fewer beacons 810 may be arranged on the trough 805. The wire 855 connects the beacons 811-818 to the power source 850. The beacons 811-818 of FIG. 3 are positioned to generate broadcast fields extending outwardly a short distance from the perimeter of the trough 805. In other embodiments, however, the beacons 810 may be positioned to generate broadcast fields entirely contained within the perimeter of the trough 805.

In an embodiment, the readers 830 obtain power from the same power source 850 as the beacons 810. In another embodiment, the readers 830 obtain power from a separate power source (not shown). In an embodiment, the power source (not shown) is a solar cell. In other embodiments, each reader 830 obtains power from its own personal power source.

In some embodiments, the readers 830 are communicatively coupled to a data manager (not shown) via a cable (e.g., USB connection) or wireless connection. In other embodiments, however, an intermediary reader 845 relays communication between the readers 830 and the data manager 840. In an embodiment, the intermediary reader 845 is mobile. For example, the intermediary reader 845 may circulate amongst the readers 830 and ask for updates. The intermediary reader 845 may store these updates from the readers 830 for subsequent communication to the data manager 840.

The intermediary reader 845 may be a notebook computer, a handheld computing device (e.g., a mobile smartphone), or another data processing device capable of moving about the area being monitored and communicating with the readers 830. In an embodiment, the intermediary reader 845 may be coupled to a truck, tractor, or other vehicle that is driven through the area to be monitored regularly. In another embodiment, the intermediary reader 845 is coupled to a track along which the intermediary reader 845 may be circulated at periodic intervals.

Figure 4:
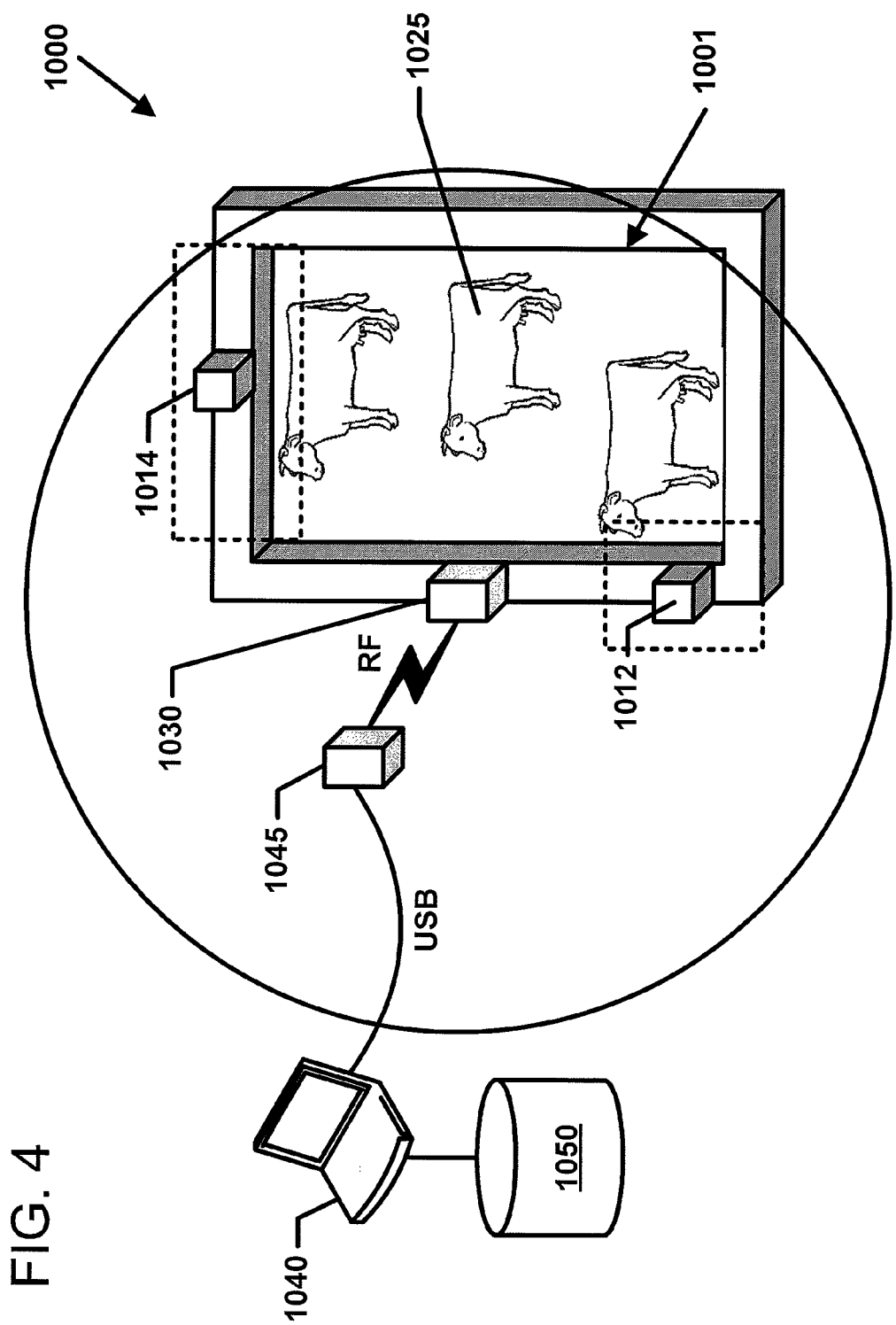
FIG. 4 is a schematic diagram of another example animal management system for monitoring tagged animals within a feed lot or other area of interest in accordance with the principles of the present disclosure.

FIG. 4 is a schematic diagram of another example animal management system 1000 for monitoring tagged animals within a feed lot or other such area. The management system 1000 includes a food and a water beacon 1012, 1014, respectively, arranged within a feed lot 1001 in which tagged cows 1025 are contained. The tags (not shown) on the animals 1025 track the amount of time spent within range of each beacon 1012, 1014.

The animal management system 1000 also includes one or more fixed readers 1030 adjacent the feed lot 1001, a data manager 1040, a data storage device 1050, and one or more mobile readers 1045. The fixed reader 1030 periodically polls for status updates from nearby tags and stores the updates. The mobile reader 1045 periodically enters communication range with the fixed reader 1030 and acquires the tag updates. The mobile reader 1045 provides the reports to the data manager (e.g., a laptop computer or other computing device) for processing and storage in the data storage device 1050.

Components

Beacon

Figure 5:
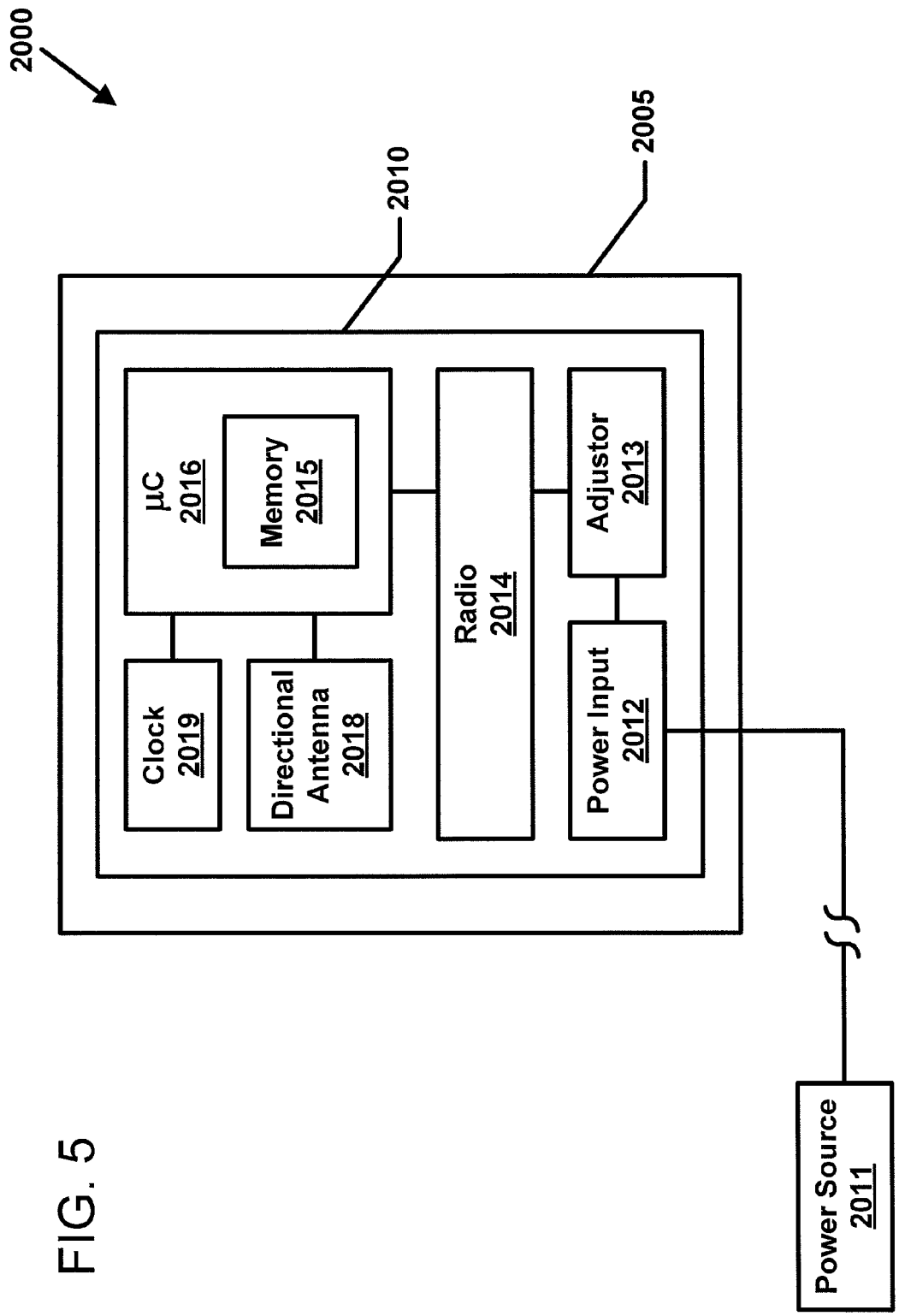
FIG. 5 is a schematic block diagram of an example beacon that may be utilized with any animal management system disclosed herein in accordance with the principles of the present disclosure.

FIG. 5 is a schematic block diagram of an example beacon 2000 that may be utilized with any animal management system disclosed herein. The beacon 2000 includes a radio transceiver 2014, a microcontroller 2016, and an antenna 2018. In an embodiment, the beacon 2000 also includes a clock 2019 (e.g., a crystal) with which the microcontroller 2016 may time periodic intervals at which radio signals, such as radio signals A of FIG. 1, are to be broadcast from the antenna 2018. In an embodiment, the antenna 2018 includes a directional antenna. In another embodiment, the antenna 2018 may include any suitable antenna. In an embodiment, the microcontroller 2016 contains memory 2015 storing information to be broadcast on the radio signals.

In an embodiment, the beacon 2000 may receive information from a data manager (e.g., data manager 140 of FIG. 1) to be distributed to one or more animal tags, such as animal tags 120 of FIG. 1. Advantageously, broadcasting information to animal tags via the beacon 2000 may allow quick distribution of the information. In an embodiment, broadcasting the information via one or more beacons 2000 provides the information to the tags without waiting for individual tags to check in. For example, the beacon 2000 may distribute instructions to the tags to spend less time in the dormant mode per toggle cycle.

In some embodiments, the beacon 2000 receives power from an external power source 2011. In an embodiment, the beacon 2000 receives power from the external power source 2011 at a power input 2012, which supplies the power to the remaining beacon components. In an embodiment, the external power source 2011 is a battery. In another embodiment, the external power source 2011 is a solar cell. In another embodiment, the external power source is a generator. In other embodiments, the beacon 2000 includes an internal power source (not shown), such as a battery, a solar cell, or other such component.

In an embodiment, the beacon 2000 includes an adjustor component 2013 to amplify or decrease power before distributing the power within the beacon 2000. For example, the adjustor component 2013 may include a resistor to load down the beacon 2000, thereby decreasing the range of the beacon 2000. Advantageously, decreasing the range of the beacon 2000 may aid in controlling the size and/or shape of the range of the beacon 2000. In another embodiment, the adjustor component 2013 may facilitate power gain, thereby amplifying the range of the beacon 2000. Advantageously, amplifying the range of the beacon 2000 may facilitate communication with a reader and/or a data manager.

In an embodiment, the components of the beacon 2000 are arranged on a circuit board 2010 or other support structure. In some embodiments, the beacon components are sealed within an outer housing 2005. In an embodiment, the outer housing 2005 protects the beacon components from environmental conditions, such as precipitation, dust, dirt, wind, sun exposure, and animals (e.g., animals being tracked, rodents, insects, and/or other pests). In an embodiment, the outer housing 2005 may be molded (e.g., injection-molded) over the beacon components. In other embodiments, the housing 2005 only contains the beacon components, but does not protect the components from environmental conditions.

Tag

FIG. 6 is a schematic block diagram of an example animal tag 900 that may be utilized in any animal management system disclosed herein. The animal tag 900 includes a housing 910 containing a radio transceiver 912, an antenna 914, and a battery 916. In general, the transceiver obtains power from the battery 916 to broadcast a radio signal through the antenna 914. An example of a suitable radio transceiver includes the nRF24L01 Single Chip 2.4 GHz Transceiver from Nordic Semiconductor of Trondheim, Norway. In an embodiment, the antenna 914 includes an inverted-L antenna. In other embodiments, however, any suitable antenna 914 may be used to broadcast the radio signals.

The housing 910 also may contain a clock 918 and a microcontroller 920 including memory 922. The memory 922 of the microcontroller 920 may store operating instructions, operating parameters, and data. The memory 922 may include volatile (e.g., RAM) and non-volatile (e.g., flash) memory. For example, in an embodiment, the memory 922 may store a unique identifier for each tag, an activity history (e.g., a beacon counter). In another embodiment, the memory 922 stores an operating parameter indicating a toggle interval for the animal tag 900 based on a number of clock cycles 918. An example of a suitable clock 918 includes a 16 MHz crystal.

In an embodiment, the microcontroller 920 implements a data processing system that receives data from beacons and/or readers, analyzes the data, stores the data in the memory 922, and transmits reply data as appropriate. In an embodiment, the data processing system is hardwired within the microcontroller 920. In another embodiment, the data processing system is implemented via software installed on the microcontroller 920. In an embodiment, the microcontroller 920 also may include matching circuitry to tune the antenna 914.

Figure 7:
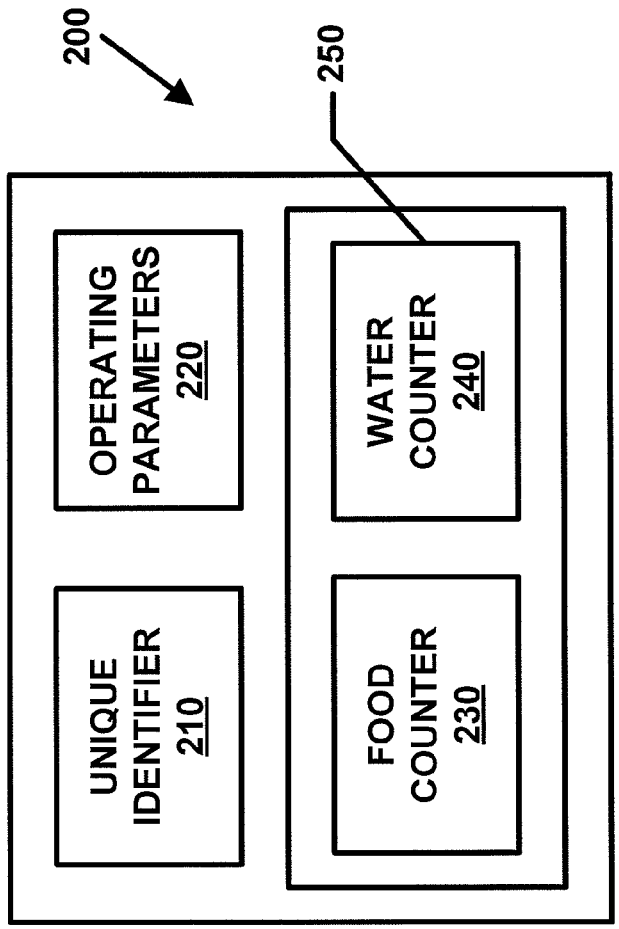
FIG. 7 is a schematic block diagram of a memory storage of the animal tag configured in accordance with the principles of the present disclosure.

FIG. 7 is a schematic block diagram of a memory storage 200 of an animal tag, such as animal tag 120 of FIG. 1. In an embodiment, the memory storage 200 of the tag can store a unique identifier 210 with which the tag 120 may identify itself to the reader 130 or any other device. The memory 200 also can include operating parameters 220, such as a transmission power level or a toggle interval according to which the tag 120 cycles between the dormant and awake modes. Other non-limiting examples of operating parameters include a threshold power level required before radio signals B will be transmitted, a transmission rate, and the frequency at which radio signals B should be transmitted.

The memory storage 200 also generally includes an activity log 250. In an embodiment, the activity log 250 records events occurring throughout a predetermined period of time (e.g., daily, weekly, monthly, etc.). In an embodiment, the activity log 250 records events occurring throughout each day. In an embodiment, the activity log 250 tracks which locations are visited and/or in which activities an animal engages over the predetermined period of time. In an embodiment, the activity log 250 tracks a length of time spent at each location and/or engaged in each activity over the predetermined period of time. In an embodiment, the activity log 250 tracks a number of visits to a location or number of times in which the animal engages in the activity.

In an embodiment, the activity log 250 includes a beacon counter. In an embodiment, the activity log 250 includes two or more beacon counters. In an embodiment, the beacon counter tracks the length of time the tag 120 remains in proximity to a beacon, such as beacon 110 of FIG. 1. In an embodiment, the beacon counter tracks the number of times the tag 120 enters into proximity of the beacon. In other embodiments, the activity log 250 may include one or more beacon counters. In an embodiment, the activity log 250 may include different types of beacon counters.

In the example shown in FIG. 7, the activity log 250 includes a first counter 230 and a second counter 240. In an embodiment, the first counter 230 is a food counter and the second counter 240 is a water counter. In an embodiment, the food and water counters 230, 240 track the length of time the tag 120 remains in proximity to a first beacon at a food trough and a second beacon at a water trough, respectively, as will be disclosed in greater detail herein. In an embodiment, the food and water counters 230, 240 track the number of times the tag 120 enters into proximity of the food beacon and the water beacon, respectively. In other embodiments, the activity log 250 may include other types of beacon counters.

In still other embodiments, the memory storage 200 also may store other information indicating one or more activities of the tag 120, such as receiving radio signals from a beacon 110, receiving radio signals from a reader 130, and/or transmitting radio signals.

Figure 8:
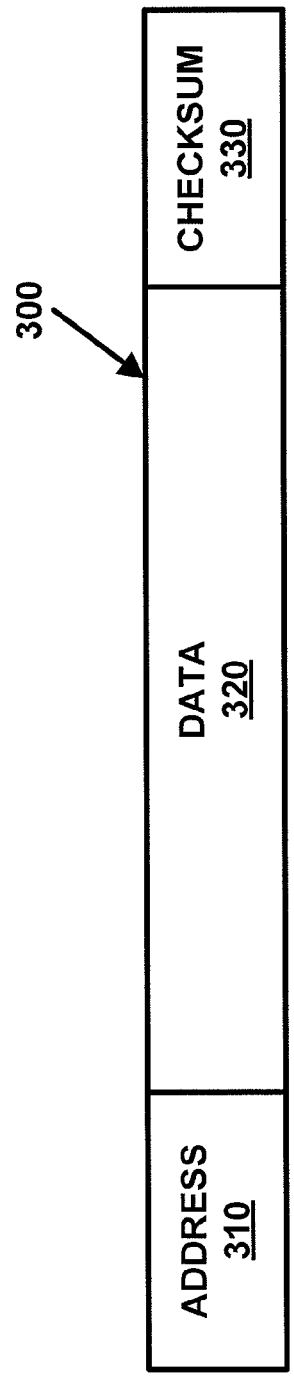
FIG. 8 is a schematic block diagram indicating an example format for a message transmitted by a beacon, a tag, or a reader of an animal management system in accordance with the principles of the present disclosure.

FIG. 8 is a schematic block diagram indicating an example format 300 for a message transmitted via one of the radio signals A, B, C by a beacon 110, a tag 120, or a reader 130, respectively. The message format 300 may be used to communicate between any of the components of any animal management system disclosed herein. The message format 300 shown in FIG. 8 includes an address field 310, at least a first data field 320, and a checksum field 330. In other embodiments, the message format 300 may include additional fields.

In general, the address field 310 indicates the type of device sending the radio signal. For example, the address field 310 may indicate whether the message is provided by a beacon 110, a tag 120, or a reader 130 (FIG. 1). Different types of devices may provide messages over different radio frequencies. Accordingly, the address field 310 may indicate over which radio frequency a response should be sent. In an embodiment, the address field 310 may indicate a unique identity of the device sending the radio signal (e.g., a unique animal tag 120, a unique beacon 110, or a unique reader 130).

The data field 320 may contain information to be transmitted from the sending device to the receiving device. For example, the data field 320 of a message transmitted from a beacon 110 may contain information indicating the type or location of beacon 110 sending the message. The data field 320 of a message transmitted by a tag 120 may include an activity history (e.g., a beacon counter). The data field 320 of a message transmitted by a reader 130 may include information indicating an intended recipient tag 120 and a change in operating parameters (e.g., transmission intervals).

In some embodiments, the data field 320 includes a plurality of data fields. In an embodiment, the data field 320 includes a Wake Up Interval field, which may specify the duration of the dormant mode of the recipient device, a Radio Power Level field, which may specify the transmission power of the recipient device, and a Control Register, which may include any value the sending device wants to receive from the recipient device. In another embodiment, the data field 320 may include information to be stored at the recipient device. For example, non-limiting embodiments of the data field 320 may include a description of a tagged animal, an activity history, and/or an event history.

The checksum 330 provides a redundancy check to enable the recipient to determine whether the message is corrupted or incomplete. In addition, start and end codes (not shown) may be added to the message to indicate a beginning and end of the message.

Figure 9:
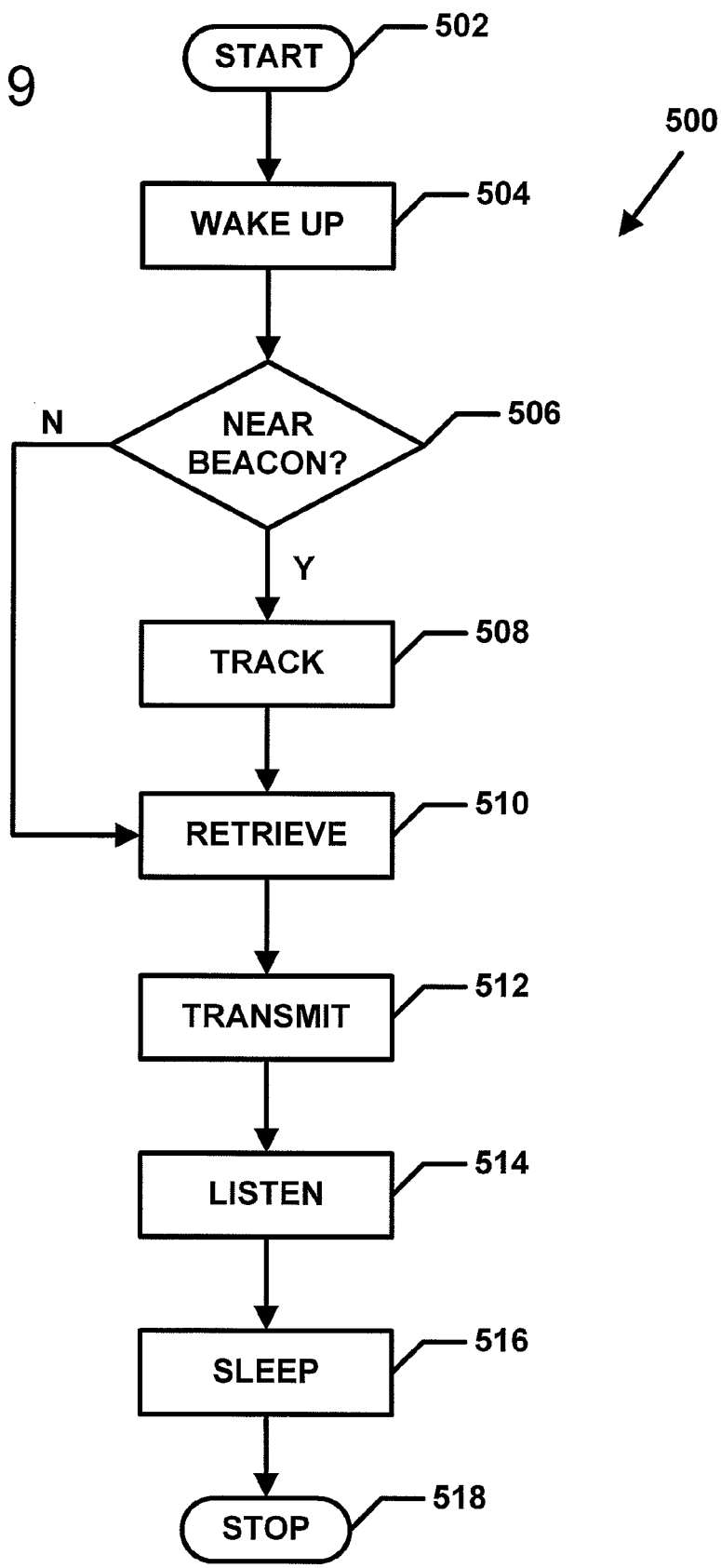
FIG. 9 is a flowchart illustrating an operational flow of an example monitoring process by which an animal tag may track a length of time the animal tag spends in proximity to an area of interest (e.g., a trough) in accordance with the principles of the present disclosure.

FIG. 9 is a flowchart illustrating an operational flow of an example monitoring process 500 by which an animal tag, such as animal tags 422, 424, 426, may track the length of time spent in proximity to a trough, such as trough 405 of FIG. 2. The monitoring process 500 initializes and begins at a start module 502 and proceeds to a wake operation 504. The wake operation 504 toggles the animal tag from a dormant mode to an awake mode.

A determination module 506 listens for a predetermined period of time for radio signals from a beacon. If the determination module 506 determines the animal tag receives radio signals from a beacon during the predetermined time, then a track operation 508 increments a counter stored on the animal tag. In an embodiment, the animal tag stores different types of counters for different types of beacons (e.g., food counters for beacons on food troughs and water counters for beacons on water troughs). If the determination module 506 determines the animal tag does not receive radio signals from a beacon during the predetermined time, then the monitoring process 500 proceeds to a retrieve operation 510.

The retrieve operation 510 accesses the memory of the animal tag and obtains information to be transmitted to any reader that may be in range. In an embodiment, the retrieve operation 510 accesses a unique identification of the animal tag and the counter. A transmit operation 512 broadcasts the retrieved information. In an embodiment, the transmit operation 512 broadcasts the unique identification number of the tag and the value of the counter.

A listen operation 514 analyzes all radio signals received for a predetermined period of time after performance of the transmit operation 512 to determine whether any of the signals contain a message for the animal tag. For example, the listen operation 514 may analyze the signals to determine whether the signals are addressed to the animal tag. In an embodiment, the listen operation 514 checks a data field, such as data field 320, of each message for a unique tag identifier. In an embodiment, the listen operation 514 analyzes all incoming messages for a period of about 2-3 milliseconds.

The readers generally relay to the animal tags messages from the data manager. For example, the readers may relay messages instructing a tag to change one or more of the operating parameters of the tag. In an embodiment, the listen operation 514 may receive a message instructing the tag to remain in the dormant mode for an extended period of time (e.g., during shipping and/or storage). In another embodiment, the listen operation 514 may receive a message instructing the tag to reset a counter when the counter information has been received at a data storage device.

A sleep operation 516 toggles the animal tag to the dormant mode to conserve power. The monitoring process 500 completes and ends at a stop module 518. In an embodiment, the monitoring process 500 initiates when the animal tag receives a query from a reader. For example, the first animal tag 422 of FIG. 2 may wake up (504) when the reader R1 432 queries the first animal tag 422. The first animal tag 422 determines it is located in proximity to a beacon (506), increments a counter (508), accesses its memory (510), and broadcasts data (e.g., the values of the counter and a unique identifier) obtained from memory (512) to be received by any reader within range.

In another embodiment, the monitoring process 500 occurs at periodic time intervals, regardless of the location of the animal tag. For example, the third animal tag 426 of FIG. 2 wakes up (504) after a predetermined interval, determines it is not located in proximity to a beacon (506), accesses its memory (510), and broadcasts any data (e.g., a counter value) obtained from memory (512). In the example shown in FIG. 2, the animal tag 426 is located within range of both the second and third readers 434, 436, which each receive the radio signals B2 sent from the third animal tag 426.

Reader

Figure 10:
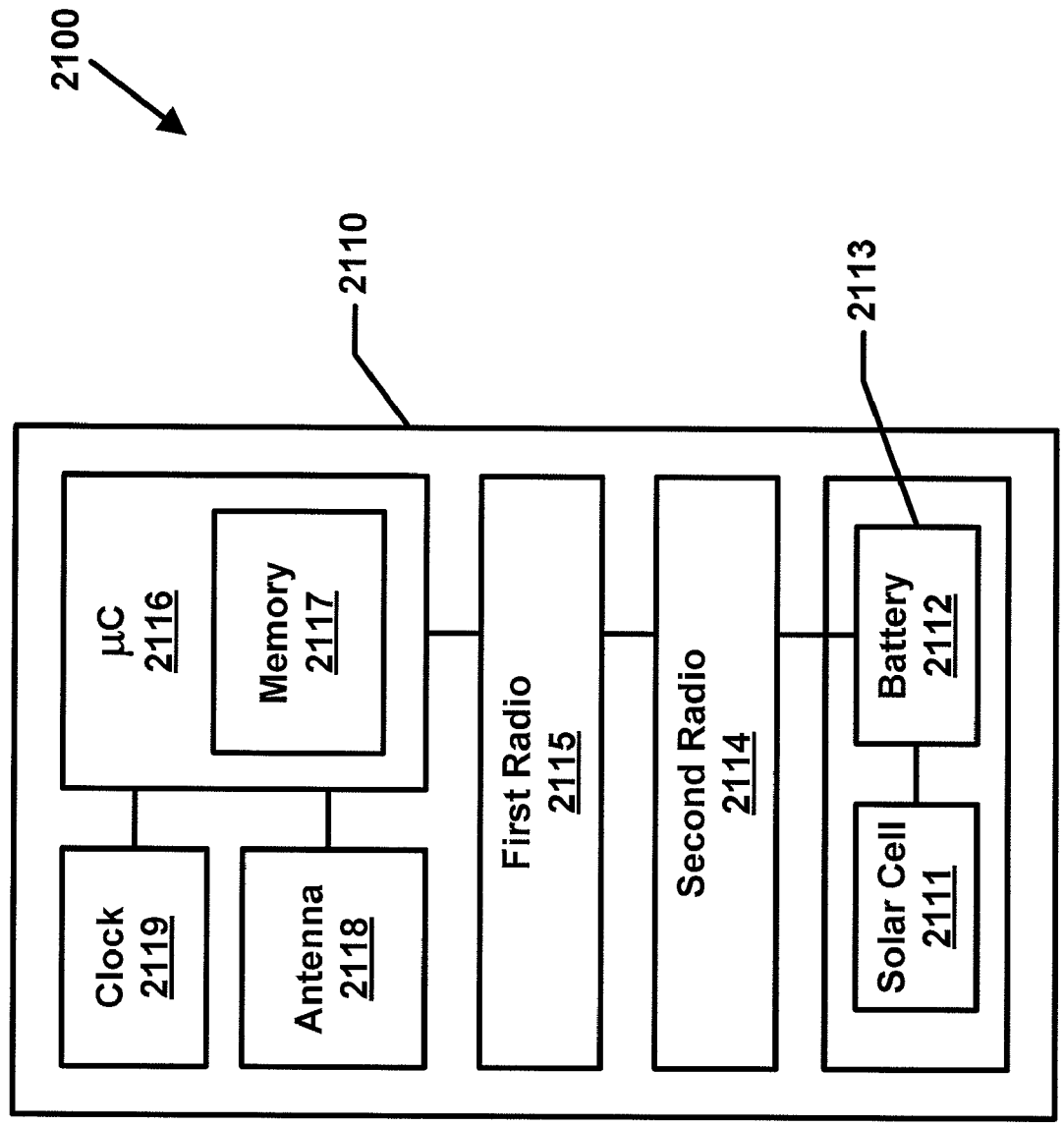
FIG. 10 is a schematic block diagram of an example reader that may be utilized with any animal management system disclosed herein in accordance with the principles of the present disclosure.

FIG. 10 is a schematic block diagram of an example reader 2100 that may be utilized with any animal management system disclosed herein. The reader 2100 includes a first radio transceiver 2114, a microcontroller 2116, and an antenna 2118. In an embodiment, the antenna 2118 includes a directional antenna. In another embodiment, the antenna 2118 may include any suitable antenna. In an embodiment, the microcontroller 2116 contains memory 2117 storing information to be broadcast via radio signal, such as radio signals C of FIG. 1. In an embodiment, the reader 2100 also includes a clock 2119 (e.g., a crystal) with which the microcontroller 2116 may time periodic intervals.

In some embodiments, the reader 2100 tracks animal tags and communicates with the data manager or mobile reader using the first radio transceiver 2114. In an embodiment, the reader 2100 cycles between tracking tags and communicating with the data manager or mobile reader using the first radio transceiver. In another embodiment, communicating with the data manager or mobile reader receives priority and the reader 2100 only tracks animal tags with the first radio transceiver 2114 when no communication is being received from the data manager.

In other embodiments, however, the reader 2100 includes two or more radio transceivers. For example, the reader 2100 shown in FIG. 10 includes a second radio transceiver 2115. In an embodiment, the first radio transceiver 2114 communicates with animal tags (e.g., receives reports and distributes messages) and the second radio transceiver 2115 communicates with the data manager (e.g., forwards reports and receives messages). In an embodiment, the first radio transceiver 2114 is configured to broadcast radio signals on a first frequency and the second radio transceiver 2115 is configured to broadcast radio signals on a second frequency. In an embodiment, the first radio transceiver 2114 broadcasts on a higher frequency than the second radio transceiver 2115.

In some embodiments, the reader 2100 includes an internal power source 2113. In an embodiment, the internal power source 2113 includes a battery 2112. In an embodiment, the internal power source 2113 includes a solar cell 2111 or generator. In an embodiment, the internal power source 2113 includes a combination of a battery 2112, a solar cell 2111, and/or another power source. In other embodiments, however, the reader 2100 is coupled to an external power source (not shown). In an embodiment, the reader 2100 may share a power source with one or more readers. In another embodiment, the reader 2100 may share a power source with one or more beacons.

Figure 11:
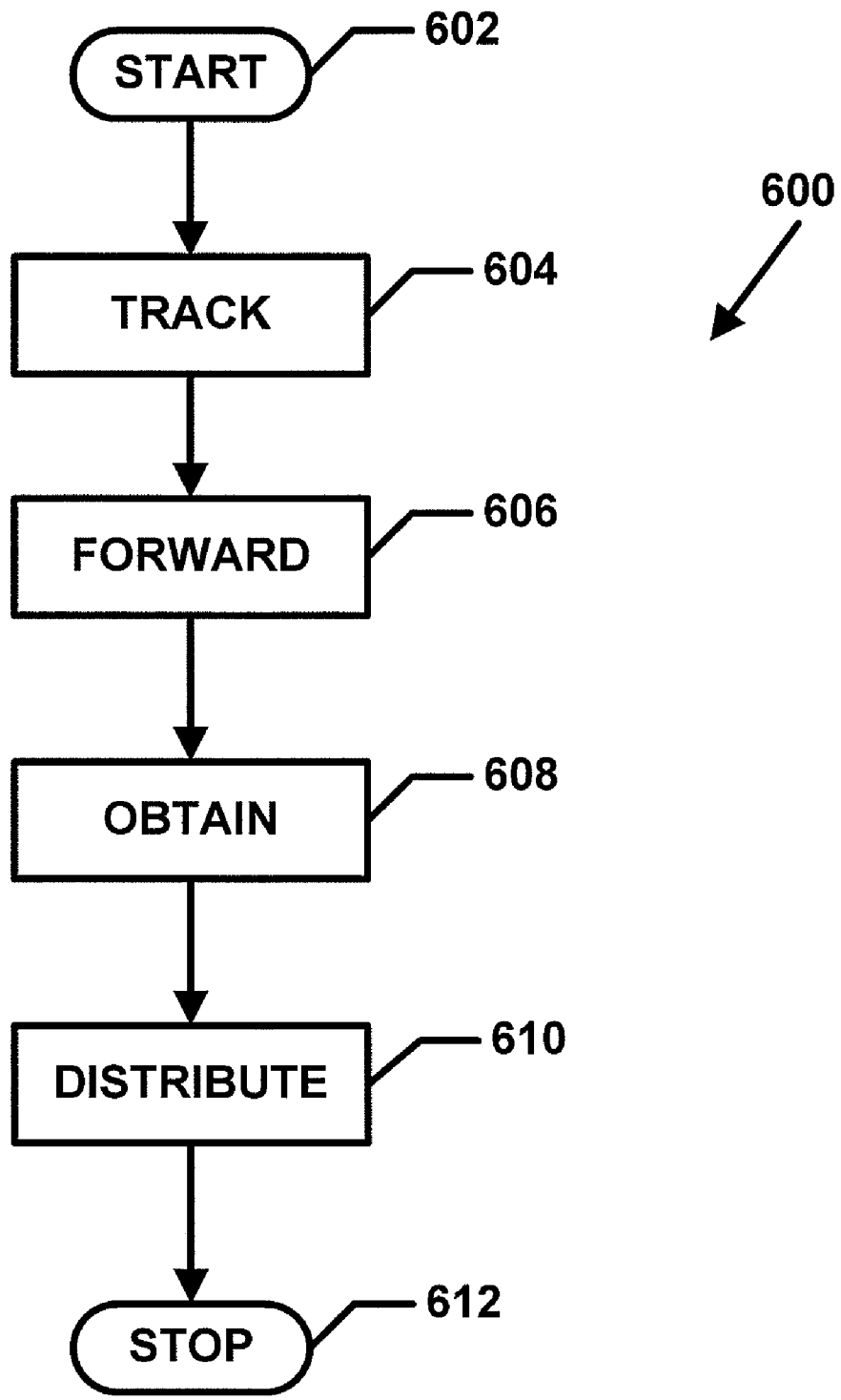
FIG. 11 is a flowchart illustrating an operational flow for an management process by which a reader communicates with one or more animal tags and a data manager or mobile reader in accordance with the principles of the present disclosure.

FIG. 11 is a flowchart illustrating an operational flow for a general management process 600 by which a reader tracks and manages radio signals from one or more animal tags. The management process 600 initializes and begins at a start module 602 and proceeds to a track operation 604. The track operation 604 receives radio signals from any animal tag that reports to the reader when located within the range of the reader. For example, in an embodiment, the track operation 604 may receive identity information and proximity information from the animal tag. In another embodiment, the track operation 604 may receive an activity history from the animal tag. In another embodiment, the track operation 604 may receive other information stored on the animal tag, such as a medical history, an event history, ownership information, etc.

A forward operation 606 sends to a data manager or mobile reader the information received from the animal tag in track operation 604. In an embodiment, the forward operation 606 sends the information in real time. In another embodiment, the forward operation 606 queues the information obtained from the animal tags and transmits the information at a later time. In an embodiment, the forward operation 606 transmits the information to the data manager or mobile reader at periodic intervals (every week, every day, every hour, every minute, etc.). In another embodiment, the forward operation 606 transmits the information to the data manager or mobile reader when a request to transmit is received from the data manager or mobile reader. In an embodiment, the forward operation 606 only sends the information if sufficient power is available to send the data completely.

An obtain operation 608 receives from the data manager or mobile reader any messages to be communicated to one or more animal tags. In an embodiment, the obtain operation 608 receives a message in response to forwarding information to the data manager or mobile reader. In another embodiment, the obtain operation 608 receives an unsolicited message. In an embodiment, the obtain operation 608 stores the message at the reader for distribution at a later time. In an embodiment, the obtain operation 608 queues the message obtained from the data manager or mobile reader. In an embodiment, the obtain operation 608 receives a message to be distributed to a specific recipient tag. In another embodiment, the obtain operation 608 receives a message to be distributed to a subset of the animal tags. In another embodiment, the obtain operation 608 receives a message to be distributed to all of the animal tags.

In some embodiments, the obtain operation 608 receives a message to change an operational parameter of the tag. For example, in an embodiment, the obtain operation 608 may receive a message for a recipient animal tag to increase or decrease a transmission power level. In another embodiment, the obtain operation 608 may receive a message for the recipient tag to delete all or part of the information stored in the tag's memory. In another embodiment, the obtain operation 608 may receive a message for the recipient tag to store additional information in the tag's memory.

A distribute operation 610 forwards to recipient tags any messages obtained from the data manager or mobile reader. In an embodiment, the distribute operation 610 forward messages as the messages are received. In another embodiment, the distribute operation 610 forwards a message intended for a recipient tag when the recipient tag reports to the reader. In another embodiment, the distribute operation 610 periodically forwards a message intended for a recipient tag. In an embodiment, the distribute operation 610 forwards the message until the recipient tag replies with receipt confirmation. In an embodiment, the distribute operation 610 only forwards the information if sufficient power is available to send a complete message. The management process completes and ends at stop module 612.

In an embodiment, the management process 600 may be implemented by a first radio transceiver of a reader, such as radio transceiver 2114 of reader 2100 of FIG. 10. In another embodiment, however, the management process 600 may be implemented by a first radio transceiver and a second radio transceiver of a reader, such as the first radio transceiver 2114 and the second radio transceiver 2115 of reader 2100 of FIG. 10. In an embodiment, the first radio transceiver 2114 implements the operations in which the reader communicates with an animal tag (e.g., the track operation 604 and the distribute operation 610 of FIG. 11) and the second radio transceiver 2115 implements the operations in which the reader communicates with the data manager (e.g., the forward operation 606 and the obtain operation 608 of FIG. 11).

Figure 12:
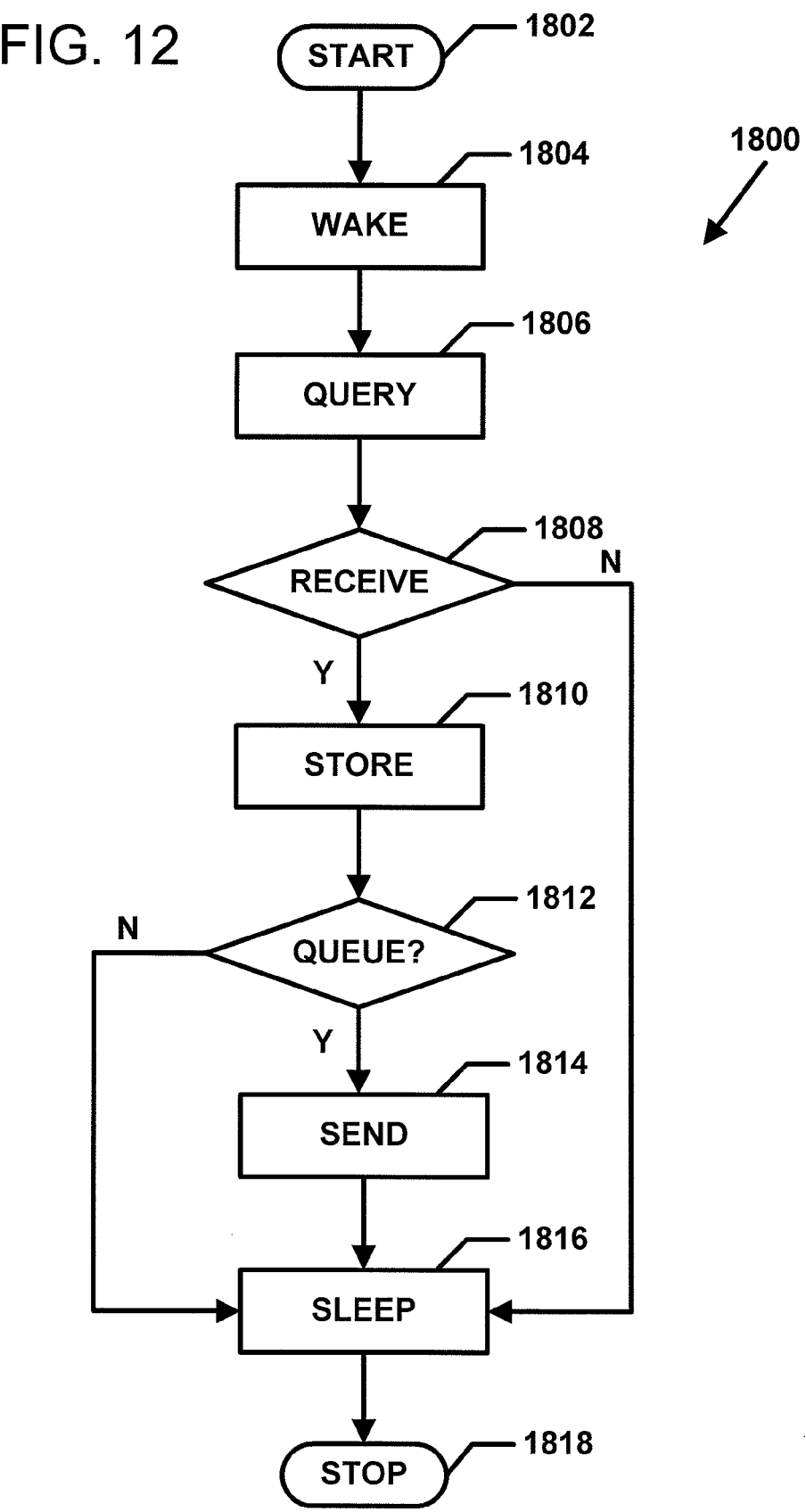
FIG. 12 is a flowchart illustrating an operational flow for a first management process implemented by a first radio transceiver of a reader in accordance with the principles of the present disclosure.

FIG. 12 is a flowchart illustrating an operational flow for a first management process 1800 implemented by a first radio transceiver of a reader. The first management process 1800 initializes and begins at a start module 1802 and proceeds to a wake operation 1804, which toggles the reader into an awake mode. In an embodiment, the wake operation 1804 occurs periodically. In an embodiment, the wake operation 1804 occurs when information is received from one or more of the animal tags. In another embodiment, the wake operation 1804 is not triggered by receipt of radio signals from an animal tag.

A query operation 1806 broadcasts radio signals from the reader over a predetermined range (see range 135 of reader 130 of FIG. 1). In an embodiment, the query operation 1806 broadcasts radio signals asking for status and/or proximity reports of nearby tags (e.g., tags within range of the reader). In another embodiment, the query operation 1806 broadcasts a radio signal directed to one or more individual tags 120 to ask for a status and/or proximity report.

A first determination module 1808 determines whether any response to the query (e.g., a status or proximity report from a tag) was received. If the first determination module 1808 determines a response was not received, then the first management process 1800 proceeds to a sleep operation 1816 that toggles the reader into a dormant mode. The first management process 1800 completes and ends at a stop module 1818. If the first determination module 1808 determines a response was received, however, then a store operation 1810 records the information in memory for later transmission to a data storage manager, such as data manager 440 of FIG. 2.

A second determination module 1812 determines whether instructions have been provided to the reader (e.g., from the data manager) to relay or distribute a message to one or more of the animal tags. For example, the second determination module 1812 may determine whether instructions have been provided to the reader to broadcast a message addressed to an animal tag that responded to a query. In an embodiment, the second determination module 1812 determines whether a message has been queued for distribution. If the second determination module 1812 determines instructions to relay a message have not been received by the reader, then the first management process 1800 proceeds to the sleep operation 1816, completes, and ends at the stop module 1818 as disclosed above.

If the second determination module 1812 determines instructions to relay a message have been received by the reader, however, then a send operation 1814 broadcasts the message within the range of the reader. In an embodiment, the send operation 1814 broadcasts a message including a unique identifier of a recipient tag. In some embodiments, the send operation 1814 is performed by multiple readers. In an embodiment, the send operation 1814 is performed by readers that did not receive the query response from the tag. For example, the send operation 1814 may be performed by readers located adjacent to the readers that received the response. The first management process 1800 proceeds to the sleep operation 1816 before ending at the stop module 1818 as disclosed above.

Figure 13:
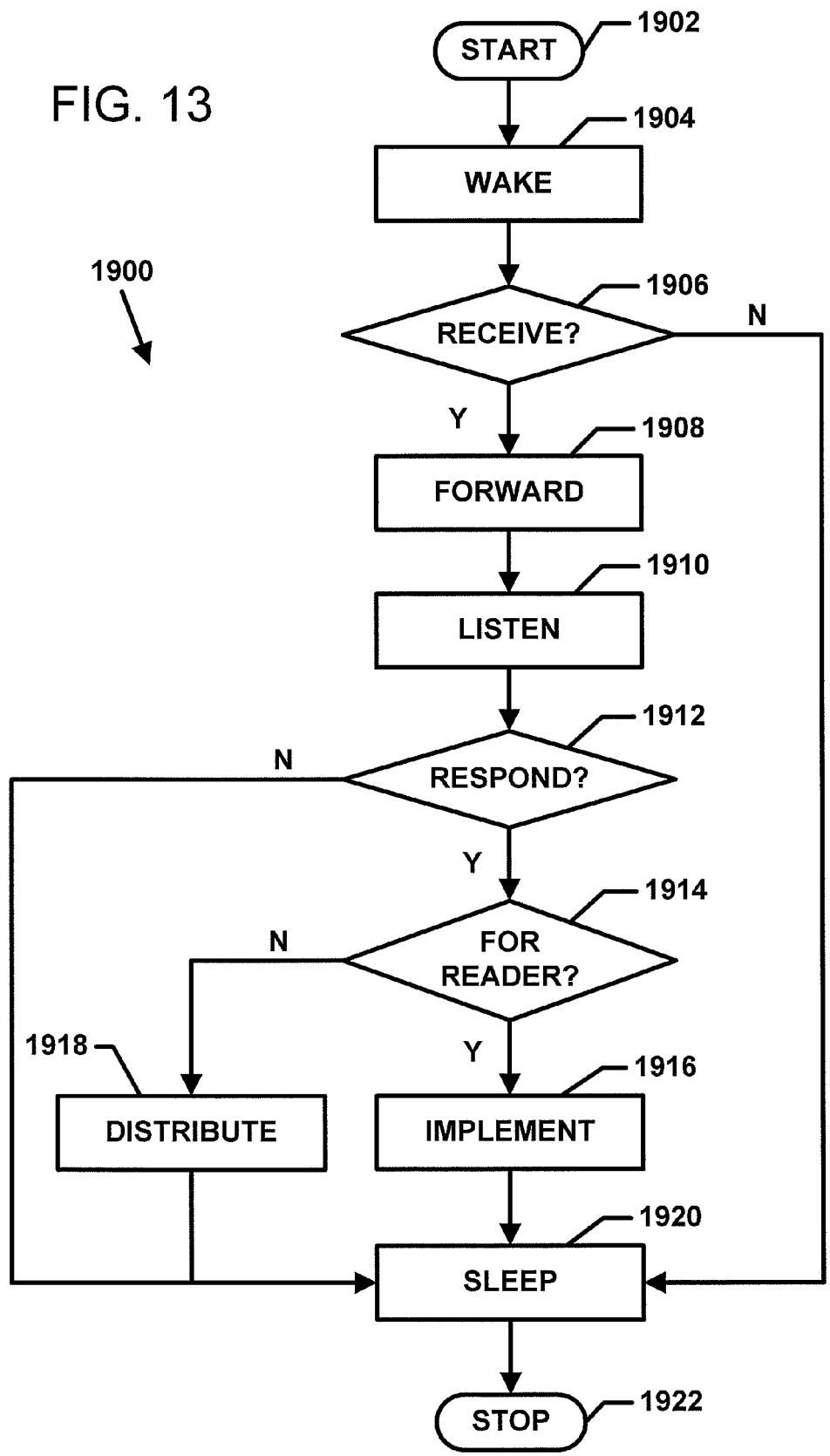
FIG. 13 is a flowchart illustrating an operational flow for a second management process implemented by a second radio transceiver of the reader in accordance with the principles of the present disclosure.

FIG. 13 is a flowchart illustrating an operational flow for a second management process 1900 implemented by a second radio transceiver of a reader. The second management process 1900 initializes and begins at a start module 1902 and proceeds to a wake operation 1904, which toggles the reader into an awake mode. In an embodiment, the wake operation 1904 occurs periodically. In another embodiment, the wake operation 1904 occurs when information is received from the data manager, a proxy of the data manager, a mobile reader, or one or more of the readers.

A first determination module 1906 determines whether to forward information obtained from an animal tag to the data manager. In an embodiment, the first determination module 1906 determines whether the data manager is within range of the reader. In another embodiment, the first determination module 1906 determines whether a proxy of the data manager (e.g., a mobile reader) is within range of the reader. In an embodiment, the first determination module 1906 determines whether radio signals have been received from the data manager or a mobile reader.

If the first determination module 1906 determines not to forward information to the data manager, then the second management process 1900 proceeds to a sleep operation 1920 that toggles the reader into a dormant mode. The first management process 1900 completes and ends at a stop module 1922. If the first determination module 1906 determines to forward information to the data manager, however, then a forward operation 1908 transmits the information to the data manager.

In an embodiment, the forward operation 1908 is implemented if the first determination module 1906 determines the data manager or mobile reader is within range of the reader. In another embodiment, the forward operation 1908 is implemented only if a request for information is received from the data manager, a proxy thereof, or a mobile reader. For example, another determination module (not shown) may determine whether instructions to transmit stored tag information have been provided by the data manager. If such instructions were not received, then the second management process 1900 would skip the forward operation 1908 and proceed to a listen operation 1910.

The listen operation 1910 retains the reader in the awake mode for a predetermined period of time to enable receipt and processing of incoming radio signals from the data manager, a proxy thereof, or a mobile reader. In an embodiment, the listen operation 1910 retains the reader in the awake mode for approximately 1 millisecond to approximately 10 milliseconds. In an embodiment, the listen operation 1910 retains the reader in the awake mode for approximately 3 milliseconds. In other embodiments, the listen operation 1910 may retain the reader in the awake mode for a greater or lesser amount of time.

A second determination module 1912 determines whether a message is received from the data manager during the listen operation 1910. If the second determination module 1912 determines a message is not received during the listen operation 1910, then the second management process 1900 proceeds to the sleep operation 1920, completes, and ends at the stop module 1922. If the second determination module 1912 determines a message is received during the listen operation 1910, however, then a third determination module 1914 determines whether the message is addressed to the reader or to an animal tag.

If the third determination module 1914 determines the message is addressed to the reader, then an implement operation 1916 executes any instructions contained in the message. In an embodiment, the implement operation 1916 changes an operational parameter of the reader (e.g., a transmission power level, a transmission frequency, the length of time over which the listen operation 1910 is implemented, etc.). In an embodiment, the implement operation 1916 stores information and/or erases information from memory in accordance with the message. The second management process 1900 proceeds to the sleep operation 1920, completes, and ends at the stop module 1922.

If the third determination module 1914 determines the message is addressed to an animal tag, however, then a distribute operation 1918 prepares the message for distribution to the animal tag. In an embodiment, the distribute operation 1918 broadcasts the message. In an embodiment, the distribute operation 1918 stores the message in memory for subsequent distribution to the animal tag. The second management process 1900 proceeds to the sleep operation 1920, completes, and ends at the stop module 1922.

Data Manager

Figure 14:
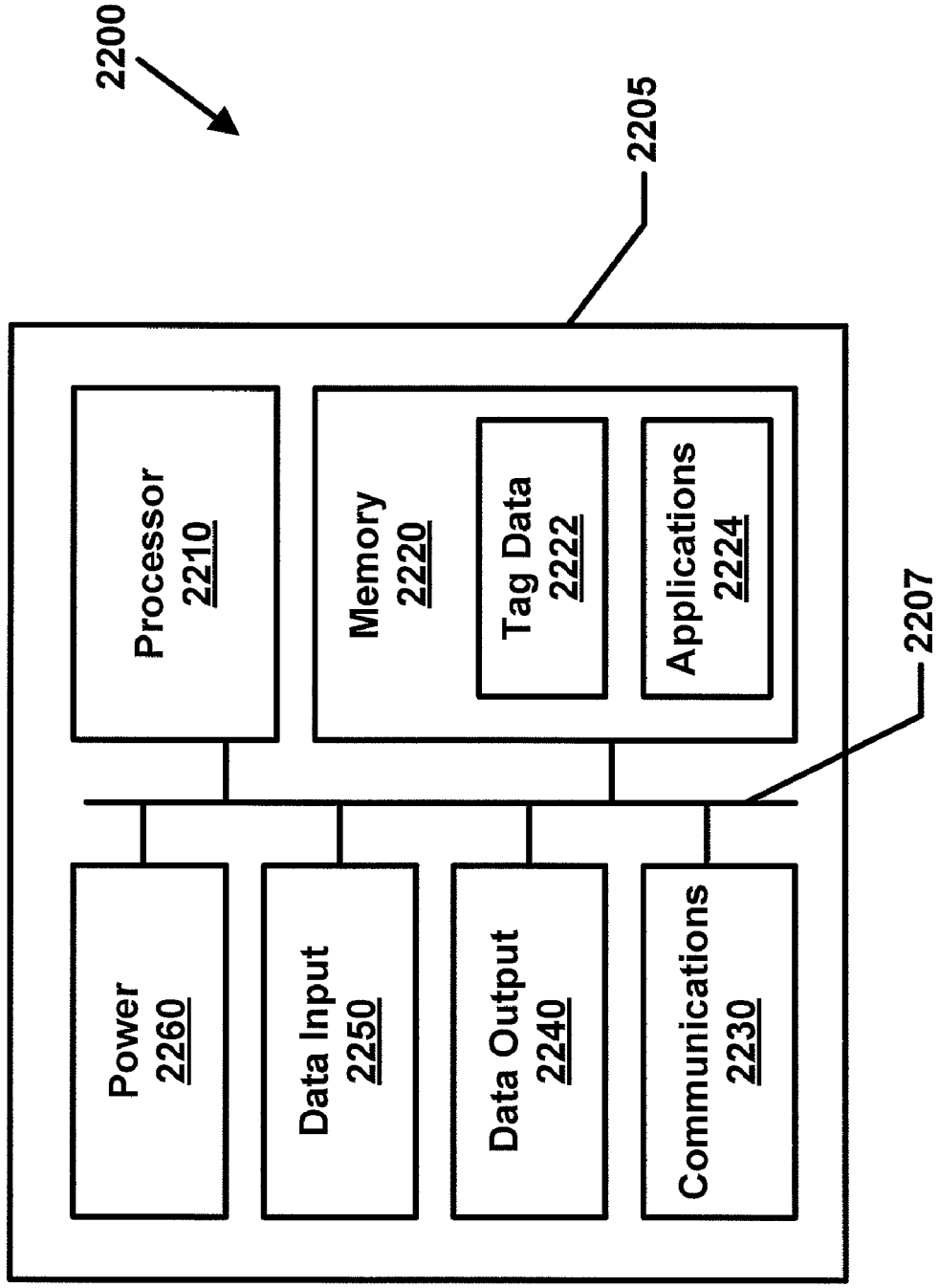
FIG. 14 is a schematic block diagram of an example data manager that may be utilized with any animal management system disclosed herein in accordance with the principles of the present disclosure.

FIG. 14 is a schematic block diagram of an example data manager 2200 that may be utilized with any animal management system disclosed herein. The data manager 2200 includes a processor 2210 and a memory 2220 communicatively coupled by a system bus 2207 or other suitable connection. In an embodiment, the memory 2220 of the data manager 2200 may store tag data 2222. In another embodiment, the memory 2220 of the data manager 2200 may store applications (e.g., software programs) 2224 configured to process the tag data 2222 with the processor 2210.

In an embodiment, the data manager 2200 includes a communications module 2230 by which the data manager may communicate with a reader (e.g., a fixed reader or a mobile reader). For example, in an embodiment, the communications module 2230 includes a cable port (e.g., a USB port) for receiving and sending electrical and/or optical signals, a transceiver for receiving and sending wireless signals, or another suitable type of communications equipment. In an embodiment, the communications module 2230 communicatively couples directly to the reader (e.g., a fixed reader or a mobile reader). In another embodiment, the communications module 2230 connects to a network, such as a WAN, a LAN, an intranet, or the Internet.

In an embodiment, the data manager 2200 includes a data output 2240. For example, the data manager 2200 may include a display screen, a speaker, a printer, or another output device by which the data manager 2200 may present data to a user. In an embodiment, the data manager 2200 includes a data input 2250. For example, the data manager 2200 may include a keyboard, mouse, camera, microphone, track ball, jog wheel, tablet, light pen, scanner, or other suitable input device by which a user may enter data into and/or manipulate data within the data manager 2200.

In an embodiment, the data manager 2200 includes a power input 2260. In an embodiment, the power input 2260 includes a port through which power may be transferred from an external power source (not shown). For example, the power input 2260 may be configured to accept a power cord (e.g., a USB plug, an SB plug, etc.). In another embodiment, the power input 2260 may include an internal power source (e.g., a battery) which may supply power to the data manager 2200.

Figure 15:
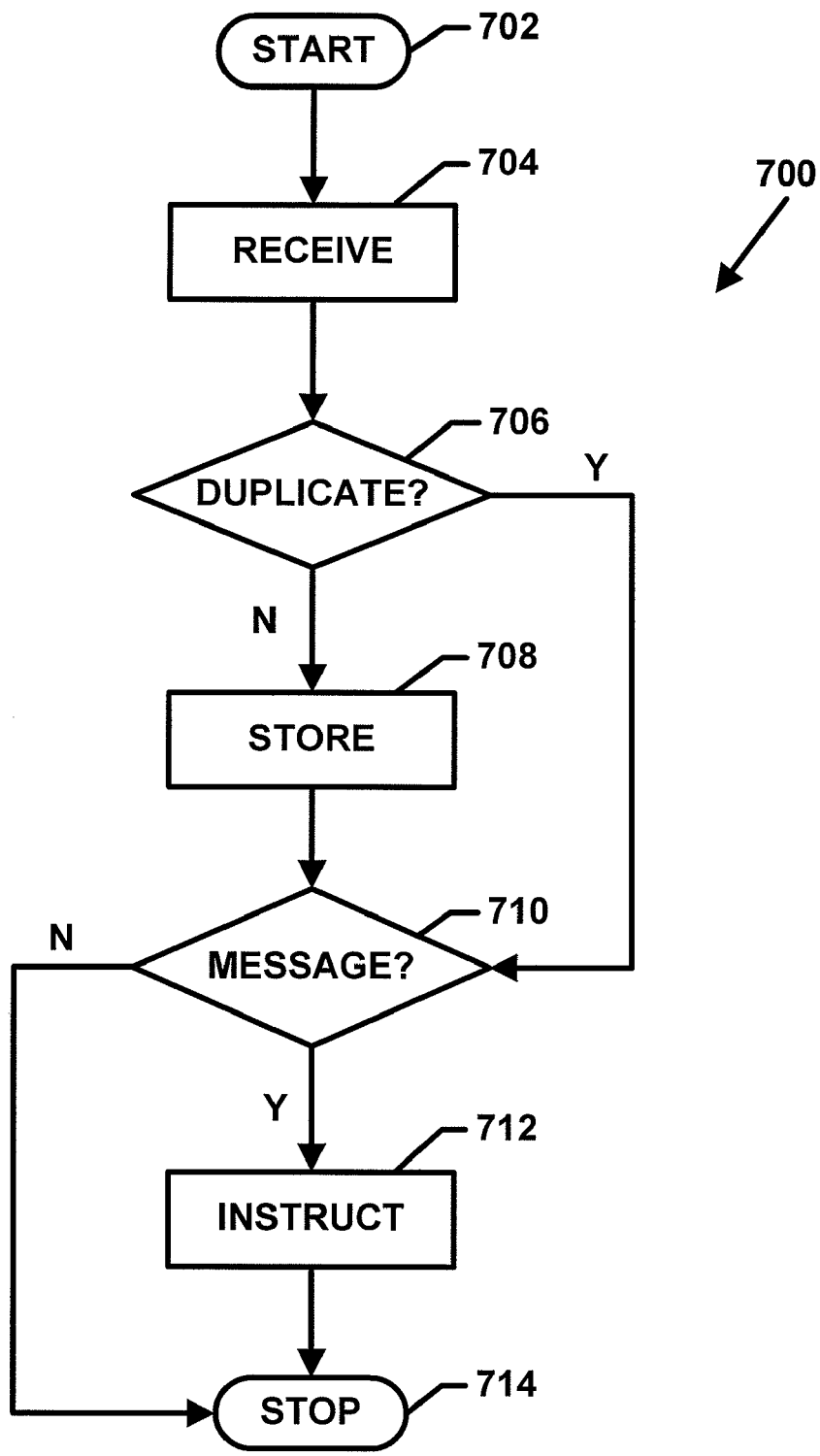
FIG. 15 is a flowchart illustrating an operational flow for a store process by which a data storage manager may manage data received from an animal tag in accordance with the principles of the present disclosure.

FIG. 15 is a flowchart illustrating an operational flow for a store process 700 by which a data storage manager, such as data manager 440 of FIG. 2, may manage data received from the animal tags, such as animal tags 422, 424, 426 of FIG. 2, via the readers, such as readers 432, 434, 436 of FIG. 2. The store process initializes and begins at a start module 702 and proceeds to a receive operation 704. The receive operation obtains data from one or more readers.

A first determination module 706 accesses the stored data and determines whether the data received from the readers is already known (i.e., duplicative). If the first determination module 706 determines the data received from the readers is not duplicative, then a store operation 708 adds the received data to storage. For example, the store operation 708 may add the received data to a storage database. If the determination module 706 determines the data received from the readers is duplicative, however, then the store process 700 may proceed directly to a second determination module 710.

The second determination module 710 determines whether a reply (e.g., instructions to reset one or more counters, instructions to reset one or more readers, new operating parameters, and/or additional information to store on the tag) should be sent to the reporting tag or the reporting reader. If the second determination module 710 determines a reply should not be sent, then the store process 700 completes and ends at a stop module 714. If the second determination module 710 determines a reply should be sent, however, then an instruct operation 712 may provide the reply to the reader for forwarding to the tags before the store operation 700 completes and ends at the stop module 714.

The data manager may implement one or more management applications to provide information of interest to one or more parties. For example, in an embodiment, the data manager performs the monitoring process 1100 disclosed herein with respect to FIG. 16.

Figure 16:
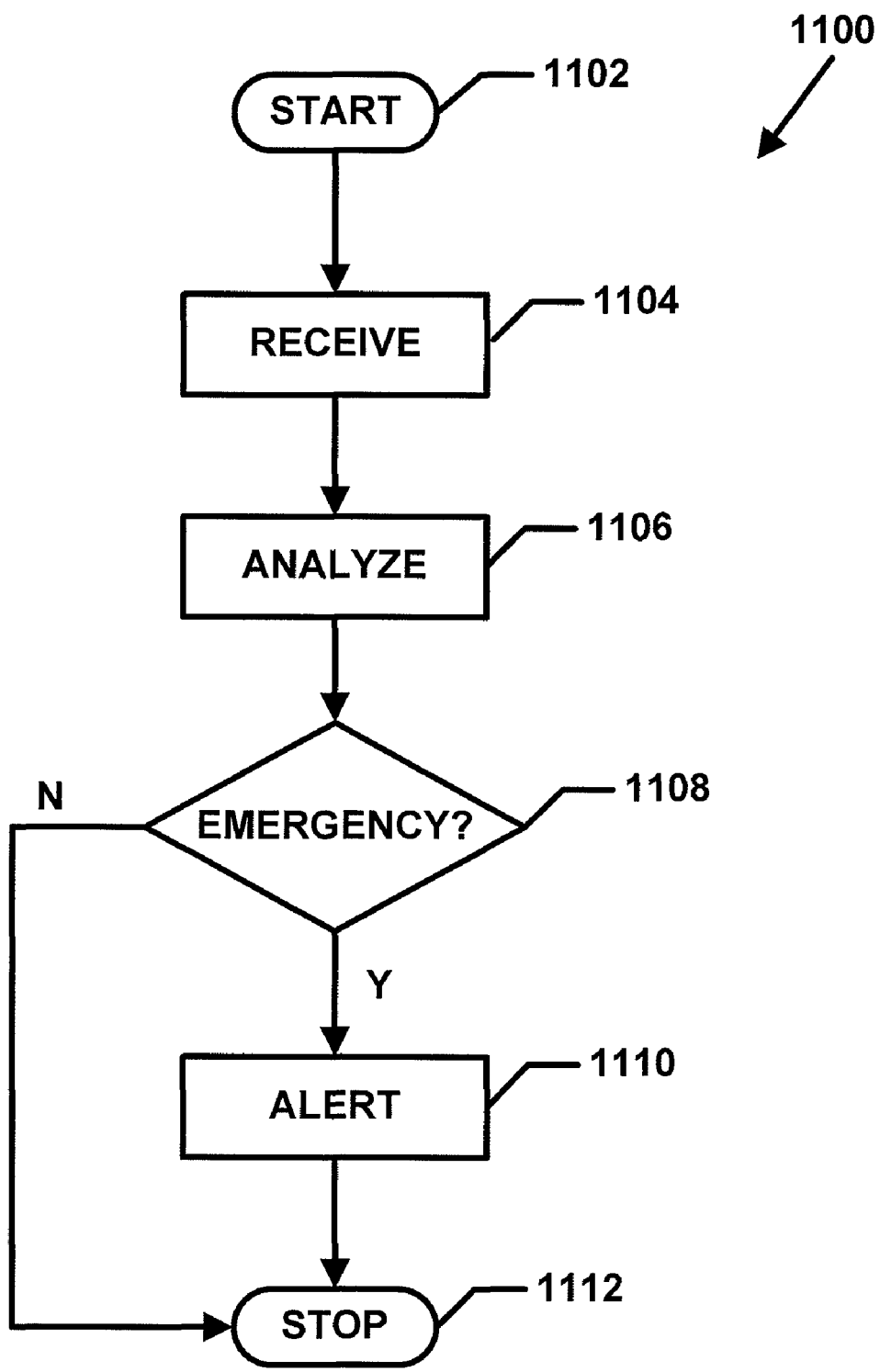
FIG. 16 is a flowchart illustrating an operational flow for an example monitoring process by which the data manager may mine the tag update data in accordance with the principles of the present disclosure.

FIG. 16 is a flowchart illustrating an operational flow for an example monitoring process 1100 by which the data manager 1040 may mine the tag update data. The monitoring process 1100 initializes and begins at a start module 1102 and proceeds to a receive operation 1104. The receive operation 1104 acquires tag update data. In an embodiment, the receive operation 1104 obtains the tag update data from a mobile reader, such as mobile reader 1045 of FIG. 4.

In an embodiment, the receive operation 1104 receives tag update data including a value of a beacon counter. In an embodiment, the receive operation 1104 receives tag update data including the number of times the tag visited the beacon. In an embodiment, the receive operation 1104 receives tag update data indicating which beacons were visited by the animal tag within a predetermined period of time. In an embodiment, the receive operation 1104 receives tag update data including a timestamp indicating a date and/or time at which the animal tag came within range of a beacon.

An analyze operation 1106 reviews and processes the received tag update data. In an embodiment, the analyze operation 1106 determines whether any of the animals are displaying abnormal behavior. For example, in an embodiment, the analyze operation 1106 may determine whether any of the animals have not eaten or drunk within a predetermined period of time. In an embodiment, the analyze operation 1106 may determine whether any of the animals have eaten or drank too often within a predetermined period of time. In another embodiment, the analyze operation 1106 may identify trends of abnormal behavior (e.g., increase or decline in eating or drinking habits). In another embodiment, the analyze operation 1106 may determine whether any animals are missing (e.g., tag out of range) or whether any unexpected animals are present (e.g., unknown or unexpected tag in range).

In another embodiment, the analyze operation 1106 determines whether any of the animals are displaying normal behavior. For example, in an embodiment, the analyze operation 1106 may determine which animals have eaten or drunk within a predetermined period of time. In another embodiment, the analyze operation 1106 may identify trends of normal behavior (e.g., consistent eating and/or drinking habits). In another embodiment, the analyze operation 1106 may determine which animals are in view (e.g., tag is within range).

A determination module 1108 determines whether an alert condition exists (i.e., whether a user should be alerted to a situation or trend identified by the analyze operation 1106). If the determination module 1108 determines an alert condition does not exist, then the monitoring process 1100 completes and ends at a stop module 1112. If the determination module 1108 determines an alert condition exists, however, then an alert operation 1110 indicates the situation to the user before the monitoring process completes and ends at the stop module 1112. In an embodiment, a user may define conditions under which an alert condition will exist. For example, the user may specify the maximum period of time an animal may go without eating or drinking without triggering the alert operation 1110.

In an embodiment, the alert operation 1110 displays a visual and/or audio alarm to a user in the field. For example, if the data manager 1040 is a laptop computer located in a feed truck, water truck, or other vehicle driving through the feed lot, then the alert operation 1110 may sound an audio alarm to the driver of the vehicle. In another embodiment, the alert operation 1110 may communicate (e.g., via a network connection, such as a LAN, a WAN, or the Internet) a visual and/or audio alarm to a remote user (e.g., medical personnel, an investor, bank, or other asset holder, the owner or agent thereof, etc.). For example, the alert operation 1110 may send an update to a webpage displaying a status of the animals. In another embodiment, the alert operation 1110 updates a status of an animal to indicate the animal should be monitored or inspected. In an embodiment, the alert operation 1110 indicates immediate action is appropriate. In an embodiment, the alert operation 1110 indicates action within a specific period of time is appropriate. In another embodiment, the alert operation 1110 indicates further monitoring and/or review is appropriate.

FIGS. 17-20 are schematic diagrams illustrating example status displays that may be generated by the alert operation 1110. Alternatively, the status of the animals may be displayed, processed, and/or recorded whether or not an alert condition exists.

Figures 17, 18:
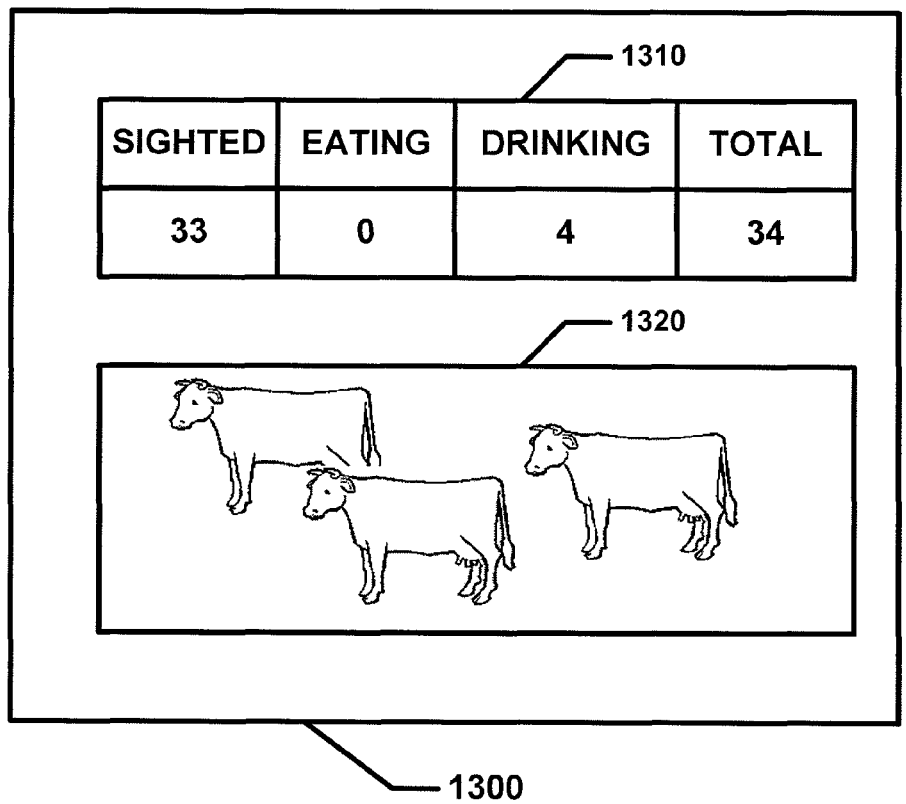
FIG. 17 is a schematic block diagram of a first example graphic user interface (GUI) providing a daily health status for each animal being monitored in accordance with the principles of the present disclosure.
FIG. 18 is a schematic block diagram of a second example GUI that generally provides a current status of each animal being monitored in accordance with the principles of the present disclosure.

FIG. 17 is a schematic block diagram of a first example graphic user interface (GUI) 1200 providing a daily health status for each animal in the feed lot. The first GUI 1200 is organized as a table or database having a first column 1210 indicating animal (i.e., or tag) identification numbers, a second column 1220 indicating when the respective animal last ate, a third column 1230 indicating when the animal last drank, and a fourth column 1240 indicating an alert status (e.g., whether an alert condition exists).

In the example shown, a user can read the GUI 1200 and easily understand an alert condition exists for the animal having identification number 5. The animals having identification numbers 1, 2, 3, and 4 each ate or drank recently and, accordingly, have a status indication of "OK." The animal having identification number 5, however, has not eaten or drunk all day, which may indicate animal number 5 is sick or dead. Accordingly, the database presentation 1200 facilitates communication of problems or potential issues to users to enable quick and/or directed action.

FIG. 18 is a schematic block diagram of a second example GUI 1300 that generally provides a current status of the animals in the feed lot. The second GUI 1300 includes a first window 1310 indicating how many animals are currently in range and/or engaged in an activity of interest. The second GUI 1300 also may include a second window 1320 displaying video and/or audio surveillance of the feed lot. For example, in an embodiment, the second window 1320 may display a real-time image of the animals in the feed lot. In another embodiment, the second window 1320 may display a periodically refreshed still image taken of the animals in the feed lot.

In other embodiments, user interface displays may indicate other types of information about the animals. For example, embodiments of a user interface display may indicate the age, sex, weight, and/or height of one or more animals. Other embodiments of a user interface display may indicate a medical history (e.g., recent diseases or other health issues, exposure to diseases or other heath issues, vaccinations, medications, current treatments being received, etc.) of one or more animals. In other embodiments, a user interface display may indicate a transaction history (e.g., date born, date sold, date exported, date imported, lots in which the animal has resided, etc.) for one or more animals.

FIG. 19 is a schematic block diagram of an example display 1600 that enables a user to monitor existing alert conditions. In an embodiment, the display 1600 may include a chart or table 1610 indicating the types of alarm conditions and the number of animals meeting each alert condition. In the example shown in FIG. 19, the table 1610 includes a first field 1612 indicating the total number of animals to be monitored (i.e., for which an alert condition exists), a second field 1614 indicating a first alert condition, a third data field 1616 indicating a second alert condition, and a fourth data field 1618 indicating a third alert condition. In other embodiments, greater or fewer alert conditions may be displayed.

In the example shown, the first alert condition indicates the animal is missing. Non-limiting examples of the second alert condition include the animal has not eaten in a predetermined period of time, the animal has not visited the food trough in a predetermined period of time, the animal has not visited the food trough a minimum number of times per predetermined period, the animal has not spent a minimum predetermined amount of time at the food trough, or the animal has spent more than a maximum predetermined amount of time at the food trough. Non-limiting examples of the third alert condition include the animal has not drunk in a predetermined period of time, the animal has not visited the water trough in a predetermined period of time, the animal has not visited the water trough a minimum number of times per predetermined period, the animal has not spent a minimum predetermined amount of time at the water trough, or the animal has spent more than a maximum predetermined amount of time at the water trough.

Each of data field 1614, 1616, 1618 is populated with a value indicating the number of animals meeting the respective alert condition. The table 1610 of FIG. 19 indicates two animals should be monitored (see 1612). One of these animals has not been eating (see 1616) and both of these animals have not been drinking (see 1618). In some embodiments, a user may select one or more of the data fields, columns, and/or rows of the table 1610 to obtain additional information. For example, in an embodiment, a user may select a column and/or row associated with an alert condition to view a status of all animals associated with the alert condition. In other embodiments, additional information may be shown within the same display 1600.

FIG. 20 is a schematic block diagram of an example display 1700 that provides additional information about alert conditions with respect to specific animals. In an embodiment, the display 1700 includes a chart and/or table 1710 indicating why each animal is associated with one or more alert conditions.

For example, in FIG. 20, a first animal having an identification number "111" was accounted for on the date Jan. 14, 2008, but has not eaten or drunk since the date Jan. 12, 2008. Accordingly, the first animal has triggered a first alert condition indicating the first animal is not eating and a second alert condition indicating the first animal is not drinking. A second animal having identification number "222" ate on the date Jan. 14, 2008, but has not drunk since the date Jan. 13, 2008. Accordingly, the second animal has triggered only a first alert condition indicating the animal is not drinking.

In an embodiment, the data triggering an alert condition is indicated on the display. In an embodiment, the data triggering the alert condition is distinct from the text indicating a normal status of the animal. In the example shown, the backgrounds of the data fields 1714, 1716 are shaded. In another embodiment, the data fields triggering an alert condition may be colored, outlined, enlarged, bolded, highlighted, or otherwise modified to draw attention. In another embodiment, the second and third data fields 1714, 1716 of the display associated with the first animal are modified to draw attention to them.

Mobile Reader

Figure 21:
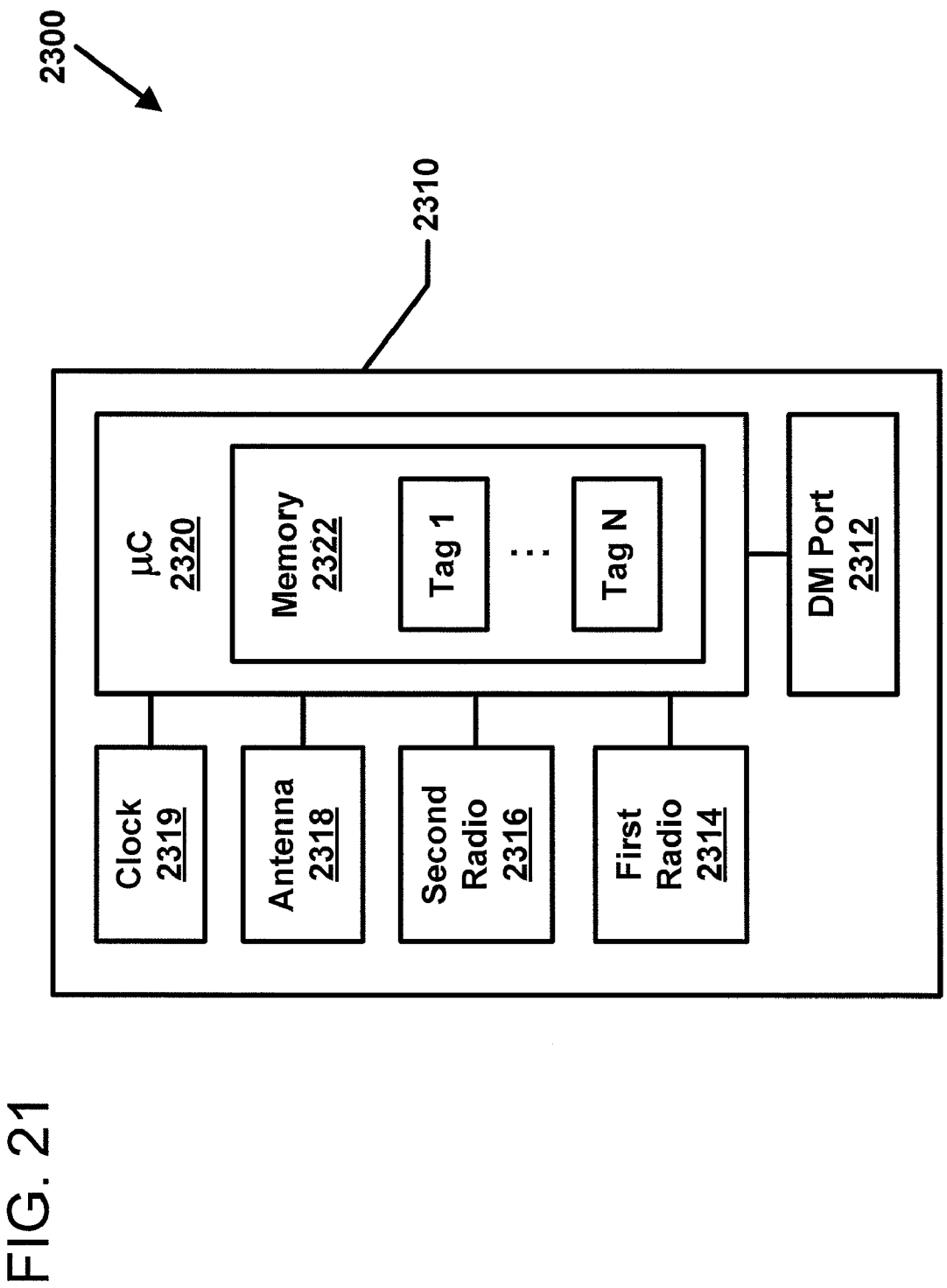
FIG. 21 is a schematic block diagram of an example mobile reader configured to facilitate communication between a data manager, such as the data manager of FIG. 14, a reader, such as the reader of FIG. 10, a beacon, such as the beacon of FIG. 5, and/or an animal tag, such as the animal tag of FIG. 6 in accordance with the principles of the present disclosure.

FIG. 21 is a schematic block diagram of an example mobile reader 2300 configured to facilitate communication between a data manager, such as data manager 2200 of FIG. 14, a reader, such as reader 2100 of FIG. 10, a beacon, such as beacon 2000 of FIG. 5, and/or an animal tag, such as animal tag 900 of FIG. 6. In an embodiment, the mobile reader 2300 collects information from one or more readers and reports the collected information to the data manager. In an embodiment, the mobile reader 2300 distributes messages from the data manager to one or more readers. In an embodiment, the mobile reader 2300 may communicate directly between the data manager and a tag and/or a beacon.

In an embodiment, the mobile reader 2300 is mobile (e.g., see mobile reader 845 of FIG. 3). In such an embodiment, the mobile reader 2300 may be referred to as a "mobile reader." For example, the mobile reader 2300 may move to be within range of a reader and then move to be within range of the data manager. In an embodiment, the mobile reader 2300 may travel between readers to collect information from multiple readers before reporting to the data manager. In an embodiment, the mobile reader 2300 is coupled to a moving object, such as a vehicle. In another embodiment, the mobile reader 2300 may be carried by a person or animal. In other embodiments, however, the mobile reader 2300 may remain stationary.

In general, the mobile reader 2300 includes a housing 2310 containing a DM module 2312, a first radio transceiver 2314, an antenna 2318, and a microcontroller 2320. The mobile reader 2300 communicates with the data manager via the DM module 2312. For example, the DM module 2312 may include a cable port, a wireless signal port, or other communications device. In an embodiment, the DM port 2312 is a cable port configured to receive a USB cable. In an embodiment, the mobile reader 2300 receives power from the data manager through the DM module 2312 (e.g., via a USB connection). In another embodiment, the mobile reader 2300 couples to a different external power source (not shown). In another embodiment, the mobile reader 2300 includes an internal power source (not shown).

The mobile reader 2300 communicates with a reader via the first radio transceiver 2314, which radiates radio signals through the antenna 2318. In an embodiment, the mobile reader 2300 receives signals from the reader and transmits messages to the reader via the first radio transceiver 2314. In an embodiment, the first radio 2314 is the same as the second radio 2114 of the reader 2100 of FIG. 10. In an embodiment, the antenna 2318 includes a directional antenna. In another embodiment, the antenna 2318 may include any suitable antenna.

In an embodiment, the mobile reader 2300 includes a second radio transceiver 2316. In an embodiment, the second radio transceiver 2316 radiates radio signals through the antenna 2318. In another embodiment, the second radio transceiver 2316 radiates radio signals through a second antenna (not shown). In an embodiment, the second radio transceiver 2316 may be configured to communicate with (e.g., send or receive radio signals to and from) one or more animal tags. In an embodiment, the second radio transceiver 2316 may be configured to communicate with one or more beacons.

The microcontroller 2320 contains memory 2322 configured to store information received from the data manager via the DM port 2312, received from a reader via the first radio transceiver 2314 and antenna 2318, or received from a tag or beacon via the second radio transceiver 2316. For example, the memory 2322 of FIG. 21 stores tag-related data (e.g., obtained from a reader) for a Tag 1 through a Tag N. In other embodiments, the memory 2322 may store other types of information. In an embodiment, the memory 2322 of the mobile reader 2300 is configured to hold more data than the memory 2117 of the reader 2100 of FIG. 10 and/or the memory 922 of the tag 900 of FIG. 6.

In an embodiment, the mobile reader 2300 also includes a clock 2319 (e.g., a crystal) with which the microcontroller 2320 may time periodic intervals.

Smart Beacon

In additional embodiments, components of the animal management system may perform functions described above as implemented by other components. For example, in an embodiment, the beacon may broadcast a presence announcement only after receiving a query signal from an animal tag. In such an embodiment, the animal tag broadcasts its own unique identification number periodically or continuously. The beacon receives the identification number of the animal tag when the animal moves the animal tag to a position in which a beacon is located within range of the animal tag. Accordingly, the beacon conserves power by transmitting its own identification number only when an animal tag is likely to be within range of the beacon.

Figure 22:
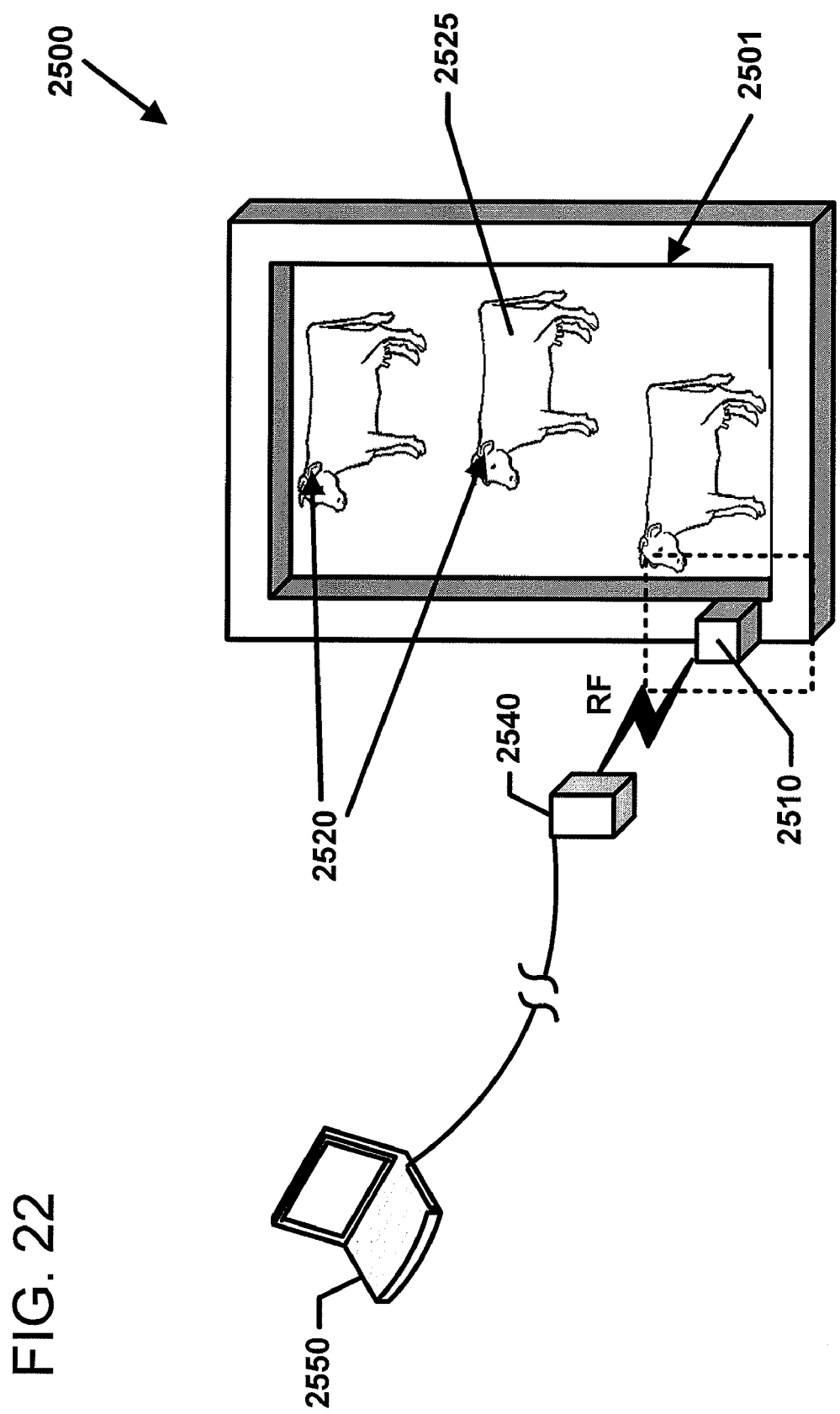
FIG. 22 is a schematic block diagram of an animal management system including one or more animal tags, a data manager, and one or more beacons, which generally perform the functions of both the beacon and the reader of the other animal management systems described above in accordance with the principles of the present disclosure.

In another embodiment shown in FIG. 22, an animal management system 2500 may include one or more beacons 2510, one or more animal tags 2520, and a data manager 2550. The animal management system 2500 may include a mobile reader 2540 of the data manager 2550. The beacon 2510 of the animal management system 2500 generally performs the functions of both the beacon, such as beacon 2000 of FIG. 5, and the reader, such as reader 2100 of FIG. 10, of the animal management systems described above.

Such a beacon 2510 can be configured to transmit information to the animal tag 2520, to receive information from the tag 2520, or combination thereof. In an embodiment, the beacon 2510 may broadcast a presence announcement periodically or continuously to any animal tag within range of the beacon 2510. The presence information may indicate the presence of a beacon, the presence of a specific type of beacon, or the presence of a unique beacon.

The beacon 2510 also may receive reports from one or more animal tags indicating proximity information or other data stored on the animal tag. In an embodiment, the beacon 2510 may receive tag-specific data. In an embodiment, the tag-specific information can include a unique identification number of the tag, information stored on the tag, or proximity information of the tag (e.g., time the tag spent in proximity to the beacon 2510 and/or to other beacons).

The beacon 2510 may forward the report to the data manager 2550 or the mobile reader 2540. For example, in an embodiment, the beacon 2510 may forward the report to a mobile reader 2540 when a request for tag reports is received from the mobile reader 2540. In an embodiment, a beacon 2510 also may be configured to transmit radio signals to one or more recipient animal tags 2520. For example, in an embodiment, the beacon 2510 may be configured to transmit a message to a recipient animal tag 2520 from the data manager 2550 or the mobile reader 2540.

In another embodiment, the beacon and the animal tag may switch functions. For example, the beacon may track which animal tags move into proximity with the beacon. In such an embodiment, an animal tag may broadcast presence information periodically or continuously. When an animal moves to a position in which a beacon is located within range of the animal tag, the beacon receives and stores the presence information. In an embodiment, the beacon and not the animal tag stores the presence information. In an embodiment, the beacon may forward the presence information received from the animal tag to the tag, a reader, a data manager, or combination thereof.

In an embodiment, the beacon may be configured to measure the time the animal tag is located in proximity to the beacon and to transmit the measured time to the tag, the reader, the data manager, or combination thereof. In an embodiment, the beacon is configured to store in memory and transmit to the reader the measured time specific to the tag. In an embodiment, the beacon may be configured to determine a number of times an animal tag came into proximity to the beacon. In such an embodiment, this beacon may have a greater capacity memory than the beacons of the animal management systems described above. In an embodiment, this beacon may have a greater capacity memory than the animal tag of this animal management system.

In such an embodiment, the animal tag may be configured to transmit radio signals over a predetermined distance. In an embodiment, the animal tag may be configured (e.g., through resistance loading) to have a limited range. For example, the animal tag may be configured to transmit signals only a few meters, decimeters, centimeters, or millimeters. Accordingly, beacons obtain presence information only for animals located proximate an area of interest.

Passage Sensing

Figure 23:
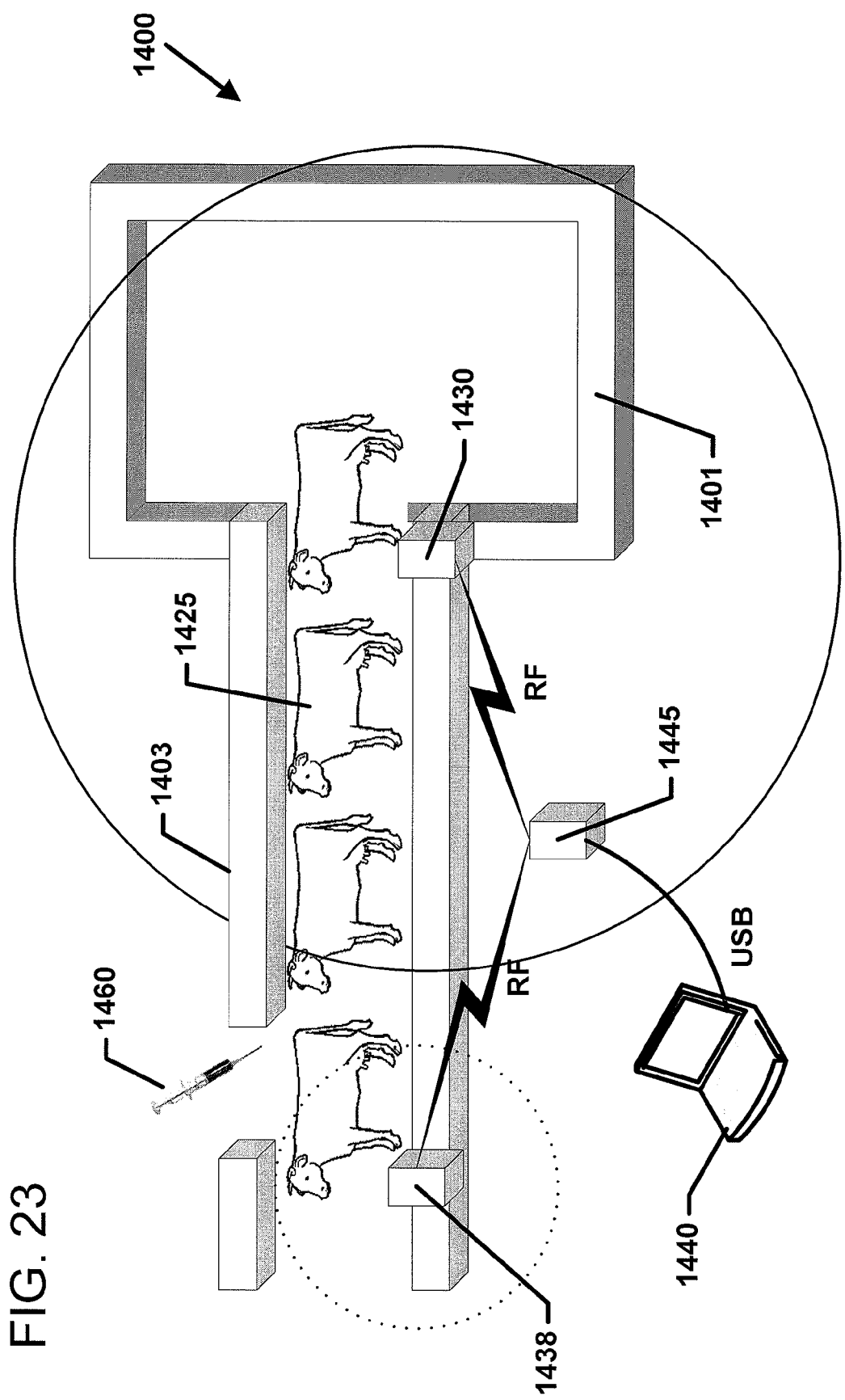
FIG. 23 is a schematic block diagram of an example animal management system configured to process (e.g., track application of a vaccine) to tagged animals in accordance with the principles of the present disclosure.
Figure 24:
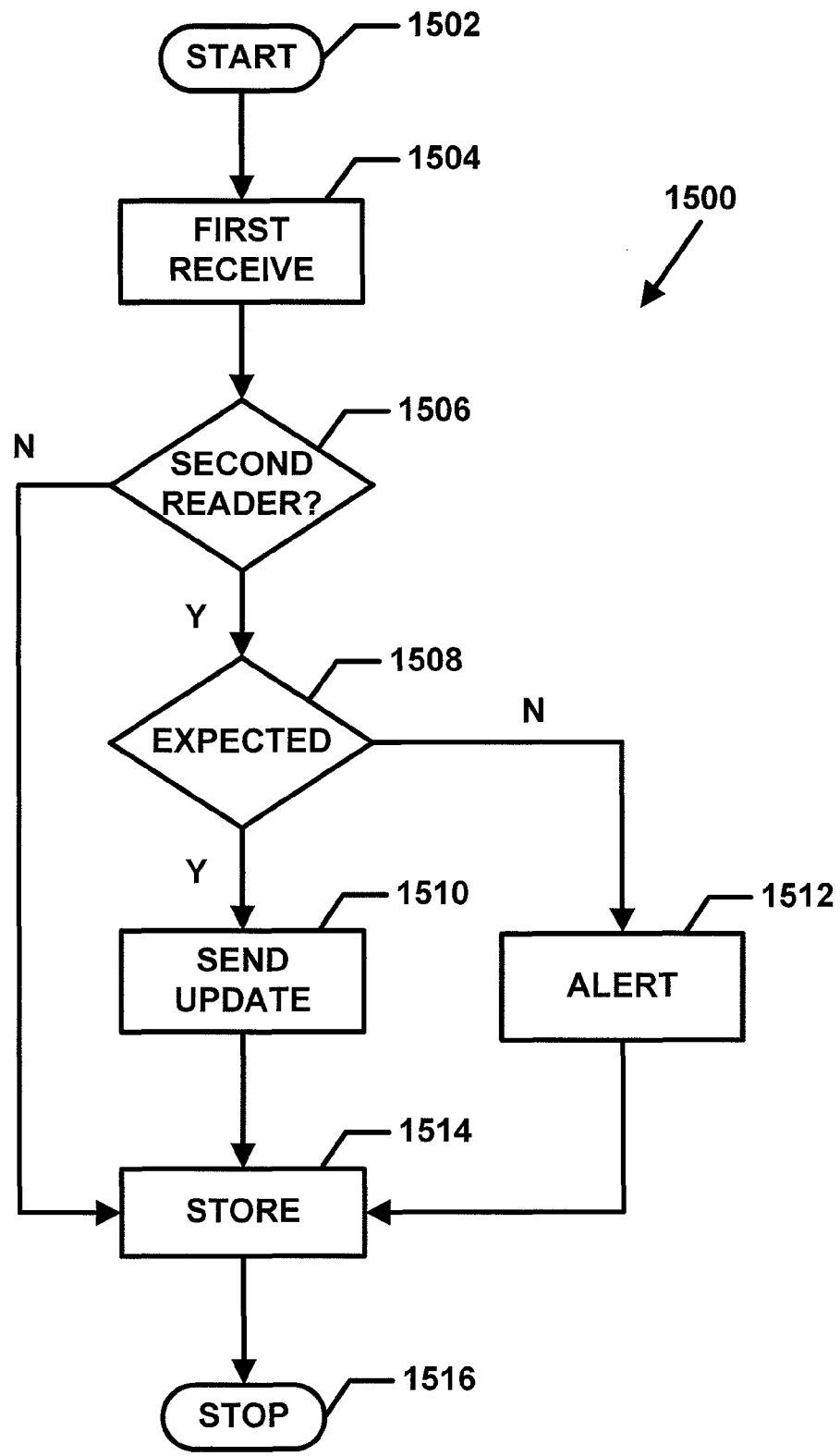
FIG. 24 is a flowchart illustrating an operational flow for an example update process that may be implemented by a data manager to update information on an animal tag after processing an animal at the processing station in accordance with the principles of the present disclosure.

FIGS. 23 and 24 illustrate a handling and tracking application that may be implemented by the data manager of an animal management system. FIG. 23 is a schematic block diagram of an example animal management system 1400 configured to process (e.g., track application of a vaccine) to tagged animals. The animal management system 1400 also records (e.g., as an event) the application of the vaccine to each animal on the respective animal tags.

The animal management system 1400 includes a pen 1401 and a chute (e.g., a squeeze-through chute) 1403 through which animals 1425 may leave the pen 1401 in a controlled manner (e.g., single file or two-aside). A first reader 1430 is positioned on the pen 1401 adjacent the chute 1403 to monitor which animals 1425 leave the pen 1401 and enter the chute 1403. A second reader 1438 is positioned in the chute 1403 spaced from the pen 1401 to collect data from the animal tags in range of the second reader 1438. In other embodiments, additional readers (not shown) may be provided.

A processing station 1460 is generally located along the chute 1403 between the first reader 1430 and the second reader 1438. In an example embodiment, the processing station 1460 includes a location at which a vaccine may be applied to the animals 1425 as the animals pass by the processing station 1460. In an embodiment, the processing station 1460 may include a location at which physical characteristics of the animal may be obtained and/or recorded. For example, in an embodiment, the processing station 1460 includes a location at which the animal 1425 may be weighted or other measurements may be taken. In another embodiment, the processing station 1460 is an ear tag distribution station (not shown) at which ear tags may be printed and coupled to the animals.

A mobile reader 1445 is configured to collect tag data periodically from the first and second readers 1430, 1438 and to forward (e.g., via a USB connection, a wireless connection, or any other suitable connection) the collected data to a data manager 1440 for processing. In an embodiment, the mobile reader 1445 is a computing device configured to circulate amongst the readers 1430, 1438 of the animal management system 1400.

FIG. 24 is a flowchart illustrating an operational flow for an example update process 1500 that may be implemented by the data manager 1440 to update information on the animal tags after processing the animals at the processing station 1460 (FIG. 23). The update process 1500 initializes and begins at a start module 1502 and proceeds to a first receive operation 1504.

The first receive operation 1504 receives tag data at the data manager 1440 from the mobile reader 1445. In an embodiment, the first receive operation 1504 receives tag data obtained from the first reader 1430, which acquired the tag data after the respective animal tag entered the range of the first reader 1430. In another embodiment, the first receive operation 1504 receives tag data obtained from the second reader 1438, which acquired the tag data after the respective animal tag entered the range of the second reader 1438. In other embodiments, the first receive operation 1504 may receive tag data relating to multiple animals from one or both of the first and second readers 1430, 1438.

A determination module 1506 determines whether each set of tag data (i.e., the message sent from each tag) was received from the second reader 1438, which has a predetermined range. By positioning the second reader 1438 past the processing station 1460, the data manager 1440 may conclude animals viewed by the second reader 1438 have been processed (e.g., received the vaccine). If the first determination module 1506 determines the tag data was not received from the second reader 1438, then the update process 1500 proceeds to a store operation 1514, which updates a data storage with the tag data. The update process 1500 completes and ends at a stop module 1516.

If the first determination module 1506 determines the tag data was received from the second reader 1438, however, then a second determination module 1508 determines whether the respective tag was expected at the second reader 1438. For example, the second determination module 1508 may determine whether the respective tag was already viewed by the first reader 1430. If the second determination module 1508 determines the tag was not expected at the second reader 1438, then an alarm operation 1512 issues an alert to one or more users. The store operation 1514 updates a data storage with the tag data and the update process 1500 completes and ends at a stop module 1516.

If the second determination module 1508 determines the tag was expected at the second reader 1438, however, then a send operation 1510 forwards instructions to the animal tag to update its memory to reflect its passage through the processing station 1460. In an embodiment, the send operation 1510 sends to the recipient animal tag instructions to update an activity log or personal information (e.g., medical history) stored on the animal tag to reflect a processing event (e.g., receipt of a vaccination). The store operation 1514 updates a data storage with the tag data and the update process 1500 completes and ends at a stop module 1516.

In some embodiments, the send operation 1510 addresses the instructions to a recipient animal tag and requests one or more readers to broadcast the instructions with the specific address to all animal tags in view. For example, the send operation 1510 may forward instructions to the mobile reader 1445, which communicates the instructions to one or more fixed readers 1430, 1438 to broadcast the update instructions to the animal tag. In an embodiment, the send operation 1510 requests the readers to continue broadcasting the instructions (e.g., continuously or at periodic intervals) until confirmation of receipt of the message has been received from the recipient animal tag. In another embodiment, the send operation 1510 may send instructions to the tags via a beacon.

In an embodiment, the send operation 1510 sends instructions to the animal tags to report in to a reader more often (i.e., wake up more frequently). In an embodiment, the beacon provides instructions to report in with sufficient speed or regularity to allow a reader to read the animal tags as the animals tags file past the reader at a predetermined rate. Advantageously, more frequent reporting mitigates the amount of time an individual animal tag must spend by a reader to ensure the animal tag has checked in. Accordingly, in an embodiment, less handling of the animals is required to obtain accurate data.

In an embodiment, one or more beacons (not shown) may be arranged adjacent the pen 1401 or other holding area in which an animal is kept prior to processing the animal. The beacon may provide an instruction to the animal tag coupled to the animal in the pen 1401 to toggle into the awake mode more frequently. In an embodiment, the beacon provides instructions to toggle into the awake mode more frequently over a predetermined period of time (e.g., the next few minutes, hours, days, etc.).

In an embodiment, the beacon provides instructions to toggle into the awake mode more frequently for about a length of time sufficient to process the animal. In another embodiment, the beacon may provide instructions to toggle into the awake mode more frequently for about a length of time sufficient to load the animal onto a truck (e.g., with additional animals).

In another embodiment, the present invention can include a method of monitoring processing (e.g., vaccinating) an animal. This method includes providing an animal and an animal tag coupled to the animal. The animal can be moving through a chute. The entry beacon broadcasts a chute entrance beacon signal over a first beacon range that encompasses an entrance to the chute. The chute entrance beacon signal can include first beacon information including an identifier of the entrance to the chute.

This method also includes receiving at the tag transceiver the chute entrance beacon signal when the animal enters the chute. The method then includes processing the animal while the animal is located within the chute.

The exit beacon broadcasts a chute exit beacon signal over a second beacon range that encompasses an exit from the chute. The chute exit beacon signal can include second beacon information including an identifier of the exit from the chute.

The tag receives the chute exit beacon signal at the tag transceiver when the animal has been processed and is exiting the chute. The tag also stores tag information in the memory of the tag. The tag information can include a type of processing and indicia indicating completion of the processing.

The method then includes transmitting from the tag to a reader a tag signal including the tag information and receiving the tag signal at the reader. The reader then transmits reader information from the reader to a data manager. The reader information can include the tag information, information generated when the tag information is received at the reader, or a combination thereof. The data manager processes the information received by the data manager to determine whether the animal has been adequately processed and presents an alert indicating a status of the animal if the animal has not been adequately processed.

National Animal Identification System

Other aspects of the present disclosure relate to methods for complying with the National Animal Identification System (NAIS). NAIS provides producers and owners of animals, such as livestock, with unique identification numbers as part of a uniform numbering system for animals nationwide. The unique identification number links an animal to its birthplace or premises of origin. When combined with animal tracing, the unique identification number also links the animal to each premises/location that reports contact with the animal. As part of NAIS, producers and owners report certain animal movements (e.g., those that might pose a significant risk of disease transmission).

Figure 25:
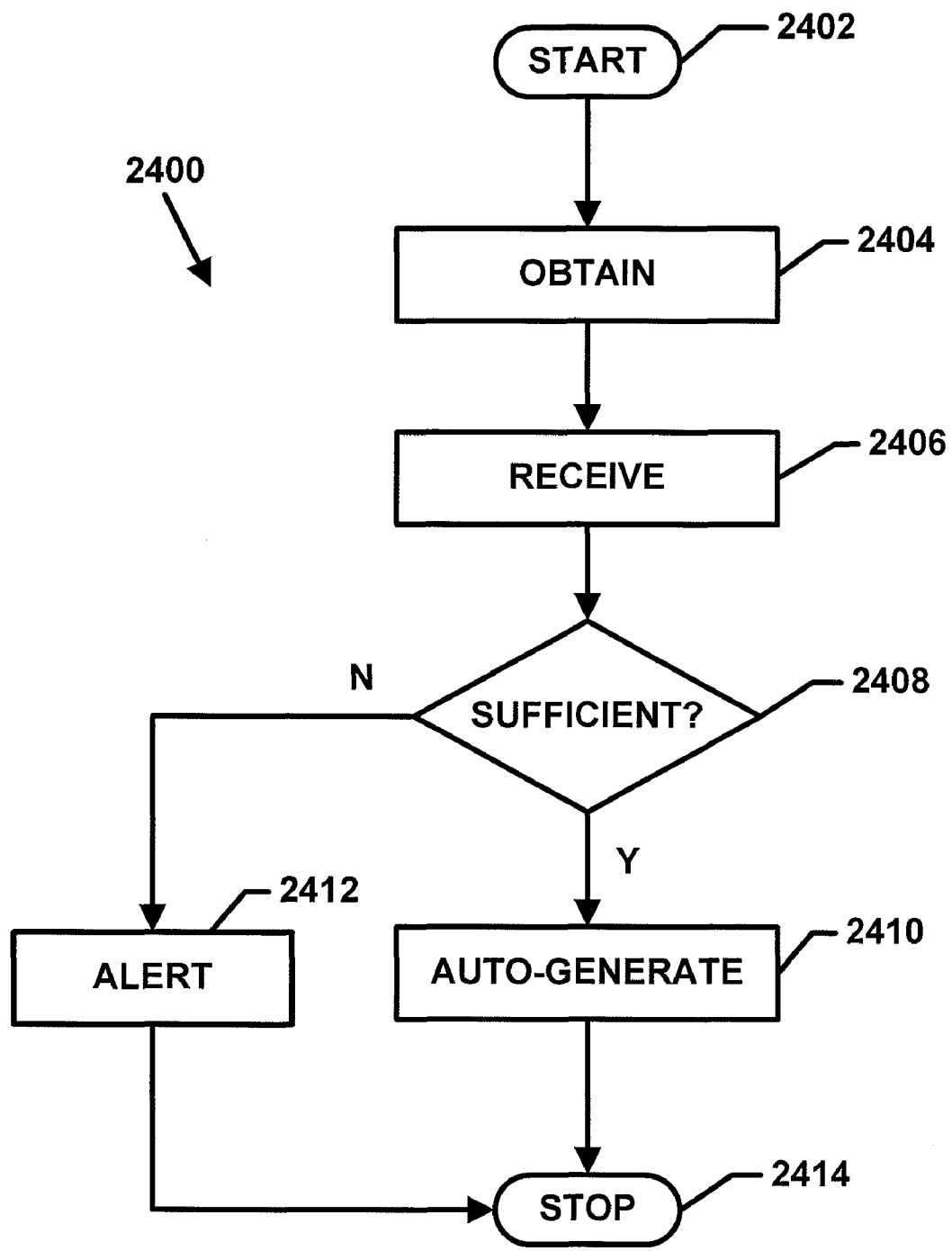
FIG. 25 is a flowchart illustrating an example generation process by which a report for the National Animal Identification System (NAIS) may be generated automatically using any of the animal management systems disclosed herein in accordance with the principles of the present disclosure.

FIG. 25 is a flowchart illustrating an example generation process 2400 by which a report for the NAIS may be generated automatically using any of the animal management systems disclosed herein. The generation process 2400 initializes and begins at a start module 2402 and proceeds to an obtain operation 2404.

The obtain operation 2404 determines an appropriate format in which to submit information for the purposes of the NAIS. For example, in an embodiment, the obtain operation 2404 acquires a form or template report for the NAIS. In another embodiment, the obtain operation 2404 determines what information is appropriate to submit. For example, in an embodiment, the obtain operation 2404 determines a unique animal identification number and a location identification number should be submitted for each animal being reported.

A receive operation 2406 acquires appropriate data about the animal to be reported to the NAIS. In an embodiment, the receive operation 2406 may retrieve the appropriate information from a data manager. For example, the receive operation 2406 may retrieve the appropriate information from a database maintained by the data manger. In another embodiment, the receive operation 2406 queries the animal tags and obtains responses.

A determination module 2408 determines whether the data acquired during the receive operation 2406 is sufficient to generate a report. In an embodiment, the determination module 2408 determines whether information can be found for each data field on a template form. In another embodiment, the determination module 2408 determines whether all appropriate information could be obtained for each animal.

If the determination module 2408 determines sufficient information could be obtained, then a generate operation 2410 automatically generates a report for the NAIS based on the information acquired in the obtain and receive operations 2404, 2406, respectively. In an embodiment, the generate operation 2410 generates an electronic copy of the report. The generation process 2400 completes and ends at a stop module 2414.

If the determination module 2408 determines sufficient information could not be obtained, however, then an alert operation 2412 indicates additional information is needed to generate the report. In an embodiment, the alert operation 2412 displays an error message to the user. In an embodiment, the alert operation 2412 indicates what information is missing. In an embodiment, the alert operation 2412 indicates why information may be missing (e.g., disconnected to the data manager, disconnected from the animal tag, etc.). The generation process 2400 completes and ends at the stop module 2414.

Encrypted Transmissions

In some embodiments, a beacon may transfer an encrypted message to an animal tag. For example, a beacon at a veterinarian station may transfer an encrypted message indicating the animal received a particular vaccination, medicine, or treatment. Proper encoding of the message may indicate the message was received from an authorized beacon. A tag, a reader, and/or a data manager may be configured to decode the encrypted message.

Figure 26:
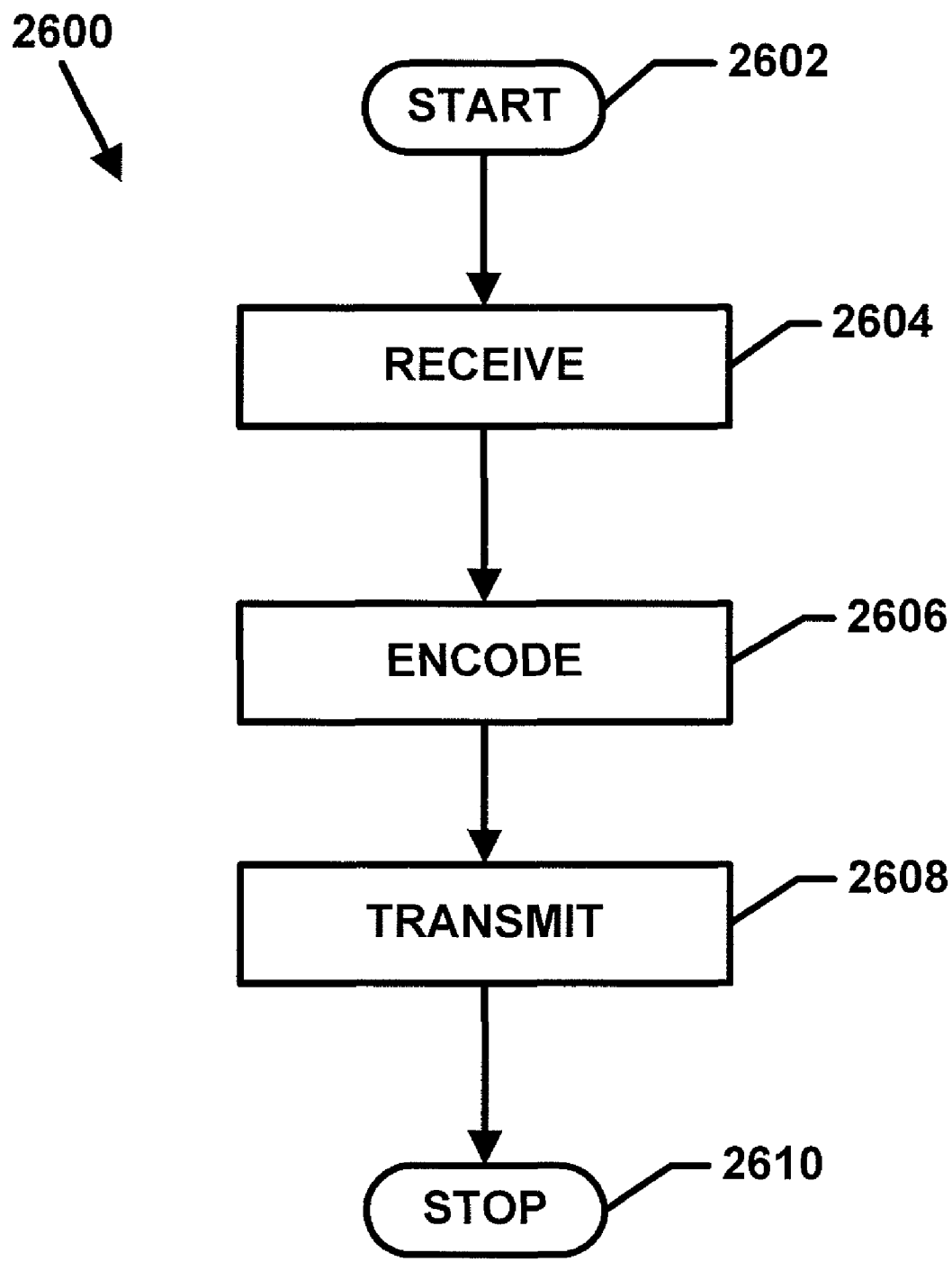
FIG. 26 is a flowchart for an example transmission process by which a beacon may certify a message transmitted to an animal tag of one of the animal management systems disclosed herein originates from an authorized source in accordance with the principles of the present disclosure.

FIG. 26 is a flowchart for an example transmission process 2600 by which a beacon may certify a message transmitted to an animal tag of one of the animal management systems disclosed herein originates from an authorized source. The transmission process 2600 initializes and begins at a start module 2602 and proceeds to a receive operation 2604. The receive operation 2604 obtains data to be transmitted to an animal tag. In an embodiment, the receive operation 2604 obtains data that is confidential. In another embodiment, the receive operation 2604 obtains data from an authorized source.

In an embodiment, the receive operation 2604 obtains data through an input device coupled to a beacon. For example, the receive operation 2604 may obtain data through a keyboard, a scanner, a touch screen, a mouse, a light pen, a jog wheel, a microphone, or another suitable input device. In another embodiment, the receive operation 2604 may obtain data from a storage device through a direct connection (e.g., a cable connection or a wireless connection). In another embodiment, the receive operation 2604 may obtain data through a network connection (e.g., to a LAN, a WAN, an intranet, or the Internet).

An encode operation 2606 encrypts the data obtained by the receiver operation 2604. In an embodiment, the encode operation 2606 encrypts the data based at least in part on the identity of the source of the data. For example, each authorized source may be assigned a different encryption code. In another embodiment, the encode operation 2606 encrypts the data based at least in part on the type of data being encoded. For example, all medical data may be encrypted using the same key. In other embodiments, other types of encryption may be used.

A transmit operation 2608 sends the encrypted message from a beacon to an animal tag. For example, in an embodiment, the transmit operation 2608 may broadcast the encrypted message to a recipient animal tag. In another embodiment, the transmit operation 2608 may broadcast the encrypted message to multiple animal tags. The transmission process 2600 completes and ends at a stop module 2610.

In an embodiment, the beacon implements the encode operation 2606 as well as the transmit operation 2608. In another embodiment, the beacon receives the encrypted message from a coder or processing device prior to transmitting the encrypted message.

Figure 27:
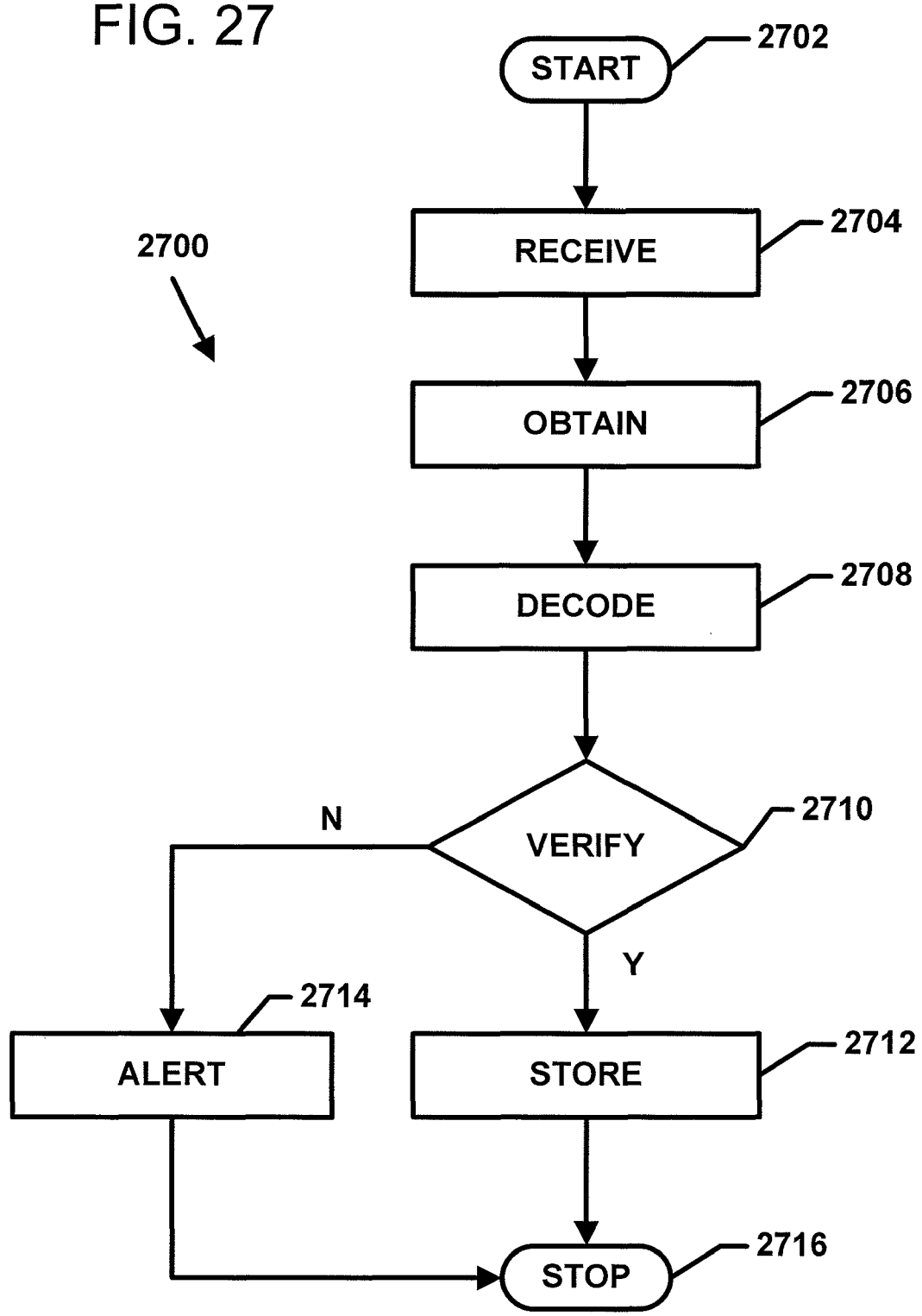
FIG. 27 is a flowchart illustrating an operational flow for an example verification process by which an animal tag, a reader, and/or a data manager of one of the animal systems disclosed herein may certify an encrypted message originated from an authorized source in accordance with the principles of the present disclosure.

FIG. 27 is a flowchart illustrating an operational flow for an example verification process 2700 by which an animal tag, a reader, and/or a data manager of one of the animal systems disclosed herein may certify an encrypted message originated from an authorized source. The verification process 2700 initializes and begins at a start module 2702 and proceeds to a receive operation 2704.

The receive operation 2704 obtains encrypted data originally transmitted from a beacon. In an embodiment, the receive operation 2704 obtains the encrypted data directly from the beacon. In another embodiment, the receive operation 2704 obtains the encrypted data through a network of one or more components of the animal management system. In an embodiment, the receive operation 2704 also receives unencrypted data.

An obtain operation 2706 determines an identity of the source of the data acquired at the receive operation 2704. For example, in an embodiment, the obtain operation 2706 may receive a source identifier from the beacon or another component of the animal management system. In an embodiment, the obtain operation 2706 may receive an encrypted source identifier. In another embodiment, the obtain operation 2706 may determine the source identity based on the type of data that is encrypted. For example, in an embodiment, the same veterinarian or clinic may be responsible for all medical data for a particular animal.

A decode operation 2708 decrypts the encrypted data obtained by the receive operation 2704. In an embodiment, the decode operation 2708 decrypts the data based at least in part on the identity of the source of the data. In such an embodiment, the identity of the source also may be received by the receive operation 2704. In an embodiment, the decode operation 2708 decrypts the data based at least in part on the type of data being decoded. In other embodiments, other types of decryption may be used.

A determination module 2710 determines whether the encrypted data was received from the source indicated by the source identifier. For example, in an embodiment, the determination module 2710 determines whether the decode operation 2708 properly decoded the encrypted data based on the source identifier. In another embodiment, the determination module 2710 determines whether data from the identified source should be encrypted. If the determination module 2710 determines the data was properly encrypted and from the identified source, then a store operation 2712 records the information in memory. The verification process 2700 completes and ends at a stop module 2716.

In an embodiment, an animal tag implements the store operation 2712 by storing the data in non-volatile memory. In an embodiment, an animal tag implements the store operation 2712 by storing the data in volatile memory. In an embodiment, an animal tag implements the store operation 2712 by storing the decrypted data in memory. In an embodiment, an animal tag implements the store operation 2712 by storing the encrypted data in memory.

In an embodiment, a reader implements the store operation 2712 by storing the data in memory at least until the data is forwarded to a data manager. In an embodiment, the reader the store operation 2712 by storing the decrypted data in memory. In an embodiment, the reader implements the store operation 2712 by storing the encrypted data in memory.

In an embodiment, a data manager implements the store operation 2712 by storing the data in non-volatile memory. In an embodiment, the data manager implements the store operation 2712 by storing the decrypted data in memory. In an embodiment, the data manager implements the store operation 2712 by storing the encrypted data in memory.

If the determination module 2710 determines the data was properly not encrypted and/or the data did not originate from the identified source, however, then an alert operation 2714 indicates a potential problem to the user. In an embodiment, the alert operation 2714 issues an immediate alert to the user. In another embodiment, the alert operation 2714 generates and/or stores an indication the data is suspect. The verification process 2700 completes and ends at a stop module 2716.

Additional Embodiments

Other embodiments of animal management systems and management processes may be implemented using the principles of the present disclosure and can have features in addition to those described above.

Another method of monitoring or tracking animals can include monitoring the proximity of a radio tagged animal to a beacon and storing information regarding the proximity of the radio tagged animal to the beacon in a radio animal tag, in the beacon, or in the beacon and the radio animal tag. This method can also include sending the information to a distant reader from the radio animal tag, from the beacon, or from the beacon and the radio animal tag.

In an embodiment, the present invention includes an animal management system. This animal management system can include a beacon, an animal tag, and a reader.

In this embodiment, the beacon includes a beacon transceiver. The beacon transceiver can be configured to broadcast a beacon signal over a beacon range. The beacon signal can include beacon information, which can include an identifier of an area of interest.

The beacon range encompasses the area of interest. For example, the beacon range can extend less than or equal to about 4 feet outside the area of interest. For example, the beacon range can be substantially coterminous with the area of interest. The beacon range can be sufficient to transmit the beacon information to the animal tag in or adjacent to the area of interest.

The system can include a plurality of beacons. For example, the system can include a first beacon configured to broadcast a first beacon signal identifying a first area of interest and a second beacon is configured to broadcast a second beacon signal identifying a second area of interest. In an embodiment, the plurality of beacons can be electrically coupled to a power source. For example, the system can include a first plurality of electrically coupled beacons configured to broadcast a first beacon signal identifying a first area of interest and a second plurality of electrically coupled beacons configured to broadcast a second beacon signal identifying a second area of interest.

In this embodiment, the animal tag includes memory and a tag transceiver. The memory can be configured to store tag information. The tag transceiver can be configured to receive the beacon signal and to transmit a tag signal including the tag information. Tag information can include indicia identifying the animal tag, the beacon information, information generated upon receiving the beacon signal, or a combination thereof. The information generated upon receiving the beacon signal can include a duration of time the animal tag is located within the beacon range of the beacon. The information generated upon receiving the beacon signal can include an incremented value of a beacon counter. In an embodiment, the system includes a plurality of animal tags, each animal tag being configured to store tag information identifying that tag.

In this embodiment, the reader includes a reader transceiver. The reader transceiver can be configured to receive the tag signal and to transmit the tag information, information generated upon receiving the tag information, or a combination thereof. In an embodiment, the reader transceiver can be configured to transmit to a data manager the tag information, information generated upon receiving the tag information, or a combination thereof. In an embodiment, the reader transceiver is configured to communicate with the animal tag. In an embodiment, the reader transceiver is configured to transmit to the animal tag a command, data, a query, or a combination thereof.

In an embodiment, the system includes a plurality of readers. For example, the system can include a stationary reader and a mobile reader. The stationary reader can be configured to communicate with the mobile reader. The mobile reader can be configured to communicate with a data manager. The mobile reader can be configured to receive power from the data manager.

In an embodiment, the area of interest includes equipment employed in livestock husbandry. For example, the area of interest can include an area selected from the group consisting of a feed trough, a water trough, a mineral station, and a windbreak. For example, the area of interest can includes an area selected from the group consisting of a squeeze-through chute, a pen at an auction facility, and a truck. The system can monitor a plurality of areas of interest. In an embodiment, the first area of interest is adjacent an entry to a squeeze-through chute and the second area of interest is adjacent an exit from the squeeze-through chute. In an embodiment, the first area of interest is a water trough and the second area of interest is a feed trough.

In an embodiment, the system includes a power source. Examples of suitable power sources include a solar cell, a battery, or a combination thereof. The power source can be configured to provide power to the reader, the beacon, or a combination thereof. For example, the system can include a beacon power source, a reader power source, or a combination thereof.

In an embodiment, the system includes a data manager. The data manager can be configured to process data obtained by the animal tag, data generated by the animal tag, or a combination thereof. The data manager can be configured to display information about a status of an animal and to provide an alert if the status of the animal meets an alert condition.

Another embodiment of the system of the present invention is a facility management system for managing animals within a facility. This facility management system can include a beacon disposed at an area of interest located within the facility, the area of interest being smaller than the facility. This embodiment of the beacon includes a beacon transceiver configured to broadcast a beacon signal over a beacon range encompassing at least a portion of the area of interest. This system also include an animal tag disposed on an animal, the animal being confined to a region of the facility, the region being larger than the area of interest. This embodiment of the animal tag includes a tag transceiver configured to receive the beacon signal when within the beacon range of the beacon.

This system also includes a reader disposed in or proximal to the region in which the animal is confined.

The present invention also includes a method of monitoring animal behavior. This method can include providing an animal and an animal tag coupled to the animal. The animal tag includes a tag transceiver and memory storing tag information including indicia identifying the animal. In this method, the animal is enclosed in a region of a facility including at least a portion of an area of interest; the area of interest being within and smaller than the facility. This method includes broadcasting from a beacon a beacon signal encompassing the area of interest. The beacon signal can include beacon information including an identifier of the area of interest.

This method includes receiving the beacon signal at the tag transceiver when the animal is in or adjacent to the area of interest. The memory of the animal tag storing tag information including the beacon information, information generated at the animal tag when the beacon signal is received, or a combination thereof. This method includes transmitting from the tag to the reader a tag signal including tag information. This method also includes receiving at the reader transceiver the tag signal from the animal tag.

This method also includes transmitting reader information from the reader transceiver to a data manager. The reader information including the tag information, information generated when the tag information is received at the reader, or a combination thereof. The method also include processing the reader information received by the data manager to determine a status of the animal and presenting an alert if the status of the animal is outside predefined parameters.

In this embodiment of the method, transmitting reader information from the reader transceiver to the data manager can include transmitting the reader information from the reader transceiver to a mobile reader, the mobile reader transmitting the information to the data manager. The method can also include indicating a status of the animal on a display.

The method can also include processing the reader information. This can include generating a status update for the animal, the status update identifying the animal and indicating a monitored condition of the animal; analyzing the status update to determine whether an alert condition exists; updating the status of the animal on the display; and presenting the alert on the display if the alert condition is determined to exist. Updating the status of the animal on the display can include adding the status update to a web page and refreshing the web page.

This embodiment of the method can include providing a plurality of animals, each animal being coupled to an animal tag including indicia identifying the animal and monitoring and displaying a status of each of animal of the plurality.

An embodiment of the present method relates to monitoring animal feeding and drinking behavior. This embodiment of the method includes providing an animal and an animal tag coupled to the animal. The animal is able to access a feed trough and a water trough from the region. A first beacon broadcasts a water trough beacon signal over a first beacon range that encompasses the water trough. The water trough beacon signal includes water trough beacon information including an identifier of the water trough. A second beacon broadcasts a feed trough beacon signal over a second beacon range that encompasses the feed trough. The feed trough beacon signal includes feed trough beacon information including an identifier of the feed trough.

The tag then receives the water trough beacon signal at the tag transceiver when the animal is located at the water trough and/or receives the feed trough beacon signal at the tag transceiver when the animal is located at the feed trough. The tag stores tag information in the memory of the tag, the tag information including an indication the animal has been proximate the water trough, an indication the animal has been proximate the feed trough, or a combination thereof.

The tag then transmits from the tag to a reader a tag signal including the tag information. The method includes receiving the tag signal at the reader and transmitting reader information to a data manager. The reader information can include the tag information, information generated when the tag signal is received at the reader, or a combination thereof. The method includes processing the reader information at the data manager to determine an animal nourishment status indicating whether the animal has been proximate the feed trough, the water trough, or a combination thereof. The display then displays the animal nourishment status to a user and displays an alert if the animal nourishment status indicates the animal has not been proximate the feed trough, the water trough, or a combination thereof for a predetermined period of time.

This embodiment of the method can include displaying the animal nourishment status to a user. This displaying can include indicating the animal nourishment status of the animal on a display; receiving an updated animal nourishment status for the animal; analyzing the updated animal nourishment status to determine whether the animal has been adequately feeding and drinking; updating the display with the updated animal nourishment status; and displaying an alert if the animal has not been adequately feeding and drinking. Updating the display can includes adding the updated animal nourishment status to a web page and refreshing the web page. The method can include providing a plurality of animals, each animal being coupled to an animal tag including indicia identifying the animal and monitoring and displaying an animal nourishment status of each of the animals.

Aspects of the present disclosure relate to methods for tracking and/or managing animals. A method of tracking or managing can include monitoring the proximity of a radio tagged animal to a beacon. The method can include obtaining and storing any of a variety of information or data. In an embodiment, the information includes an identification indicia specific to the animal, tag-specific information, or a combination thereof. The method also can include storing information regarding the proximity of the radio tagged animal to the beacon in a radio animal tag, in the beacon, or in the beacon and the radio animal tag.

In an embodiment, the method also can include sending the information to a distant reader from the radio animal tag, from the beacon, or from the beacon and the radio animal tag. Sending can include interrogating and writing to the animal tag, the reader, or plurality thereof. Sending can include, for example, transmitting from the tag over a distance of 25 meters or more. In an embodiment, sending includes transmitting from the tag over a distance sufficient for the tag to be read on an animal in a holding pen by the reader external to the holding pen.

In an embodiment, the method can include querying the tag with the reader. Querying the tag can include identifying the tag by its identifying indicia and transmitting information correlated with the tag's identifying indicia and/or general information. In an embodiment, querying includes polling a plurality of tags for identifying indicia. Each tag may be identified by distinct identifying indicia. The method includes transmitting to each tag information correlated with the tag's identifying indicia. This embodiment can also include transmitting general information.

In embodiment, the method can include providing the radio tag coupled to an ear of an animal. In an embodiment, the method can include providing one or more beacons proximal a feed trough. In an embodiment, the method can include providing one or more beacons proximal a watering system. In an embodiment, the method can include providing the reader proximal an animal holding pen. In an embodiment, the method can include providing the reader coupled to a feed truck, water truck, or other vehicle.

In another embodiment, the method includes transmitting animal-specific information from a reader to one nearby tagged animal at a time. In this embodiment, the animal-specific information can include information about a procedure conducted on the animal, a medication given the animal, or a combination thereof. This embodiment can include providing the reader proximal a squeeze through chute. This embodiment of the method can include transmitting employing a power level effective for communication at a distance of less than about 6 feet.

In any of the embodiments disclosed herein, the method can employ two frequencies and two power levels. For example, sending can include transmitting information between the beacon and the animal tag over a first frequency at a first power level. Monitoring can include transmitting information between the reader and animal tag over a second frequency at a second power level. The first power level can be less than the second power level.

In another embodiment, a method of tracking animals includes providing a first beacon adjacent a first type of food and a second beacon adjacent a second type of food. The method also includes tracking which animals approached which beacon (and hence which food). In an embodiment, the method also may include tracking a length of time each animal spent at each beacon. In an embodiment, the method also may include tracking a number of visits each animal made to each beacon. The method also may include tracking and/or correlate weight gain of one or more cows to one of the beacons to determine which food yields greater mass per unit. In an embodiment, each beacon may represent food fortified with vitamins, proteins, and/or other additives. In such an embodiment, the method may facilitate determining cost-effectiveness of the fortified food.

In another embodiment, a method of tracking animals includes providing a beacon on a first animal and an animal tag on a second animal. The animal tag on the second animal may track whether the second animal came into contact with the first animal. In an embodiment, the animal tag of the second animal may track a length of time in which the second animal was located in proximity to the first animal. For example, in an embodiment, the first animal may be a female animal and the second animal may be a male animal. The method also may include monitoring for pregnancy in the female animal. When the female animal is pregnant, the method may include reviewing the proximity information to determine a likelihood of whether the second animal impregnated the female animal.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

The invention has been described with reference to various specific and preferred embodiments and techniques. However, it should be understood that many variations and modifications may be made while remaining within the spirit and scope of the invention.

We claim:

1. A facility management system for managing animals within a facility, the facility management system comprising:
   a beacon disposed at an area of interest located within the facility, the area of interest being smaller than the facility; the beacon comprising a beacon transceiver; the beacon transceiver being configured to broadcast a beacon signal over a beacon range encompassing at least a first portion of the area of interest; the beacon signal comprising beacon information comprising an identifier of the area of interest;
   an animal tag disposed on an animal, the animal being confined to a region of the facility including at least a second portion of the area of interest; the animal tag comprising a tag transceiver and memory storing tag information; the tag transceiver configured to receive the beacon signal when within the beacon range of the beacon and to transmit a tag signal comprising the tag information; the tag information comprising indicia identifying the animal and, after the tag has been within the beacon range of the beacon, further comprising the beacon information, information generated upon receiving the beacon signal, or a combination thereof; and
   a reader disposed in or proximal to the region in which the animal is confined; the reader comprising a reader transceiver; the reader transceiver being configured to receive the tag signal and to transmit the tag information, information generated upon receiving the tag information, or a combination thereof.

2. The system of claim 1, wherein the beacon range extends less than or equal to 4 feet outside the area of interest.

3. The system of claim 1, wherein the beacon range is generally coterminous with the area of interest.

4. The system of claim 1, wherein the beacon range is sufficient to transmit the beacon information to the animal tag on the animal when the animal is located in or adjacent to the area of interest.

5. The system of claim 1, wherein the area of interest is a feed trough, a water trough, a windbreak, a squeeze-through chute, a pen at an auction facility, a stall at a milking parlor, a truck.

6. The system of claim 1, wherein the information generated upon receiving the beacon signal comprises a duration of time the animal tag is located within the beacon range of the beacon.

7. The system of claim 1, comprising a plurality of beacons.

8. The system of claim 7, wherein a first beacon is configured to broadcast a first beacon signal identifying a first area of interest and a second beacon is configured to broadcast a second beacon signal identifying a second area of interest.

9. The system of claim 8, wherein the first area of interest is proximal an entry to a squeeze through chute and the second area of interest is proximal an exit from a squeeze through chute.

10. The system of claim 1, comprising:
    a first plurality of beacons configured to broadcast a first beacon signal identifying a first area of interest; and a second plurality of beacons configured to broadcast a second beacon signal identifying a second area of interest.

11. The system of claim 10, wherein the first area of interest is a water trough and the second area of interest is a feed trough.

12. The system of claim 10, wherein the first plurality of beacons is arranged at a perimeter of the water trough and wherein the second plurality of beacons is arranged at a perimeter of the feed trough.

13. The system of claim 10, wherein the first plurality of beacons is configured to broadcast the first beacon signal having a first beacon range encompassing the first area of interest.

14. The system of claim 10, wherein the second plurality of beacons is configured to broadcast the second beacon signal having a second beacon range encompassing the second area of interest.

15. The system of claim 1, comprising a plurality of animal tags, each animal tag being disposed on an animal and storing tag information identifying that animal.

16. The system of claim 1, further comprising a mobile reader configured to collect information from the reader and to forward the collected information to a data manager.

17. The system of claim 1, comprising a plurality of readers; the plurality of readers comprising a stationary reader and a mobile reader; the stationary reader being configured to communicate with the mobile reader; the mobile reader being configured to communicate with a data manager.

18. The system of claim 1, further comprising a power source configured to provide power to the reader, the beacon, or a combination thereof, the power source comprising a solar cell, a battery, or a combination thereof.

19. The system of claim 1, further comprising a data manager disposed at the facility but remote from the reader and the region in which the animal is confined; the data manager being configured to process data generated by the animal tag, by the reader, or a combination thereof.

20. The system of claim 19, wherein the data manager is configured to display information about a status of an animal and to provide an alert if the status of the animal meets an alert condition.

21. An animal management system comprising:
a beacon, the beacon comprising a beacon transceiver; the beacon transceiver being configured to broadcast a beacon signal over a beacon range; the beacon signal comprising beacon information comprising an identifier of an area of interest; the beacon range encompassing the area of interest;
an animal tag, the animal tag comprising memory and a tag transceiver; the memory being configured to store tag information; the tag transceiver configured to receive the beacon signal and to transmit a tag signal comprising the tag information; the tag information comprising indicia identifying the animal tag, the beacon information, information generated upon receiving the beacon signal, or a combination thereof, and
a reader, the reader comprising a reader transceiver; the reader transceiver being configured to receive the tag signal and to transmit the tag information, information generated upon receiving the tag information, or a combination thereof.

22. The system of claim 21, wherein the beacon range extends less than or equal to about 4 feet outside the area of interest.

23. The system of claim 21, wherein the beacon range is substantially coterminous with the area of interest.

24. The system of claim 21, wherein the beacon range is sufficient to transmit the beacon information to the animal tag in or adjacent to the area of interest.

25. The system of claim 21, wherein the area of interest includes equipment employed in livestock husbandry.

26. The system of claim 25, wherein the area of interest includes at least one area selected from the group consisting of a feed trough, a water trough, a mineral station, and a windbreak.

27. The system of claim 25, wherein the area of interest includes at least one area selected from the group consisting of a squeeze-through chute, a pen at an auction facility, and a truck.

28. The system of claim 21, wherein the information generated upon receiving the beacon signal comprises a duration of time the animal tag is located within the beacon range of the beacon.

29. The system of claim 21, wherein the information generated upon receiving the beacon signal comprises an incremented value of a beacon counter.

30. The system of claim 29, wherein the plurality of beacons are electrically coupled to a power source.

31. The system of claim 29, comprising:
a first plurality of electrically coupled beacons configured to broadcast a first beacon signal identifying a first area of interest; and
a second plurality of electrically coupled beacons configured to broadcast a second beacon signal identifying a second area of interest.

32. The system of claim 31, wherein the first area of interest is a water trough and the second area of interest is a feed trough.

33. The system of claim 21, comprising a plurality of beacons.

34. The system of claim 33, wherein a first beacon is configured to broadcast a first beacon signal identifying a first area of interest and a second beacon is configured to broadcast a second beacon signal identifying a second area of interest.

35. The system of claim 34, wherein the first area of interest is adjacent an entry to a squeeze-through chute and the second area of interest is adjacent an exit from the squeeze-through chute.

36. The system of claim 21, comprising a plurality of animal tags, each animal tag being configured to store tag information identifying that tag.

37. The system of claim 21, wherein the reader transceiver is configured to transmit to a data manager the tag information, information generated upon receiving the tag information, or a combination thereof.

38. The system of claim 21, wherein the reader transceiver is configured to communicate with the animal tag.

39. The system of claim 38, wherein the reader transceiver is configured to transmit to the animal tag a command, data, a query, or a combination thereof.

40. The system of claim 21, comprising a plurality of readers.

41. The system of claim 40, comprising a stationary reader and a mobile reader;
the stationary reader being configured to communicate with the mobile reader;
the mobile reader being configured to communicate with a data manager.

42. The system of claim 41, wherein the mobile reader is configured to receive power from the data manager.

43. The system of claim 21, further comprising a power source; the power source comprising a solar cell, a battery, or a combination thereof.

44. The system of claim 43, wherein the power source is configured to provide power to the reader, the beacon, or a combination thereof.

45. The system of claim 21, further comprising a beacon power source, a reader power source, or a combination thereof.

46. The system of claim 21, further comprising a data manager; the data manager being configured to process data obtained by the animal tag, generated by the animal tag, or a combination thereof.

47. The system of claim 46, wherein the data manager is configured to display information about a status of an animal and to provide an alert if the status of the animal meets an alert condition.

48. A method of monitoring animal behavior comprising:
providing an animal and an animal tag coupled to the animal; the animal tag comprising a tag transceiver and memory storing tag information comprising indicia identifying the animal; the animal being enclosed in a region of a facility including at least a portion of an area of interest; the area of interest being within and smaller than the facility;
broadcasting from a beacon a beacon signal encompassing the area of interest; the beacon signal comprising beacon information comprising an identifier of the area of interest;
receiving the beacon signal at the tag transceiver when the animal is in or adjacent to the area of interest, the memory of the animal tag storing tag information comprising the beacon information, information generated at the animal tag when the beacon signal is received, or a combination thereof;
transmitting from the tag to the reader a tag signal comprising tag information;
receiving at the reader transceiver the tag signal from the animal tag;
transmitting reader information from the reader transceiver to a data manager, the reader information including the tag information, information generated when the tag information is received at the reader, or a combination thereof;
processing the reader information received by the data manager to determine a status of the animal; and
presenting an alert if the status of the animal is outside predefined parameters.

49. The method of claim 48, wherein transmitting reader information from the reader transceiver to the data manager comprises transmitting the reader information from the reader transceiver to a mobile reader, the mobile reader transmitting the information to the data manager.

50. The method of claim 48, further comprising indicating a status of the animal on a display.

51. The method of claim 50, wherein processing the reader information comprises:
generating a status update for the animal, the status update identifying the animal and indicating a monitored condition of the animal;
analyzing the status update to determine whether an alert condition exists;
updating the status of the animal on the display; and
presenting the alert on the display if the alert condition is determined to exist.

52. The method of claim 51, wherein updating the status of the animal on the display comprises:
adding the status update to a web page; and
refreshing the web page.

53. The method of claim 48, comprising:
providing a plurality of animals, each animal being coupled to an animal tag comprising indicia identifying the animal;
monitoring and displaying a status of each of animal of the plurality.

54. A method of monitoring animal feeding and drinking behavior, the method comprising:
providing an animal and an animal tag coupled to the animal; the animal tag comprising a tag transceiver and memory storing tag information comprising indicia identifying the animal; the animal being in a region of a facility; the animal being able to access a feed trough and a water trough from the region;
broadcasting a water trough beacon signal over a first beacon range that encompasses the water trough; the water trough beacon signal comprising water trough beacon information comprising an identifier of the water trough;
broadcasting a feed trough beacon signal over a second beacon range that encompasses the feed trough; the feed trough beacon signal comprising feed trough beacon information comprising an identifier of the feed trough;
receiving the water trough beacon signal at the tag transceiver when the animal is located at the water trough;
receiving the feed trough beacon signal at the tag transceiver when the animal is located at the feed trough;
storing tag information in the memory of the tag, the tag information comprising an indication the animal has been proximate the water trough, an indication the animal has been proximate the feed trough, or a combination thereof;
transmitting from the tag to a reader a tag signal comprising the tag information;
receiving the tag signal at the reader;
transmitting reader information to a data manager, the reader information comprising the tag information, information generated when the tag signal is received at the reader, or a combination thereof;
processing the reader information at the data manager to determine an animal nourishment status indicating whether the animal has been proximate the feed trough, the water trough, or a combination thereof;
displaying the animal nourishment status to a user; and
displaying an alert if the animal nourishment status indicates the animal has not been proximate the feed trough, the water trough, or a combination thereof for a predetermined period of time.

55. The method of claim 54, displaying the animal nourishment status to a user comprises:
indicating the animal nourishment status of the animal on a display;
receiving an updated animal nourishment status for the animal;
analyzing the updated animal nourishment status to determine whether the animal has been adequately feeding and drinking;
updating the display with the updated animal nourishment status; and
displaying an alert if the animal has not been adequately feeding and drinking.

56. The method of claim 55, wherein updating the display comprises:
adding the updated animal nourishment status to a web page; and
refreshing the web page.

57. The method of claim 54, comprising:
providing a plurality of animals, each animal being coupled to an animal tag comprising indicia identifying the animal;
monitoring and displaying an animal nourishment status of each of the animals.

58. A method of monitoring processing of an animal comprising:
providing an animal and an animal tag coupled to the animal; the animal tag comprising a tag transceiver and memory storing tag information comprising indicia identifying the animal; the animal moving through a chute;
broadcasting a chute entrance beacon signal over a first beacon range that encompasses an entrance to the chute; the chute entrance beacon signal comprising first beacon information comprising an identifier of the entrance to the chute;
receiving at the tag transceiver the chute entrance beacon signal when the animal enters the chute;
processing the animal while the animal is located within the chute;
broadcasting a chute exit beacon signal over a second beacon range that encompasses an exit from the chute; the chute exit beacon signal comprising second beacon information comprising an identifier of the exit from the chute;
receiving the chute exit beacon signal at the tag transceiver when the animal has been processed and is exiting the chute;
storing tag information in the memory of the tag, the tag information comprising a type of processing and indicia indicating completion of the processing;
transmitting from the tag to a reader a tag signal comprising the tag information;
receiving the tag signal at the reader;
transmitting reader information from the reader to a data manager, the reader information comprising the tag information, information generated when the tag information is received at the reader, or a combination thereof;
processing the information received by the data manager to determine whether the animal has been adequately processed; and
presenting an alert indicating a status of the animal if the animal has not been adequately processed.

59. The method of claim 58, wherein processing the animal comprises vaccinating the animal.

* * * * *